US012754137B2

(12) United States Patent
Hassibi et al.

(10) Patent No.: US 12,754,137 B2
(45) Date of Patent: Oct. 6, 2026

(54) PHOTO-TRIGGERED NUCLEIC ACID CONSTRUCTS AND METHODS FOR MOLECULAR DETECTION

(71) Applicant: InSilixa, Inc., Sunnyvale, CA (US)

(72) Inventors: Arjang Hassibi, Santa Clara, CA (US); Robert G. Kuimelis, Palo Alto, CA (US); Lei Pei, San Jose, CA (US); Kirsten A. Johnson, Redwood City, CA (US); Jessica C. Ebert, Mountain View, CA (US); Arun Manickam, San Jose, CA (US); Tran T. Van, San Jose, CA (US)

(73) Assignee: InSilixa, Inc., Sunnyvale, CA (US)

( * ) Notice: Subject to any disclaimer, the term of this patent is extended or adjusted under 35 U.S.C. 154(b) by 0 days.

(21) Appl. No.: 19/285,903

(22) Filed: Jul. 30, 2025

(65) Prior Publication Data

US 2026/0063554 A1 Mar. 5, 2026

Related U.S. Application Data

(63) Continuation-in-part of application No. 18/962,640, filed on Nov. 27, 2024, which is a continuation of application No. 18/606,640, filed on Mar. 15, 2024, now abandoned, which is a continuation of application No. 18/226,710, filed on Jul. 26, 2023, now abandoned, which is a continuation of (Continued)

(51) Int. Cl.

| | |
|---|---|
| ***G01N 21/64*** | (2006.01) |
| ***G01J 3/44*** | (2006.01) |
| ***H04N 25/771*** | (2023.01) |

(52) U.S. Cl.

CPC ........ *G01N 21/6486* (2013.01); *G01J 3/4406* (2013.01); *G01N 21/6408* (2013.01); *G01N 21/6454* (2013.01); *H04N 25/771* (2023.01)

(58) Field of Classification Search

CPC .............. G01J 3/4406; G01N 21/6408; G01N 21/6454; G01N 21/6486; H04N 24/771

See application file for complete search history.

(56) References Cited

U.S. PATENT DOCUMENTS

| | | | |
|---|---|---|---|
| 4,027,971 | A | 6/1977 | Kolman et al. |
| 4,469,863 | A | 9/1984 | Ts'o et al. |

(Continued)

FOREIGN PATENT DOCUMENTS

| | | | |
|---|---|---|---|
| CN | 1250483 | A | 4/2000 |
| CN | 1461350 | A | 12/2003 |

(Continued)

OTHER PUBLICATIONS

Hassibi, Arjang, et al. "An array-based melt curve analysis method for the identification and classification of closely related pathogen strains." Biology Methods and Protocols 3.1 (2018): bpy005. (Year: 2018).*

(Continued)

*Primary Examiner* — Robert J Eom

(74) *Attorney, Agent, or Firm* — WILSON SONSINI GOODRICH & ROSATI

(57) ABSTRACT

The present disclosure provides methods, devices and systems that enable simultaneous multiplexing amplification reaction and real-time detection in a single reaction chamber.

11 Claims, 32 Drawing Sheets

Specification includes a Sequence Listing.

Related U.S. Application Data application No. 18/077,958, filed on Dec. 8, 2022, now abandoned, which is a continuation of application No. 17/732,247, filed on Apr. 28, 2022, now abandoned, which is a continuation of application No. 16/840,773, filed on Apr. 6, 2020, now Pat. No. 11,360,029, which is a continuation of application No. PCT/US2020/022830, filed on Mar. 13, 2020, application No. 19/285,903, filed on Jul. 30, 2025 is a continuation-in-part of application No. 17/530,932, filed on Nov. 19, 2021, now abandoned, which is a continuation of application No. PCT/US2020/033884, filed on May 20, 2020.

(60) Provisional application No. 62/850,239, filed on May 20, 2019, provisional application No. 62/818,614, filed on Mar. 14, 2019.

(56) References Cited

U.S. PATENT DOCUMENTS

| | | | |
|---|---|---|---|
| 4,539,295 | A | 9/1985 | Blough, Jr. |
| 4,562,157 | A | 12/1985 | Lowe et al. |
| 4,683,195 | A | 7/1987 | Mullis et al. |
| 4,683,202 | A | 7/1987 | Mullis |
| 4,711,955 | A | 12/1987 | Ward et al. |
| 4,994,373 | A | 2/1991 | Stavrianopoulos et al. |
| 5,034,506 | A | 7/1991 | Summerton et al. |
| 5,082,830 | A | 1/1992 | Brakel et al. |
| 5,130,238 | A | 7/1992 | Malek et al. |
| 5,210,015 | A | 5/1993 | Gelfand et al. |
| 5,216,141 | A | 6/1993 | Benner |
| 5,235,033 | A | 8/1993 | Summerton et al. |
| 5,270,184 | A | 12/1993 | Walker et al. |
| 5,310,652 | A | 5/1994 | Gelfand et al. |
| 5,322,770 | A | 6/1994 | Gelfand |
| 5,323,115 | A | 6/1994 | Werner, Jr. |
| 5,328,824 | A | 7/1994 | Ward et al. |
| 5,333,675 | A | 8/1994 | Mullis et al. |
| 5,386,023 | A | 1/1995 | Sanghvi et al. |
| 5,399,491 | A | 3/1995 | Kacian et al. |
| 5,407,800 | A | 4/1995 | Gelfand et al. |
| 5,409,818 | A | 4/1995 | Davey et al. |
| 5,449,767 | A | 9/1995 | Ward et al. |
| 5,455,166 | A | 10/1995 | Walker |
| 5,455,705 | A | 10/1995 | Gusinov |
| 5,466,348 | A | 11/1995 | Holm-Kennedy |
| 5,475,610 | A | 12/1995 | Atwood et al. |
| 5,476,928 | A | 12/1995 | Ward et al. |
| 5,480,784 | A | 1/1996 | Kacian et al. |
| 5,487,972 | A | 1/1996 | Gelfand et al. |
| 5,491,063 | A | 2/1996 | Fisher et al. |
| 5,538,848 | A | 7/1996 | Livak et al. |
| 5,571,673 | A | 11/1996 | Picone |
| 5,573,906 | A | 11/1996 | Bannwarth et al. |
| 5,599,668 | A | 2/1997 | Stimpson et al. |
| 5,602,240 | A | 2/1997 | De Mesmaeker et al. |
| 5,627,054 | A | 5/1997 | Gillespie |
| 5,632,957 | A | 5/1997 | Heller et al. |
| 5,637,684 | A | 6/1997 | Cook et al. |
| 5,644,048 | A | 7/1997 | Yau |
| 5,656,493 | A | 8/1997 | Mullis et al. |
| 5,674,698 | A | 10/1997 | Zarling et al. |
| 5,677,152 | A | 10/1997 | Birch et al. |
| 5,723,591 | A | 3/1998 | Livak et al. |
| 5,744,305 | A | 4/1998 | Fodor et al. |
| 5,773,258 | A | 6/1998 | Birch et al. |
| 5,789,224 | A | 8/1998 | Gelfand et al. |
| 5,804,375 | A | 9/1998 | Gelfand et al. |
| 5,807,522 | A | 9/1998 | Brown et al. |
| 5,837,501 | A | 11/1998 | Beumer et al. |
| 5,840,017 | A | 11/1998 | Furusawa et al. |
| 5,854,033 | A | 12/1998 | Lizardi |
| 5,871,928 | A | 2/1999 | Fodor et al. |
| 5,876,930 | A | 3/1999 | Livak et al. |
| 5,919,630 | A | 7/1999 | Nadeau et al. |
| 5,925,519 | A | 7/1999 | Jensen et al. |
| 5,955,351 | A | 9/1999 | Gerdes et al. |
| 5,974,164 | A | 10/1999 | Chee |
| 5,994,056 | A | 11/1999 | Higuchi |
| 6,025,601 | A | 2/2000 | Trulson et al. |
| 6,030,787 | A | 2/2000 | Livak et al. |
| 6,040,193 | A | 3/2000 | Winkler et al. |
| 6,048,690 | A | 4/2000 | Heller et al. |
| 6,054,270 | A | 4/2000 | Southern |
| 6,083,763 | A | 7/2000 | Balch |
| 6,103,476 | A | 8/2000 | Tyagi et al. |
| 6,110,426 | A | 8/2000 | Shalon et al. |
| 6,110,749 | A | 8/2000 | Obremski et al. |
| 6,114,122 | A | 9/2000 | Besemer et al. |
| 6,124,102 | A | 9/2000 | Fodor et al. |
| 6,127,155 | A | 10/2000 | Gelfand et al. |
| 6,153,425 | A | 11/2000 | Kozwich et al. |
| 6,169,981 | B1 | 1/2001 | Werbos |
| 6,171,785 | B1 | 1/2001 | Higuchi |
| 6,174,670 | B1 | 1/2001 | Wittwer et al. |
| 6,225,625 | B1 | 5/2001 | Pirrung et al. |
| 6,251,639 | B1 | 6/2001 | Kurn |
| 6,258,569 | B1 | 7/2001 | Livak et al. |
| 6,261,776 | B1 | 7/2001 | Pirrung et al. |
| 6,291,166 | B1 | 9/2001 | Gerdes et al. |
| 6,291,183 | B1 | 9/2001 | Pirrung et al. |
| 6,312,906 | B1 | 11/2001 | Cass et al. |
| 6,319,958 | B1 | 11/2001 | Johnson et al. |
| 6,327,410 | B1 | 12/2001 | Walt et al. |
| 6,330,092 | B1 | 12/2001 | Aronson |
| 6,365,729 | B1 | 4/2002 | Tyagi et al. |
| 6,391,550 | B1 | 5/2002 | Lockhart et al. |
| 6,403,341 | B1 | 6/2002 | Barnes et al. |
| 6,406,848 | B1 | 6/2002 | Bridgham et al. |
| 6,410,278 | B1 | 6/2002 | Notomi et al. |
| 6,428,957 | B1 | 8/2002 | Delenstarr |
| 6,432,695 | B1 | 8/2002 | Zou et al. |
| 6,465,175 | B2 | 10/2002 | Horn et al. |
| 6,469,524 | B1 | 10/2002 | Oberdier |
| 6,472,887 | B1 | 10/2002 | Tullis et al. |
| 6,516,276 | B1 | 2/2003 | Ghandour et al. |
| 6,593,091 | B2 | 7/2003 | Keys et al. |
| 6,600,996 | B2 | 7/2003 | Webster et al. |
| 6,610,482 | B1 | 8/2003 | Fodor et al. |
| 6,649,378 | B1 | 11/2003 | Kozwich et al. |
| 6,673,536 | B1 | 1/2004 | Stoughton et al. |
| 6,713,297 | B2 | 3/2004 | McMillan et al. |
| 6,724,324 | B1 | 4/2004 | Lambert |
| 6,743,581 | B1 | 6/2004 | Vo-Dinh |
| 6,744,502 | B2 | 6/2004 | Hoff et al. |
| 6,750,963 | B2 | 6/2004 | Sampas |
| 6,783,934 | B1 | 8/2004 | McMillan et al. |
| 6,806,052 | B2 | 10/2004 | Bridgham et al. |
| 6,814,934 | B1 | 11/2004 | Higuchi |
| 6,828,100 | B1 | 12/2004 | Ronaghi |
| 6,859,570 | B2 | 2/2005 | Walt et al. |
| 6,859,750 | B1 | 2/2005 | Frazier |
| 6,872,527 | B2 | 3/2005 | Gerdes et al. |
| 6,911,327 | B2 | 6/2005 | McMillan et al. |
| 6,942,971 | B2 | 9/2005 | McMillan et al. |
| 6,946,251 | B2 | 9/2005 | Kurn |
| 6,953,958 | B2 | 10/2005 | Baxter et al. |
| 6,969,488 | B2 | 11/2005 | Bridgham et al. |
| 7,060,431 | B2 | 6/2006 | Chee et al. |
| 7,064,197 | B1 | 6/2006 | Rabbani et al. |
| 7,087,387 | B2 | 8/2006 | Gerdes et al. |
| 7,122,355 | B2 | 10/2006 | Ankenbauer et al. |
| 7,145,645 | B2 | 12/2006 | Blumenfeld et al. |
| 7,223,540 | B2 | 5/2007 | Pourmand et al. |
| 7,291,496 | B2 | 11/2007 | Holm-Kennedy |
| 7,307,802 | B2 | 12/2007 | Unger |
| 7,317,216 | B2 | 1/2008 | Holm-Kennedy |
| 7,323,305 | B2 | 1/2008 | Leamon et al. |
| 7,348,141 | B2 | 3/2008 | French et al. |
| 7,361,472 | B2 | 4/2008 | Yguerabide et al. |
| 7,399,585 | B2 | 7/2008 | Gau |
| 7,463,353 | B2 | 12/2008 | Yershov |

(56) References Cited

U.S. PATENT DOCUMENTS

| | | | |
|---|---|---|---|
| 7,504,832 | B2 | 3/2009 | Kandori et al. |
| 7,572,624 | B2 | 8/2009 | Gumbrecht et al. |
| 7,588,672 | B2 | 9/2009 | Unger et al. |
| 7,599,060 | B2 | 10/2009 | Hoshizaki et al. |
| 7,622,294 | B2 | 11/2009 | Walt et al. |
| 7,630,227 | B2 | 12/2009 | Tran |
| 7,649,358 | B2 | 1/2010 | Toumazou et al. |
| 7,686,929 | B2 | 3/2010 | Toumazou et al. |
| 7,687,260 | B2 | 3/2010 | Gutekunst |
| 7,738,086 | B2 | 6/2010 | Shepard et al. |
| 7,785,776 | B2 | 8/2010 | Wittwer et al. |
| 7,785,785 | B2 | 8/2010 | Pourmand et al. |
| 7,824,890 | B2 | 11/2010 | Hoser et al. |
| 7,835,871 | B2 | 11/2010 | Kain et al. |
| 7,842,457 | B2 | 11/2010 | Berka et al. |
| 7,884,398 | B2 | 2/2011 | Levon et al. |
| 7,888,013 | B2 | 2/2011 | Miyahara et al. |
| 7,888,015 | B2 | 2/2011 | Toumazou et al. |
| 7,906,072 | B2 | 3/2011 | Unger et al. |
| 7,914,981 | B2 | 3/2011 | Barany et al. |
| 7,932,034 | B2 | 4/2011 | Esfandyarpour et al. |
| 7,948,015 | B2 | 5/2011 | Rothberg et al. |
| 7,995,679 | B2 | 8/2011 | Ranganathan et al. |
| 7,998,673 | B2 | 8/2011 | French et al. |
| 8,012,756 | B2 | 9/2011 | Pourmand et al. |
| 8,048,626 | B2 | 11/2011 | Hassibi et al. |
| 8,119,345 | B2 | 2/2012 | Weusten et al. |
| 8,158,359 | B2 | 4/2012 | Leamon et al. |
| 8,306,757 | B2 | 11/2012 | Rothberg et al. |
| 8,313,904 | B2 | 11/2012 | El et al. |
| 8,313,907 | B2 | 11/2012 | Pourmand et al. |
| 8,349,167 | B2 | 1/2013 | Rothberg et al. |
| 8,517,329 | B2 | 8/2013 | Nash et al. |
| 8,518,329 | B2 | 8/2013 | Hassibi et al. |
| 8,637,436 | B2 | 1/2014 | Hassibi et al. |
| 8,735,067 | B2 | 5/2014 | Zhang et al. |
| 8,790,876 | B2 | 7/2014 | Leamon et al. |
| 8,969,781 | B2 | 3/2015 | Hassibi et al. |
| 8,999,724 | B2 | 4/2015 | Holt et al. |
| 9,040,237 | B2 | 5/2015 | Koo et al. |
| 9,133,504 | B2 | 9/2015 | Hassibi et al. |
| 9,223,929 | B2 | 12/2015 | Hassibi et al. |
| 9,341,589 | B2 | 5/2016 | Hassibi et al. |
| 9,377,388 | B2 | 6/2016 | Walt et al. |
| 9,458,497 | B2 | 10/2016 | Hassibi et al. |
| 9,465,002 | B2 | 10/2016 | Hassibi et al. |
| 9,499,861 | B1 | 11/2016 | Hassibi et al. |
| 9,708,647 | B2 | 7/2017 | Hassibi et al. |
| 9,831,283 | B2 | 11/2017 | Shepard et al. |
| 9,891,182 | B2 | 2/2018 | Sorgenfrei et al. |
| 9,983,163 | B2 | 5/2018 | Hassibi et al. |
| 10,106,839 | B2 | 10/2018 | Hassibi |
| 10,174,367 | B2 | 1/2019 | Hassibi et al. |
| 10,401,353 | B2 | 9/2019 | Shepard et al. |
| 10,501,778 | B2 | 12/2019 | Hassibi et al. |
| 10,684,240 | B2 | 6/2020 | Sorgenfrei et al. |
| 10,718,732 | B2 | 7/2020 | Levine et al. |
| 10,739,293 | B2 | 8/2020 | Hassibi et al. |
| 10,799,705 | B2 | 10/2020 | Shepard et al. |
| 10,898,168 | B2 | 1/2021 | Shepard et al. |
| 10,921,314 | B2 | 2/2021 | Shepard et al. |
| 11,001,881 | B2 | 5/2021 | Hassibi et al. |
| 11,098,345 | B2 | 8/2021 | Hassibi et al. |
| 11,112,360 | B2 | 9/2021 | Shepard et al. |
| 11,360,029 | B2 | 6/2022 | Hassibi et al. |
| 11,447,816 | B2 | 9/2022 | Hassibi et al. |
| 11,525,156 | B2 | 12/2022 | Hassibi et al. |
| 11,560,588 | B2 | 1/2023 | Hassibi et al. |
| 11,579,111 | B2 | 2/2023 | Hassibi et al. |
| 2001/0030290 | A1 | 10/2001 | Stern |
| 2001/0046673 | A1 | 11/2001 | French et al. |
| 2002/0001844 | A1 | 1/2002 | Frutos et al. |
| 2002/0006619 | A1 | 1/2002 | Cohen et al. |
| 2002/0034746 | A1 | 3/2002 | McMillan et al. |
| 2002/0102567 | A1 | 8/2002 | Fodor et al. |
| 2002/0106653 | A1 | 8/2002 | Kurane et al. |
| 2002/0119462 | A1 | 8/2002 | Mendrick et al. |
| 2002/0123048 | A1 | 9/2002 | Gau |
| 2002/0131899 | A1 | 9/2002 | Kovacs |
| 2002/0137096 | A1 | 9/2002 | Fodor et al. |
| 2002/0146745 | A1 | 10/2002 | Natan et al. |
| 2002/0150917 | A1 | 10/2002 | Weidenhammer et al. |
| 2002/0177157 | A1 | 11/2002 | Luo et al. |
| 2002/0187477 | A1 | 12/2002 | Xue et al. |
| 2002/0197634 | A1 | 12/2002 | Emoto |
| 2003/0040000 | A1 | 2/2003 | Connolly et al. |
| 2003/0071843 | A1 | 4/2003 | Hoff et al. |
| 2003/0130973 | A1 | 7/2003 | Sumner et al. |
| 2003/0143591 | A1 | 7/2003 | Davies et al. |
| 2003/0157581 | A1 | 8/2003 | Grill et al. |
| 2003/0186310 | A1 | 10/2003 | Kincaid |
| 2003/0194726 | A1 | 10/2003 | Bolchakova et al. |
| 2003/0225718 | A1 | 12/2003 | Shmulevich et al. |
| 2004/0002073 | A1 | 1/2004 | Li et al. |
| 2004/0005582 | A1 | 1/2004 | Shipwash |
| 2004/0038420 | A1 | 2/2004 | Gelbart et al. |
| 2004/0053254 | A1 | 3/2004 | Wangh et al. |
| 2004/0058378 | A1 | 3/2004 | Kong et al. |
| 2004/0077648 | A1 | 4/2004 | Timmer et al. |
| 2004/0080629 | A1 | 4/2004 | Sato et al. |
| 2004/0081974 | A1 | 4/2004 | Gao |
| 2004/0086864 | A1 | 5/2004 | Lo et al. |
| 2004/0087033 | A1 | 5/2004 | Schembri |
| 2004/0091862 | A1 | 5/2004 | Brandenburg et al. |
| 2004/0096819 | A1 | 5/2004 | McMillan et al. |
| 2004/0110219 | A1 | 6/2004 | Buchholz et al. |
| 2004/0147045 | A1 | 7/2004 | Nelson |
| 2004/0208792 | A1 | 10/2004 | Linton et al. |
| 2004/0265902 | A1 | 12/2004 | Fricker et al. |
| 2005/0003355 | A1 | 1/2005 | Lu et al. |
| 2005/0064452 | A1 | 3/2005 | Schmid et al. |
| 2005/0065290 | A1 | 3/2005 | Shah |
| 2005/0073451 | A1 | 4/2005 | Bocko et al. |
| 2005/0084881 | A1 | 4/2005 | Kelley et al. |
| 2005/0084884 | A1 | 4/2005 | Palombella et al. |
| 2005/0089924 | A1 | 4/2005 | Ho et al. |
| 2005/0112585 | A1 | 5/2005 | Zichi et al. |
| 2005/0112634 | A1 | 5/2005 | Woudenberg et al. |
| 2005/0161192 | A1 | 7/2005 | Shigeura et al. |
| 2005/0202470 | A1 | 9/2005 | Sundberg et al. |
| 2005/0238123 | A1 | 10/2005 | Ranganathan et al. |
| 2005/0255516 | A1 | 11/2005 | McMillan et al. |
| 2006/0014151 | A1 | 1/2006 | Ogura et al. |
| 2006/0014200 | A1 | 1/2006 | McMillan et al. |
| 2006/0024707 | A1 | 2/2006 | Deans et al. |
| 2006/0051788 | A1 | 3/2006 | Suzuki et al. |
| 2006/0068378 | A1 | 3/2006 | Mirkin et al. |
| 2006/0078929 | A1 | 4/2006 | Bickel et al. |
| 2006/0084069 | A1 | 4/2006 | Chan et al. |
| 2006/0088844 | A1 | 4/2006 | Xu |
| 2006/0094108 | A1 | 5/2006 | Yoder et al. |
| 2006/0123516 | A1 | 6/2006 | Ronen et al. |
| 2006/0124863 | A1 | 6/2006 | Maruno et al. |
| 2006/0140822 | A1 | 6/2006 | Krysl et al. |
| 2006/0208254 | A1 | 9/2006 | Goodman et al. |
| 2006/0269922 | A1 | 11/2006 | Sagner et al. |
| 2006/0269934 | A1 | 11/2006 | Woudenberg et al. |
| 2007/0010664 | A1 | 1/2007 | Thomas et al. |
| 2007/0026421 | A1 | 2/2007 | Sundberg et al. |
| 2007/0057159 | A1 | 3/2007 | Hing |
| 2007/0065818 | A1 | 3/2007 | Foti et al. |
| 2007/0077609 | A1 | 4/2007 | Gambhir et al. |
| 2007/0099198 | A1 | 5/2007 | Hassibi et al. |
| 2007/0212681 | A1 | 9/2007 | Shapiro et al. |
| 2007/0218610 | A1 | 9/2007 | Lim et al. |
| 2007/0279631 | A1 | 12/2007 | Yershov |
| 2007/0281288 | A1 | 12/2007 | Belkin et al. |
| 2008/0027008 | A1 | 1/2008 | Henkin |
| 2008/0037008 | A1 | 2/2008 | Shepard et al. |
| 2008/0039339 | A1 | 2/2008 | Hassibi et al. |
| 2008/0081769 | A1 | 4/2008 | Hassibi |
| 2008/0085839 | A1 | 4/2008 | Klapproth |
| 2008/0176757 | A1 | 7/2008 | Hassibi et al. |
| 2008/0227742 | A1 | 9/2008 | Dmochowski et al. |

(56) References Cited

U.S. PATENT DOCUMENTS

| | | | |
|---|---|---|---|
| 2008/0305481 | A1 | 12/2008 | Whitman et al. |
| 2009/0062134 | A1 | 3/2009 | Linton et al. |
| 2009/0062152 | A1 | 3/2009 | Linton et al. |
| 2009/0079414 | A1 | 3/2009 | Levon et al. |
| 2009/0111207 | A1 | 4/2009 | Choumane et al. |
| 2009/0137418 | A1 | 5/2009 | Miller et al. |
| 2009/0143233 | A1 | 6/2009 | Knight et al. |
| 2009/0143237 | A1 | 6/2009 | Stender et al. |
| 2009/0156415 | A1 | 6/2009 | Remacle et al. |
| 2009/0156425 | A1 | 6/2009 | Walt et al. |
| 2009/0170728 | A1 | 7/2009 | Walt et al. |
| 2009/0221025 | A1 | 9/2009 | Huebner et al. |
| 2009/0318306 | A1 | 12/2009 | Hasson et al. |
| 2009/0318307 | A1 | 12/2009 | Garcia |
| 2009/0325164 | A1 | 12/2009 | Vossenaar et al. |
| 2009/0325184 | A1 | 12/2009 | Woudenberg et al. |
| 2010/0003715 | A1 | 1/2010 | Pellegrino |
| 2010/0041030 | A1 | 2/2010 | Hartwich |
| 2010/0052080 | A1 | 3/2010 | Garcia Tello et al. |
| 2010/0099159 | A1 | 4/2010 | Deiters |
| 2010/0105033 | A1 | 4/2010 | Sun et al. |
| 2010/0122904 | A1 | 5/2010 | Hassibi et al. |
| 2010/0129871 | A1 | 5/2010 | Liu et al. |
| 2010/0137166 | A1 | 6/2010 | Kain et al. |
| 2010/0138162 | A1 | 6/2010 | Kain et al. |
| 2010/0233680 | A1 | 9/2010 | Taylor et al. |
| 2010/0240544 | A1 | 9/2010 | Liu et al. |
| 2010/0276734 | A1 | 11/2010 | Josowicz et al. |
| 2010/0300899 | A1 | 12/2010 | Levine et al. |
| 2010/0330578 | A1 | 12/2010 | Duhr et al. |
| 2011/0009278 | A1 | 1/2011 | Kain et al. |
| 2011/0009296 | A1 | 1/2011 | Kain et al. |
| 2011/0086361 | A1 | 4/2011 | Klunder et al. |
| 2011/0092692 | A1 | 4/2011 | Jiang |
| 2011/0111968 | A1 | 5/2011 | Okura et al. |
| 2011/0213252 | A1 | 9/2011 | Fulghum |
| 2011/0236983 | A1 | 9/2011 | Beechem et al. |
| 2011/0312810 | A1 | 12/2011 | Moini et al. |
| 2012/0040853 | A1 | 2/2012 | Pierik et al. |
| 2012/0052563 | A1 | 3/2012 | Liang et al. |
| 2012/0077692 | A1 | 3/2012 | Hassibi et al. |
| 2012/0088682 | A1 | 4/2012 | Rothberg et al. |
| 2012/0094298 | A1 | 4/2012 | Seul et al. |
| 2012/0115214 | A1 | 5/2012 | Battrell et al. |
| 2012/0164652 | A1 | 6/2012 | Clemens et al. |
| 2012/0168306 | A1 | 7/2012 | Hassibi et al. |
| 2012/0295805 | A1 | 11/2012 | Levicky et al. |
| 2013/0045876 | A1 | 2/2013 | Goel et al. |
| 2013/0052690 | A1 | 2/2013 | Chi et al. |
| 2013/0122507 | A1 | 5/2013 | Bi |
| 2013/0210656 | A1 | 8/2013 | Wangh et al. |
| 2013/0225441 | A1 | 8/2013 | Hassibi |
| 2013/0252827 | A1 | 9/2013 | Chun |
| 2013/0345065 | A1 | 12/2013 | Hassibi et al. |
| 2014/0001341 | A1 | 1/2014 | Hassibi et al. |
| 2014/0011710 | A1 | 1/2014 | Hassibi et al. |
| 2014/0162266 | A1 | 6/2014 | Klitgord et al. |
| 2014/0272978 | A1 | 9/2014 | Shi et al. |
| 2014/0287420 | A1 | 9/2014 | Cadle-Davidson |
| 2014/0287428 | A1 | 9/2014 | Sietze |
| 2014/0318958 | A1 | 10/2014 | Hassibi et al. |
| 2014/0363821 | A1 | 12/2014 | Bashir et al. |
| 2015/0093849 | A1 | 4/2015 | Shepard et al. |
| 2015/0125855 | A1 | 5/2015 | Li et al. |
| 2015/0316482 | A1 | 11/2015 | Natarajan et al. |
| 2016/0041095 | A1 | 2/2016 | Rothberg et al. |
| 2016/0138092 | A1 | 5/2016 | Johnson et al. |
| 2016/0160271 | A1 | 6/2016 | Hassibi et al. |
| 2016/0231270 | A1 | 8/2016 | Hassibi et al. |
| 2016/0281149 | A1 | 9/2016 | Hassibi et al. |
| 2017/0081714 | A1 | 3/2017 | Hassibi et al. |
| 2017/0101666 | A1 | 4/2017 | Hassibi et al. |
| 2017/0362648 | A1 | 12/2017 | Hassibi et al. |
| 2017/0363741 | A1 | 12/2017 | Send et al. |
| 2018/0003652 | A1 | 1/2018 | Uher et al. |
| 2018/0023129 | A1 | 1/2018 | Hassibi et al. |
| 2018/0180546 | A1 | 6/2018 | Rothberg et al. |
| 2018/0251828 | A1 | 9/2018 | Hassibi et al. |
| 2018/0251829 | A1 | 9/2018 | Hassibi et al. |
| 2018/0372736 | A1 | 12/2018 | Hennek et al. |
| 2019/0062819 | A1 | 2/2019 | Hassibi |
| 2019/0112648 | A1 | 4/2019 | Schaal et al. |
| 2019/0323070 | A1 | 10/2019 | Hassibi et al. |
| 2020/0292457 | A1 | 9/2020 | Hassibi et al. |
| 2021/0156813 | A1 | 5/2021 | Hassibi et al. |
| 2022/0195506 | A1 | 6/2022 | Hassibi et al. |
| 2023/0016567 | A1 | 1/2023 | Hassibi et al. |

FOREIGN PATENT DOCUMENTS

| | | | |
|---|---|---|---|
| CN | 1675545 | A | 9/2005 |
| CN | 1993617 | A | 7/2007 |
| CN | 107709975 | A | 2/2018 |
| DE | 102014200483 | A1 | 7/2015 |
| EP | 0684315 | A1 | 11/1995 |
| EP | 0236069 | B1 | 5/1997 |
| EP | 0872562 | A1 | 10/1998 |
| EP | 1368498 | A2 | 12/2003 |
| EP | 1608952 | A2 | 12/2005 |
| EP | 1681557 | A1 | 7/2006 |
| EP | 1754257 | A2 | 2/2007 |
| EP | 1924681 | A2 | 5/2008 |
| EP | 2126765 | A1 | 12/2009 |
| EP | 2374902 | A1 | 10/2011 |
| EP | 2489745 | A2 | 8/2012 |
| EP | 2029775 | B1 | 10/2014 |
| EP | 3937780 | A1 | 1/2022 |
| JP | 2004125556 | A | 4/2004 |
| JP | 2013005803 | A | 1/2013 |
| JP | 2017507656 | A | 3/2017 |
| JP | 2017531356 | A | 10/2017 |
| JP | 2018512847 | A | 5/2018 |
| WO | WO-9843072 | A1 | 10/1998 |
| WO | WO-0068670 | A1 | 11/2000 |
| WO | WO-0079009 | A2 | 12/2000 |
| WO | WO-0121838 | A2 | 3/2001 |
| WO | WO-0177372 | A2 | 10/2001 |
| WO | WO-2001086001 | A1 | 11/2001 |
| WO | WO-0079009 | A3 | 1/2002 |
| WO | WO-0230946 | A1 | 4/2002 |
| WO | WO-02099397 | A2 | 12/2002 |
| WO | WO-03062791 | A2 | 7/2003 |
| WO | WO-03074724 | A2 | 9/2003 |
| WO | WO-2004011144 | A2 | 2/2004 |
| WO | WO-03062791 | A3 | 6/2004 |
| WO | WO-2004059006 | A1 | 7/2004 |
| WO | WO-2005073407 | A1 | 8/2005 |
| WO | WO-2005118870 | A2 | 12/2005 |
| WO | WO-2005121159 | A1 | 12/2005 |
| WO | WO-2006014351 | A2 | 2/2006 |
| WO | WO-2006037527 | A1 | 4/2006 |
| WO | WO-2006044994 | A2 | 4/2006 |
| WO | WO-2006053769 | A1 | 5/2006 |
| WO | WO-2007045755 | A1 | 4/2007 |
| WO | WO-2007133703 | A2 | 11/2007 |
| WO | WO-2007143669 | A2 | 12/2007 |
| WO | WO-2008014485 | A2 | 1/2008 |
| WO | WO-2008082713 | A2 | 7/2008 |
| WO | WO-2008142571 | A2 | 11/2008 |
| WO | WO-2008143646 | A2 | 11/2008 |
| WO | WO-2009021054 | A2 | 2/2009 |
| WO | WO-2009082706 | A1 | 7/2009 |
| WO | WO-2009158451 | A1 | 12/2009 |
| WO | WO-2011066186 | A1 | 6/2011 |
| WO | WO-2013081987 | A1 | 6/2013 |
| WO | WO-2013152203 | A1 | 10/2013 |
| WO | WO-2014028061 | A1 | 2/2014 |
| WO | WO-2015128272 | A2 | 9/2015 |
| WO | WO-2016154227 | A1 | 9/2016 |
| WO | WO-2017044100 | A1 | 3/2017 |
| WO | WO-2017086181 | A1 | 5/2017 |
| WO | WO-2017155858 | A1 | 9/2017 |

(56) References Cited

FOREIGN PATENT DOCUMENTS

| | | | |
|---|---|---|---|
| WO | WO-2018050501 | A1 | 3/2018 |
| WO | WO-2020186252 | A1 | 9/2020 |

OTHER PUBLICATIONS

Song, Bo, et al. "A versatile method for quantification of DNA and PCR products based on time-resolved Eu III luminescence." Analyst 133.12 (2008): 1749-1756. (Year: 2008).*
Du, Ke, et al. "Microfluidic system for detection of viral RNA in blood using a barcode fluorescence reporter and a photocleavable capture probe." Analytical chemistry 89.22 (2017): 12433-12440. (Year: 2017).*
Seo, Tae Seok, et al. "Photocleavable fluorescent nucleotides for DNA sequencing on a chip constructed by site-specific coupling chemistry." Proceedings of the National Academy of Sciences 101.15 (2004): 5488-5493. (Year: 2004).*
A. Agah, et al., A High-Resolution Low-Power Incremental Lb. ADC With Extended Range for Biosensor Arrays, IEEE Journal of Solid-State Circuits, vol. 45, No. 6, pp. 1099-1110 (2010) (Year: 2010).
Ansevin, et al. High-resolution thermal denaturation of DNA. I. Theoretical and practical considerations for the resolution of thermal subtransitions. Biopolymers. Jan. 1976;15(1):153-74.
Ausubel, et al. Current Protocols in Molecular Biology. Greene Publishing Associates and Wiley-Interscience. John Wiley & Sons. New York. 1987. (Table of Contents).
Beaucage, et al. The functionalization of oligonucleotides via phosphoramidite derivative. Tetrahedron. 1993;49(10):1925-63.
Bein, G., et al. Rapid HLA-DRB1 genotyping by nested PCR amplification. Tissue Antigens. Feb. 1992;39(2):68-73. doi: 10.1111/j.1399-0039.1992.tb01909.x. PMID: 1574800.
Brill et al. Synthesis of oligodeoxynucleoside phosphorodithioates via thioamidites. J. Am. Chem. Soc. 111:2321-2322 (1989).
Brodsky, et al. Identification and handling of artifactual gene expression profiles emerging in microarray hybridization experiments. Nucleic Acids Res. Mar. 3, 2004;32(4):e46.
Brown, et al. Exploring the new world of the genome with DNA microarrays. Nature Genet. 1999; 21 (Suppl.):33-37.
C. Y. Huang, Design of a voltammetry potentiostat for biochemical sensors, Analog Integr. Cir. Sig. Process, vol. 67, pp. 375-381 (2011) (Year: 2011).
Cady, et al. Real-time PCR detection of Listeria monocytogenes using an integrated microfluidics platform. Sensors and Actuators B: Chemical. 2005; 107: 332-341.
Campbell, et al. Large-scale approaches for glycobiology. Genome Biology. 2005; 6(11): 236.1-8.
Canon. High resolution thermal melt analysis. http://culs.canon.com/Science/Technology_Overview/High_Resolution_thermal_melt_analysis/High_Resolution_Thermal_Melt_Analysis.shtml. Accessed on Jun. 10, 2015. 1 pg.
Carlsson et al. Screening for genetic mutations. Nature 380(6571):207 (1996).
Clegg. Fluorescence resonance energy transfer and nucleic acids. Methods Enzymol. 1992;211:353-88.
Co-pending U.S. Appl. No. 16/191,836, inventors Hassibi; Arjang et al., filed Nov. 15, 2018.
Co-pending U.S. Appl. No. 16/670,126, inventors Hassibi; Arjang et al., filed Oct. 31, 2019.
Co-pending U.S. Appl. No. 16/777,051, inventors Hassibi; Arjang et al., filed Jan. 30, 2020.
Co-pending U.S. Appl. No. 16/983,989, inventors Hassibi; Arjang et al., filed Aug. 3, 2020.
Co-pending U.S. Appl. No. 17/018,036, inventors Hassibi; Arjang et al., filed Sep. 11, 2020.
Co-pending U.S. Appl. No. 17/196,091, inventors Hassibi; Arjang et al., filed Mar. 8, 2021.
Co-pending U.S. Appl. No. 17/235,506, inventors Hassibi; Arjang et al., filed Apr. 20, 2021.
Co-pending U.S. Appl. No. 17/503,694, inventors Hassibi; Arjang et al., filed Oct. 18, 2021.
Co-pending U.S. Appl. No. 17/537,299, inventors Hassibi; Arjang et al., filed Nov. 29, 2021.
Co-pending U.S. Appl. No. 17/558,084, inventors Hassibi; Arjang et al., filed Dec. 21, 2021.
Cronin, et al. Cystic fibrosis mutation detection by hybridization to light-generated DNA probe arrays. Hum Mutat. 1996;7(3):244-55.
De Mesmaeker et al. Comparison of Rigid and Flexible Backbones in Antisense Oligonucleotides Bioorg Med Chem Lett 4(3):395-398 (1994).
Dempcy et al. Synthesis of a thymidyl pentamer of deoxyribonucleic guanidine and binding studies with DNA homopolynucleotides PNAS USA 92:6097-6101 (1995).
Deshpande, et al. Current Protocols in Cytometry 13.4.1-13.4.11 (Year: 2005).
Didenko. DNA probes using fluorescence resonance energy transfer (FRET): designs and applications. Biotechniques. Nov. 2001;31(5):1106-16, 1118, 1120-1.
Diehl et al. BEAMing: single-molecule PCR on microparticles in water-in-oil emulsions. Nature Methods 3(7):551-559 (2006).
Dolganov, et al. Novel molecular diagnostic (MDx) Platform for Highly-Multiplex Drug Susceptibility Testing of M. tuberculosis. http://www.stoptb.org/wg/new_diagnostics/assets/documents/09-NDWG-Annual-Meeting_GarySCHOOLNIK_&_Gregory_DOLGANOV.pdf. Accessed on Jun. 10, 2015. 13 pgs.
Dominguez, P.L., et al. Wild-type blocking polymerase chain reaction for detection of single nucleotide minority mutations from clinical specimens. Oncogene. Oct. 13, 2005;24(45):6830-4. doi: 10.1038/sj.onc.1208832. Erratum in: Oncogene. Jan. 26, 2006;25(4):656. PMID: 16116485.
Dowling, et al. Exponential parameter estimation in the presence of known components and noise. Antennas and Propagation, IEEE Trans. on Antennas and Propag., 1994, 42(5), 590-599.
Eckstein, F. Oligonucleotides and Analogues: A Practical Approach. Oxford University Press, 1-7 (1991).
El Gamal, A., Dec. 2002, Trends in CMOS image sensor technology and design. In Digest. International Electron Devices Meeting, (pp. 805-808). IEEE.
El Gamal, et al. CMOS image sensors. Circuits and Devices Magazine, IEEE. 2005; 20(3):6-20.
Eltoukhy, et al. A 0.18-um CMOS bioluminescence detection lab-on-chip. Solid-State Circuits, IEEE Journal of: Mar. 2006; 41(3):651-662.
Falconnet, et al. Rapid, sensitive and real-time multiplexing platform for the analysis of protein and nucleic-acid biomarkers. Anal Chem. Feb. 3, 2015;87(3):1582-9. Epub Jan. 21, 2015.
FDA. Response to Section 501(k) Premarket Notification of Intent to Market. Re: K143178. Dated Jan. 30, 2015. 9 pages.
Feng, L. Probing lipid-protein interactions using lipid microarrays. Prostaglandins Other Lipid Mediat. 2005; 77(1-4):158-67.
Field, R.M., Realov, S. and Shepard, K.L., 2014. A 100 fps, time-correlated single-photon-counting-based fluorescence-lifetime imager in 130 nm CMOS. IEEE Journal of Solid-State Circuits, 49(4), pp. 867-880.
Forster. Experimentelle und theoretische Untersuchung des zwischenmolekularen Übergangs von Elektronenanregungsenergie. Zeitschrift für naturforschung A 4.5 1949: 321-327.
Foss, Robert D. et al. Effects of fixative and fixation time on the extraction and polymerase chain reaction amplification of RNA from paraffin-embedded tissue: comparison of two housekeeping gene mRNA controls. Diagnostic Molecular Pathology 3(3):148-155 (1994).
Fossum, E.R. and Hondongwa, D.B., 2014. A review of the pinned photodiode for CCD and CMOS image sensors. IEEE J. Electron Devices Soc., 2(3), pp. 33-43.
Gao et al. Unusual conformation of a 3'-thioformacetal linkage in a DNA duplex. J. Biomolecular NMR.34:17-34 (1994).
Ginzinger. Gene quantification using real-time quantitative PCR: an emerging technology hits the mainstream. Exp Hematol. 2002; 30(6): 503-12.

(56) References Cited

OTHER PUBLICATIONS

Giordano, et al. Distinct transcriptional profiles of adrenocortical tumors uncovered by DNA microarray analysis. Am J Pathol. 2003; 162(2):521-531.
Guatelli, John C. et al. Isothermal, In Vitro Amplification of Nucleic Acids by a Multienzyme Reaction Modeled After Retroviral Replication. Proceedings of the National Academy of Sciences 87(5):1874-1878 (1990).
Gunderson et al.: Decoding randomly ordered DNA arrays. Genome Research 14(5):870-877 (2004).
Hagan, A. K., & Zuchner, T. (2011). Lanthanide-based time-resolved luminescence immunoassays. Analytical and bioanalytical chemistry, 400(9), 2847-64.
Hall. Biosensors. Prentice-Hall. Englewood Cliffs, NJ. 1991. (Table of Contents only).
Han, M. et al. Quantum-dot-tagged microbeads for multiplexed optical coding of biomolecules. Nat Biotechnol 19(7):631-635 (2001).
Hassibi, Arjang et al. Multiplexed Identification, Quantification and Genotyping of Infectious Agents Using a Semiconductor Biochip. Nature biotechnology 36(8):1-13 (2018).
Hassibi, Arjang et al. Real-time DNA microarray analysis. Nucleic Acids Res. 37(20):e132, 1-12 (2009).
Hassibi. CMOS Biochips for Point-of-Care Molecular Diagnostics. Hot Chips—Aug. 2014. 32 pgs.
Hassibi, et al. A probabilistic model for inherent noise and systematic errors of microarrays. Proc of Workshop on Genomics Signal Processing and Statistics. 2005: 1-2.
Hassibi, et al. A Programmable 0.18-um CMOS Electrochemical Sensor Microarray for Biomolecular Detection. Sensors Journal, IEEE, Dec. 2006. vol. 6, Issue: 6: 1380-1388.
Hassibi, et al. A stochastic model and simulation algorithm for polymerase chain reaction (PCR) systems. Proc of Workshop on Genomics Signal Processing and Statistics. 2004: 1-4.
Hassibi, et al. Biological shot-noise and quantum-limited signal-to-noise ratio in affinity-based biosensors. J Appl Phys.; 97: 084701. pp. 1-10. (2005).
Hassibi, et al. Effects of Scaling on the SNR and Speed of Biosensors. Engineering in Medicine and Biology Society, 2004. IEMBS'04. 26th Annual International Conference of the IEEE. vol. 1. IEEE, 2004.
Hassibi, et al. On noise processes and limits of performance in biosensors.J. Appl. Phys. 102, 014909 (2007) (12 pages).
Hassibi. Integrated Microarrays. Ph.D. Thesis Stanford University, 2005 (142 pgs).
Held, et al. Modeling of DNA microarray data by using physical properties of hybridization. Proc Natl Acad Sci U S A. Jun. 24, 2003;100(13):7575-80. Epub Jun. 13, 2003.
Held, et al. Relationship between gene expression and observed intensities in DNA microarrays—a modeling study. Nucleic Acids Res. May 24, 2006;34(9):e70.
Horn et al. Oligonucleotides with alternating anionic and cationic phosphoramidate linkages: Synthesis and hybridization of stereo-uniform isomers. Tetrahedron Lett 37:743-746 (1996).
Howell, et al. iFRET: an improved fluorescence system for DNA-melting analysis. Genome Res. Sep. 2002;12(9):1401-7.
Huang, et al. A Single-Frame Superresolution Algorithm for Lab-on-a-Chip Lensless Microfluidic Imaging. IEEE Design & Test. Dec. 2015. 32(6):32-40. doi: 10.1109/MDAT.2015.2424418.
Huang, J-F, Zeng D-Z, Duan G-J, Shi Y, Deng G-H, Xia H, et al. (2015) Single-Tubed Wild-Type Blocking Quantitative PCR Detection Assay for the Sensitive Detection of Codon 12 and 13 KRAS Mutations. PLoS One 10(12): e0145698. https://doi.org/10.1371/journal.pone.0145698.
"Insulator (electricity)" from Wikipedia, the free encyclopedia. Printed on Dec. 13, 2018.
J. M. Shumaker et al., "Mutation Detection by Solid Phase Primer Extension," Human Mutation 7:346-354 (1996).
Jenkins et al. The Biosynthesis of Carbocyclic Nucleosides Chem Soc Re 24:169-176 (1995).
Jepsen, et al. Locked nucleic acid: a potent nucleic acid analog in therapeutics and biotechnology. Oligonucleotides. 2004;14(2):130-46.
Kesa, Gun, et al. Comparison of ELISpot and FluoroSpot in the analysis of swine flu-specific IgG and IgA secretion by in vivo activated human B cells. Cells 1.2: 27-34. (2012).
Khabzaoui, et al. A multicriteria genetic algorithm to analyze microarray data. In Evolutionary Computation, Jun. 2004. CEC2004. Congress on vol. 2, pp. 1874-1881. IEEE.
Lai et al. PrimRglo: A multiplexable quantitative real-time polymerase chain reaction system for nucleic acid detection. Analytical Biochemistry 422:89-95 (2012).
Lalkhen, et al. Clinical tests: sensitivity and specificity. Continuing Education in Anaesthesia, Critical Care & Pain. 2008. 8(6), 221-223.
Landegren, Ulf. Molecular Mechanics of Nucleic Acid Sequence Amplification. Trends in Genetics 9(6):199-204 (1993).
Lee et al., Seven-color, homogeneous detection of six PCR products. Biotechniques. 27(2):342-349 (1999).
Lee, Helen H. et al. Nucleic Acid Amplification Technologies: Application to Disease Diagnosis. Eaton Publishing (1997).
Letsinger et al. Cationic Oligonucleotides J Am Chem Soc 110:4470-4471 (1988).
Letsinger, et al. Hybridization of alternating cationic/anionic oligonucleotides to RNA segments. Nucleosides, Nucleotides & Nucleic Acids 13.6-7 (1994): 1597-1605.
Levine, "Semiempirical and Molecular-Mechanics Treatments of Molecules", Quantum Chemistry, 5th Ed., Prentice-Hall, New York, 1999, Chapter 16, pp. 626-692.
Levine et al. Active CMOS Array for Electrochemical Sensing of Biomolecules, IEEE 2007 Custom Integrated Circuits Conference (CICC), pp. 826-828 (2007).
Li, et al. Bead-Based Melting Analysis in Temperature-Graident Microchannels for Single Nucleotide Polymorphisms Detection. 17th International Conference on Miniaturized Systems for Chemistry and Life Sciences. Oct. 27-31, 2013. Freiburg, Germany. 3 pages.
Lipsky, et al. DNA melting analysis for detection of single nucleotide polymorphisms. Clin Chem. Apr. 2001;47(4):635-44.
Liu, et al., Biosensing based upon molecular confinement in metallic nanocavity arrays. Proceedins of SPIE 5703. Plasmonics in biology and medicine II, Mar. 31, 2005, pp. 99-106.
Liu, et al. TaqMan probe array for quantitative detection of DNA targets. Nucleic Acids Res. 2006; 34(1): e4. Published online Jan. 10, 2006.
Lizardi, et al. Exponential amplification of recombinant-RNA hybridization probes. Nature Biotechnology 6.10 (1988): 1197-1202.
Lockhart, et al. Multiplex metallica. Nat Biotechnol. Dec. 2001;19(12):1122-3.
Lund-Olesen, et al., Sensitive on-chip quantitative real-time PCR performed on an adaptable and robust platform. Biomed Microdevices. Dec. 2008; 10(6):769-776. doi: 10.1007/s10544-008-9189-0.
Lusic, Hrvoje, et al. Photochemical DNA Activation. Organic Letters, vol. 9, No. 10, 1903-1906 (2007).
M. Stanacevic, VLSI Potentiostat Array with Oversampling Gain Modulation for Wide-Range Neurotransmitter Sensing IEEE Transactions on Biomedical Circuits and Systems, vol. 1, No. 1, pp. 63-72 (2007) (Year: 2007).
Manickam, Arun. et al. A Fully Integrated CMOS Fluorescence Biochip for DNA and RNA Testing. IEEE Journal of solid-state circuits 52(11):2857-2870 (2017).
Manickam et al., "A CMOS Biosensor Array with 1024 3-Electrode Voltammetry Pixels and 93dB Dynamic Range," IEEE International Solid-State Circuits Conference, 2019, pp. 192-194.
Manickam, et al. A CMOS Electrochemical Impedance Spectroscopy (EIS) Biosensor Array. IEEE Trans Biomed Circuits Syst. Dec. 2010;4(6):379-90.
Marcy, et al. Innovative integrated system for real-time measurement of hybridization and melting on standard format microarrays. Biotechniques. Jun. 2008;44(7):913-20.
Margulies, Marcel. et al. Genome sequencing in microfabricated high-density picolitre reactors. Nature 437(7057):376-380 (2005).

(56) References Cited

OTHER PUBLICATIONS

Matsubara, et al. On-chip nanoliter-vol. multiplex TaqMan polymerase chain reaction from a single copy based on counting fluorescence released microchambers. Anal Chem. Nov. 1, 2004;76(21):6434-9.
Mayer, Gunter, et al. Biologically Active Molecules with a "Light Switch". Angewandte Chemie International Edition, vol. 45, 4900-4921 (2006).
Merrifield, R. B., "Solid-Phase Peptide Synthesis. III. An Improved Synthesis of Bradykinin," Biochemistry, vol. 3, 9, pp. 1385-1390, Sep. 1964.
Metzker, Michael L. Sequencing technologies—the next generation. Nature reviews genetics 11(1):31-46 (2010).
Meuzelaar, et al. DNA diagnostics by surface-bound melt-curve reactions. J Mol Diagn. Feb. 2007;9(1):30-41.
Michael, et al. Randomly Ordered Addressable High-Density Optical Sensor Arrays. Anal. Chem., 1998; 70(7): 1242-1248.
Mikkelsen et al.: Photolabile Linkers for Solid-Phase Synthesis. ACS Comb. Sci. 20(7):377-399 (2018).
Moore, E.G., Samuel, A.P. and Raymond, K.N., 2009. From antenna to assay: lessons learned in lanthanide luminescence. Accounts of chemical research, 42(4), pp. 542-552.
Nurari, K., Etienne-Cummings, R., Thakor, N. and Cauwenberghs, G., 2009. Which photodiode to use: A comparison of CMOS-compatible structures. IEEE sensors journal, 9(7), pp. 752-760.
Namsiyayam, et al., Advances in on-chip photodetection for applications in miniaturized genetic analysis systems, Journal ofv Micrornechanics and Microengineering vol. 14, issue 1, P81-90, Published Aug. 18, 2003.
Nanogen. A chip-based genetic detector for rapid identification of individuals. National institute of justice—Project No. 97-LB-VX-0004. Apr. 2006. 102 pgs.
Novak, et al., An integrated fluorescence detection system for lab-on-a-chip applications. Lab on a chip, royal society of chemistry. Nov. 2006; 7(1):27-29.
P. M. Levine, et al., Active CMOS Sensor Array for Electrochemical Biomolecular Detection, IEEE Journal of Solid-State Circuits, vol. 43, No. 8, pp. 1859-1871 (2008) (Year: 2009).
Pareek, Chandra shekhar et al. Sequencing Technologies and Genome Sequencing. Journal of Applied Genetics vol. 52,4: pp. 413-435 (2011).
Parikh, et al. A CMOS Image Sensor for DNA Microarray, IEEE Custom Integrated Circuit Conf., 2007 26: 821-824.
Paska, Csilla. et al. Effect of formalin, acetone, and RNAlater fixatives on tissue preservation and different size amplicons by real-time PCR from paraffin-embedded tissue. Diagnostic Molecular Pathology 13(4):234-240 (2004).
Pastinen et al., A system for specific, high-throughput genotyping by allele-specific primer extension on microarrays. Genome Research 7: 606-614 (Year: 2000).
Pastinen et al. Minisequencing: a specific tool for DNA analysis and diagnostics on oligonucleotide arrays. Genome Res. 7:606-614 (1997).
Paul, Natasha, et al. Hot Start PCR. Methods in Molecular Biology, vol. 630, 301-318 (2010).
Petersson, et al. A review of the parameter estimation problem of fitting positive exponential sums to empirical data. Technical Report IMa-TOM-1997-08; Available from Applied Mathematics and Computation. Feb. 2002. vol. 126: No. 1. 31-61.
Peukert, Stefan, et al. The Pivaloylglycol Anchor Group: A New Platform for a Photolabile Linker in Solid-Phase Synthesis. Journal of Organic Chemistry, vol. 63, 9045-9051 (1998).
Pfeffer, M., et al. Specific Detection of Chikungunya Virus Using a RT-PCR/Nested PCR Combination. Journal of Veterinary Medicine, vol. 49, 49-54 (2002).
Pierik, et al. Rapid genotyping of human papillomavirus by post-PCR array-based hybridization techniques. J Clin Microbiol. Apr. 2011;49(4):1395-402. Epub Feb. 16, 2011.
Plummer, et al. Silicon Technologies: Fundamentals, Practices, and Modeling. Prentice Hall Electronics and VLSI Series, 2000.
Pont-Kindon, et al. Direct molecular haplotyping by melting curve analysis of hybridization probes: beta 2-adrenergic receptor haplotypes as an example. Nucleic Acids Res. Jun. 3, 2005;33(10):e89.
Potrich, Cristina, et al., On chip micro-extraction and real-time PCR with integrated SPAD optical fluorescence detection for nucleic acid analysis. Lab-on-a-chip European Congress. 2011.
Pourmand, et al. Direct electrical detection of DNA synthesis. Proc Natl Acad Sci U S A. Apr. 25, 2006;103(17):6466-70. Epub Apr. 13, 2006.
Qin, Yu, et al. Sequencing by hybridization of long targets. PloS one 7.5: e35819. (2012).
Rant, et al. Switchable DNA interfaces for the highly sensitive detection of label-free DNA targets. Proc Natl Acad Sci U S A. Oct. 30, 2007;104(44):17364-9. Epub Oct. 19, 2007.
Reed, et al. High-resolution DNA melting analysis for simple and efficient molecular diagnostics. Pharmacogenomics. Jun. 2007;8(6):597-608.
Rehmna, et al. Immobilization of acrylamide-modified oligonucleotides by co-polymerization. Nucleic Acids Res. Jan. 15, 1999;27(2):649-55.
Reverter, et al. A rapid method for computationally inferring transcriptome coverage and microarray sensitivity. Bioinformatics. Jan. 1, 2005;21(1):80-9. Epub Aug. 12, 2004.
Ririe, et al. Product differentiation by analysis of DNA melting curves during the polymerase chain reaction. Anal Biochem. Feb. 15, 1997;245(2):154-60.
Rothberg, et al. An integrated semiconductor device enabling non-optical genome sequencing. Nature. Jul. 20, 2011;475(7356):348-52.
Rothberg et al., "The Development and Impact of 454 Sequencing," Nature Biotechnology, vol. 26, No. 10, pp. 1117-1124, Oct. 9, 2008.
Rothe, et al. Multi-target electrochemical biosensing enabled by integrated CMOS electronics. Journal of Micromechanics and Microengineering, 2011, 21(5), 054010.
S. Hwang, et al., CMOS Microelectrode Array for Electrochemical Lab-on-a-Chip Applications, IEEE Sensors Journal, vol. 9, No. 6, pp. 609-615 (2009) (Year: 2009).
Saiki, et al., Genetic analysis of amplified DNA with immobilized sequence-specific oligonucleotide probes. PNAS 86: 6230-6234 (Year: 1989).
Sakurai et al., "Real-Time Monitoring of DNA Polymerase Reactions by a Micro ISFET pH Sensor," Anal. Chem., 64, No. 17, pp. 1996-1997, Sep. 1, 1992.
Salm, et al. Ultralocalized thermal reactions in subnanoliter droplets-in-air. Proc Natl Acad Sci U S A. Feb. 26, 2013;110(9):3310-5.
Sambrook, et al. Molecular cloning: A Laboratory Manual. 2nd Edition. 1989. New York: Cold spring harbor laboratory press.
Sanchez, J Aquiles et al. Linear-after-the-exponential (Late)-PCR: an Advanced Method of Asymmetric PCR and Its Uses in Quantitative Real-time Analysis. Proceedings of the National Academy of Sciences of the United States of America vol. 101,7: pp. 1933-1938 (2004).
Sanghvi et al., "Carbohydrate Modifications in Antisense Research", Chapters2 & 3, developed from symposium sponsored by the Division of Carbohydrate Chemistry at the 207th National Meeting of the American Chemical Society, San Diego, CA, Mar. 13-17, 1994, 16 pgs.
Sanghvi et al., "Carbohydrate Modifications in Antisense Research", Chapters6 & 7, developed from symposium sponsored by the Division of Carbohydrate Chemistry at the 207th National Meeting of the American Chemical Society, San Diego, CA, Mar. 13-17, 1994, 21 pgs.
Savyon Diagnostics. Nano CHIP. www.nanochip400.com. NG Jun. 2010—VER1. 8pgs.
Schena, et al. Quantitative monitoring of gene expression patterns with a complementary DNA microarray. Science. Oct. 20, 1995;270(5235):467-70.
Schena. Microarray Analysis. Wiley-Liss: A John Wiley & Sons, Inc., Publication. 2003. Hoboken, New Jersey. (Table of contents only).
Scherf, et al. Letter from Uwe Scherf-S to Kristen Kanack re: K143178 Section 510(k). Department of Health & Human Services. Jan. 30, 2015. 9pgs.

(56) References Cited

OTHER PUBLICATIONS

Schienle, et al. A fully electronic DNA sensor with 128 positions and in-pixel A/D conversion. IEEE Journal of vol. 39, Issue 12, Dec. 2004 pp. 2438-2445.
Schwartz, D.E., Charbon, E. and Shepard, K.L., 2008. A single-photon avalanche diode array for fluorescence lifetime imaging microscopy. IEEE journal of solid-state circuits, 43(11), pp. 2546-2557.
Selvin, P.R., 2002. Principles and biophysical applications of lanthanide-based probes. Annual review of biophysics and biomolecular structure, 31(1), pp. 275-302.
Selvin, P.R., "Lanthanide-Labeled DNA", (2003) Topics in Fluorescence Spectroscopy, vol. 7: DNA Technology, Chapter 6, Kluwer Academic.
Seo, Min-Woong, et al,. A 10 ps time-resolution CMOS image sensor with two-tap true-CDS lock-in pixels for fluorescence lifetime imaging. IEEE Journal of soli-state circuits 51.1 (2015): 142-154.
Sharkey, DJ, Scalice ER, Christy KG Jr, Atwood SM, Daiss JL. Antibodies as thermolabile switches: high temperature triggering for the polymerase chain reaction. Biotechnology (N Y). May 1994;12(5):506-9. doi: 10.1038/nbt0594-506. PMID: 7764710.
Shendure, Jay, et al. Next-generation DNA sequencing. Nature biotechnology 26.10: 1135-1145. (2008).
Singh, et al. A CMOS-Microfluidic Chemiluminescence Contact Imaging Microsystem. IEEE Journal of Solid-State Circuits. Nov. 2012;47(11) 2822-33.
Singh et al. A Compact Parasitic-Insensitive Dual-Frequency AZ Modulated CMOS Capacitive Architecture, IEEE, pp. 242-245 (2010).
Singh, et al., CMOS biochips for hypothesis-driven DNA analysis. IEEE Biomedical circuits and systems conference. Oct. 2014.
Singh. High Dynamic Range CMOS-Integrated Biosensors. https://repositories.lib.utexas.edu/bitstream/handle/2152/29144/SINGH-DISSERTATION-2013.pdf?sequence=1. May 1, 2013. Accessed on Feb. 11, 2016. 189 pages.
Song, Yang, et al. Development of FRET assay into quantitative and high-throughput screening technology platforms for protein-protein interactions. Annals of biomedical engineering 39.4: 1224-1234. (2011).
Soon, et al. High Throughput Melting Curve Analysis in Monolithic Silicon-Based Microfluidic Device. 14th International Conference on Miniaturized Systems for Chemistry and Life Sciences. Oct. 3-7, 2010. Groningen, The Netherlands.
Sosnowski. A chip-based genetic detector for rapid identification of individuals. Document No. 213911. Award No. 1997-LB-XV-0004. Apr. 2006. 100 pages.
Stillman, et al. FAST slides: a novel surface for microarrays. Biotechniques. Sep. 2000;29(3):630-5.
Stimpson, et al. Real-time detection of DNA hybridization and melting on oligonucleotide arrays by using optical wave guides. Proc Natl Acad Sci U S A. Jul. 3, 1995;92(14):6379-83.
Stochastic Matrix, one page, 2013. Wolfram MathWorld. Obtained online on May 29, 2013.
Stolovitzky, et al. Efficiency of DNA replication in the polymerase chain reaction. Proc Natl Acad Sci USA. 1996; 93: 12947-52.
Stoughton. Applications of DNA microarrays in biology. Annu Rev Biochem. 2005;74:53-82.
Strategies for Attaching Oligonucleotides to Solid Supports. IDT—Integrated DNA Technologies:1-7 (2014).
Supplementary Information from Rothberg et al., An Integrated Semiconductor Device Enabling Non-Optical Genome Sequencing. Nature, 475, 348-352, Jul. 21, 2011.
Tang, et al. Simple and effective method for generating single-stranded DNA targets and probes. Biotechniques. Jun. 2006;40(6):759-63.
Tao, et al., Blocking oligo—a novel approach for improving chip-based DNA hybridization efficiency. Mol Cell Probes. Aug. 2003;17(4):197-202.
Temiz et al. Robust Microelectrodes Developed for Improved Stability in Electrochemical Characterization of Biomolecular Layers, IEEE Sensors 2010 Conference, pp. 1051-1055 (2010).
The definition for "ionic current". Printed on Oct. 20, 2021.
The definition for "photodiodes". Printed on Oct. 20, 2021.
The definition of "Electrical Impedance" from Wikipedia. Printed on Oct. 20, 2021.
Tijssen. Chapter 3 of Laboratory Techniques in Biochemistry and Molecular Biology: Hybridization with Nucleic Acid Probes, Part I. Theory and Nucleic Acid Preparation. Elsevier, N.Y. 1993.
Tijssen. Hybridization With Nucleic Acid Probes. Laboratory Techniques in Biochemistry and Molecular Biology 24:19-78 (1993).
Tijssen, Laboratory Techniques in Biochemistry and Molecular Biology-Hybridization with Nucleic Probes, Chapter 2: Overview of principles of hybridization and the strategy of nucleic acid assays. 19-78. (1993).
Tokuda, et al., A CMOS image sensor with optical and potential dual imaging function for on-chip bioscientific applications, Sensors and Actuators A: Physical, vol. 125, Issue 2, Jan. 10, 2006, pp. 273-280.
Tolley, et al. Single-chain polymorphism analysis in long QT syndrome using planar waveguide fluorescent biosensors. Anal Biochem. Apr. 15, 2003;315(2):223-37.
Tomlinson, et al. Influence of the length of target DNA overhang proximal to the array surface on discrimination of single-base mismatches on a 25-mer oligonucleotide array. BMC Res Notes. Apr. 17, 2014;7:251.
Tsuji et al. Development of a Time-Resolved Fluorometric Method for Observing Hybridization in Living Cells Using Fluorescence Resonance Energy Transfer. Biophysical Journal, Jul. 2001, 81:501-515.
Tu, et al. Quantitative noise analysis for gene expression microarray experiments. Proc Natl Acad Sci U S A. Oct. 29, 2002;99(22):14031-6. Epub Oct. 18, 2002.
U.S. Appl. No. 18/095,716 Notice of Allowance dated Oct. 21, 2025.
Van Der Veen, et al. Subspace-based signal analysis using singular value decomposition. Proceedings of the IEEE, 1993, 81(9), 1277-1308.
Van Kampen, Stochastic process in physics and chemistry, North-Holland, Amsterdam, 1981.
Vikalo, et al. A statistical model for microarrays, optimal estimation algorithms, and limits of performance. Signal Processing, IEEE Transactions on, 2006, 54(6), 2444-2455.
Vikalo, et al. Modeling and Estimation for Real-Time Microarrays. IEEE Journal of Selected Topics in Signal Processing, vol. 2, No. 3, 286-296 (2008).
Vikalo, et al. Optimal estimation of gene expression levels in microarrays. Presented at the IEEE Int. Workshop Genomic Signal Processing Statistics, Newport, RI, May 22-24, 2005.
Vikalo, et al. Proof of publication date of [Vikalo, et al. Optimal estimation of gene expression in microarrays.] as Mar. 5, 2005, one page, acquired from USPTO Library on Jun. 13, 2014.
Von Kiedrowski et al. Parabolic Growth of a Self-Replicating Hexadeoxy nucleotide Bearing a 3'-5'-Phosphaomidate Linkage. Angew. Chem. Int. Ed. Engl 30(4):423-426 (1991).
Walczak, et al., Miniaturized System for Real-Time PCR in Low-Cost Disposable LTCC Chip With Integrated Optical Waveguide. 12th international conference on miniaturized systems for chemistry and life sciences. 2008; 1078-1080.
Wang, et al. Estimation of the mutation rate during error-prone polymerase chain reaction. J Comput Biol. 2000; 7(1-2): 143-58.
Wilhelm, et al., Real-time polymerase chain reaction. Chembiochem, 2003;4:1120-1128.
Wittwer, et al. Continuous fluorescence monitoring of rapid cycle DNA amplification. Biotechniques. Jan. 1997;22(1):130-8.
Wong, Y. K., et al. Applications of digital PCR in precision medicine. Expert Review of Precision Medicine and Drug Development 2.3: 177-186. (2017).
You, et al., Measuring thermodynamic details of DNA hybridization using fluorescence, Biopolymers, vol. 95, 2011; pp. 472-486.
Young, Douglas D. et al. Activation and Deactivation of DNAzyme and Antisense Function with Light for the Photochemical Regula-

(56) References Cited

OTHER PUBLICATIONS tion of Gene Expression in Mammalian Cells. Journal of the American chemical society 132(17):6183-6193 (2010).
Young, Douglas D. et al. Light-triggered Polymerase Chain Reaction. Chemical Communications 8(4):462-464 (2008).
Yuan, J. and Wang, G., 2006. Lanthanide-based luminescence probes and time-resolved luminescence bioassays. TrAC Trends in Analytical Chemistry, 25(5), pp. 490-500.
Yuen, et al. Accuracy and calibration of commercial oligonucleotide and custom cDNA microarrays. Nucleic Acids Res. May 15, 2002;30(10):e48.
Zhang. Noisy Data with Outliers, one page, 1996. Obtained online on Feb. 9, 2013.
Zhu, et al. Multiplex asymmetric PCR-based oligonucleotide microarray for detection of drug resistance genes containing single mutations in Enterobacteriaceae. Antimicrob Agents Chemother. Oct. 2007;51(10):3707-13. Epub Jul. 23, 2007.
Zhu, et al. Protein chip technology. Current Opinion in Chemical Biology. 2003; 7: 55-63.

* cited by examiner

R = H (pHP)
R = OMe (HDMP)

R = H, R' = OMe (MCM)
R = H, R' = $NMe_2$ (DMACM)
R = Br, R' = OH (Bhc)

R = H (NI)
R = OMe (MNI)

$R_1 = R_2 = R_4 = H, R_3 = OH$
$R_1 = R_2 = R_4 = H, R_3 = NEt_2$
$R_1 = H, R_2 = R_4 = Br, R_3 = OH$
$R_1 = R_3 = OH, R_2 = R_4 = H$

R = H, R' = H (NB)
R = H, R' = Me (NPE)
R = H, R' = COOH (CNB)
R = OMe, R' = H (DMNB)
R = OMe, R' = $CF_3$ (DMNPT)
R = H, R' = $CF_3$ (NPT)

R = H, R' = H (NPP)
R = OMe, R' = Me (DMNPB)

SEQUENCE LISTING

```
Sequence total quantity: 13
SEQ ID NO: 1           moltype = DNA  length = 20
FEATURE                Location/Qualifiers
misc_feature           1..20
                       note = Description of Artificial Sequence: Synthetic
                        oligonucleotide
source                 1..20
                       mol_type = other DNA
                       organism = synthetic construct
SEQUENCE: 1
ctcggtcgtc caatatcgaa                                              20

SEQ ID NO: 2           moltype = DNA  length = 20
FEATURE                Location/Qualifiers
misc_feature           1..20
                       note = Description of Artificial Sequence: Synthetic
                        oligonucleotide
source                 1..20
                       mol_type = other DNA
                       organism = synthetic construct
SEQUENCE: 2
ctcggtcgtc caatatcgaa                                              20

SEQ ID NO: 3           moltype = DNA  length = 20
FEATURE                Location/Qualifiers
misc_feature           1..20
                       note = Description of Artificial Sequence: Synthetic
                        oligonucleotide
source                 1..20
                       mol_type = other DNA
                       organism = synthetic construct
SEQUENCE: 3
ctcggtcgtc caatatcgaa                                              20

SEQ ID NO: 4           moltype = DNA  length = 20
FEATURE                Location/Qualifiers
misc_feature           1..20
                       note = Description of Artificial Sequence: Synthetic
                        oligonucleotide
source                 1..20
                       mol_type = other DNA
                       organism = synthetic construct
SEQUENCE: 4
ctcggtcgtc caatatcgaa                                              20

SEQ ID NO: 5           moltype = DNA  length = 12
FEATURE                Location/Qualifiers
misc_feature           1..12
                       note = Description of Artificial Sequence: Synthetic
                        oligonucleotide
source                 1..12
                       mol_type = other DNA
                       organism = synthetic construct
SEQUENCE: 5
ctcggtcgtc ca                                                      12

SEQ ID NO: 6           moltype = DNA  length = 20
FEATURE                Location/Qualifiers
```

```
misc_feature            1..20
                        note = Description of Artificial Sequence: Synthetic
                         oligonucleotide
source                  1..20
                        mol_type = other DNA
                        organism = synthetic construct
SEQUENCE: 6
ctcggtcgtc caatatcgaa                                                   20

SEQ ID NO: 7            moltype = DNA  length = 14
FEATURE                 Location/Qualifiers
misc_feature            1..14
                        note = Description of Artificial Sequence: Synthetic
                         oligonucleotide
source                  1..14
                        mol_type = other DNA
                        organism = synthetic construct
SEQUENCE: 7
cgtccaatat cgaa                                                         14

SEQ ID NO: 8            moltype = DNA  length = 13
FEATURE                 Location/Qualifiers
misc_feature            1..13
                        note = Description of Artificial Sequence: Synthetic
                         oligonucleotide
source                  1..13
                        mol_type = other DNA
                        organism = synthetic construct
SEQUENCE: 8
gtccaatatc gaa                                                          13

SEQ ID NO: 9            moltype = DNA  length = 13
FEATURE                 Location/Qualifiers
misc_feature            1..13
                        note = Description of Artificial Sequence: Synthetic
                         oligonucleotide
source                  1..13
                        mol_type = other DNA
                        organism = synthetic construct
SEQUENCE: 9
accgttagga tgc                                                          13

SEQ ID NO: 10           moltype = DNA  length = 16
FEATURE                 Location/Qualifiers
misc_feature            1..16
                        note = Description of Artificial Sequence: Synthetic
                         oligonucleotide
source                  1..16
                        mol_type = other DNA
                        organism = synthetic construct
SEQUENCE: 10
gcatcctaac ggttaa                                                       16

SEQ ID NO: 11           moltype =   length =
SEQUENCE: 11
000

SEQ ID NO: 12           moltype = DNA  length = 13
FEATURE                 Location/Qualifiers
misc_feature            1..13
                        note = Description of Artificial Sequence: Synthetic
                         oligonucleotide
source                  1..13
                        mol_type = other DNA
                        organism = synthetic construct
SEQUENCE: 12
gcatcctaac ggt                                                          13

SEQ ID NO: 13           moltype = DNA  length = 16
FEATURE                 Location/Qualifiers
misc_feature            1..16
                        note = Description of Artificial Sequence: Synthetic
                         oligonucleotide
source                  1..16
                        mol_type = other DNA
                        organism = synthetic construct
SEQUENCE: 13
aataccgtta ggatgc                                                       16
```

PHOTO-TRIGGERED NUCLEIC ACID CONSTRUCTS AND METHODS FOR MOLECULAR DETECTION

CROSS REFERENCE

This application is a continuation-in-part application of U.S. application Ser. No. 18/962,240, filed Nov. 27, 2024, which is a continuation of U.S. application Ser. No. 18/606,640, filed Mar. 15, 2024, which is a continuation of U.S. application Ser. No. 18/226,710, filed Jul. 26, 2023, which is a continuation of U.S. application Ser. No. 18/077,958, filed Dec. 8, 2022, which is a continuation of U.S. application Ser. No. 17/732,247, filed Apr. 28, 2022, which is a continuation of U.S. application Ser. No. 16/840,773, filed Apr. 6, 2020, now U.S. Pat. No. 11,360,029, which is a continuation of International Application No. PCT/US2020/022830, filed Mar. 13, 2020, which claims the benefit of U.S. Provisional Patent Application No. 62/818,614, filed on Mar. 14, 2019; and is a continuation-in-part application of U.S. application Ser. No. 17/530,932, filed Nov. 19, 2021, which is a continuation of International Application No. PCT/US2020/033884, filed May 20, 2020, which claims the benefit of U.S. Provisional Patent Application No. 62/850,239, filed on May 20, 2019, each of which is entirely incorporated herein by reference

SEQUENCE LISTING

The instant application contains a Sequence Listing which has been submitted in XML format via EFS-Web and is hereby incorporated by reference in its entirety. Said XML copy, created Jul. 30, 2025, is named 42500-724a_501_SL.xml and is 16,842 bytes in size.

BACKGROUND

Nucleic acid (NA) tests are unique analytical techniques used to detect, quantify, and identify the genetic structure of specific sequences of deoxyribonucleic acid (DNA) or ribonucleic acid (RNA) molecules. NA tests have many applications and are widely used in both life-science research and molecular diagnostics. Independent of the application and the testing venue, the amount of genetic material (RNA or DNA copies) in the testing sample is typically very small and not directly detectable; therefore, it is very common to use physiochemical, biochemical, or enzymatic methods to enhance the generated target-specific signals to ensure more sensitive tests. Some of these methods utilize molecular amplification processes such as polymerase chain reaction (PCR) to increase the copy number of the target NA. Such tests are categorized and are widely known and are conventionally categorized as nucleic acid amplification tests (NAATs). In addition, methods of amplification include, for example: strand displacement amplification (SDA), and nucleic acid sequence based amplification (NASBA), and Rolling Circle Amplification (RCA).

NAATs methods have a variety of different performance criteria which include analytical sensitivity, specificity, limit of detection (LoD), quantification range, detection dynamic range (DDR), and turnaround time (TAT). Different applications call for different criteria and there are always tradeoffs, depending of the method used. For example, in infectious disease application, it is critical to accurately identify the presence or absence of the infecting pathogen in the clinical specimen. Therefore, one requires NAAT methods that offer LOD of a few organisms per test, while the quantification range is less critical as the patient treatment is less reliant on that information. On the other hand, in gene expression applications, the concentration of messenger RNA (mRNA) in the clinical sample is relatively large and DDR is much more important than LOD.

Today, there are variety of NAAT methods for NA detection which use specific enzymes, reagents, and temperature profiles to amplify and detect specific sequences. In this invention, we describe methods and molecular structures, that once included in specific NAAT methods, can improve their performance criteria.

Continuous wave (CW) fluorescence-based spectroscopy, adopted into both heterogeneous and homogenous biochemical assays, may be used in life science research as well as in-vitro diagnostics. End-point fluorescence-based detection methods for example, may be widely applied for detecting and/or monitoring capturing probe and analyte bindings in surface-based (solid-phase) biochemical assays. Generally, the analyte may contain a fluorophore construct, which may emit light when excited by an optical excitation source. The emission may occur at a longer wavelength than the excitation source. When the capturing probe is attached to a specific and/or addressable coordinate on the surface, analyte capturing may result in the generation of localized fluorescence signals; a phenomenon that can be detected by optical detection devices. Example optical detection devices may include charge-coupled device (CCD) or complementary metal-oxide semiconductor (CMOS) cameras.

Time-gated fluorescence (TGF) analysis is a variant of fluorescence spectroscopy that may be used in certain biochemical assays. Unlike CW fluorescence methods, in TGF, the excitation light may not be continuous and may be applied in a fraction of time only, i.e., it may be time-gated.

SUMMARY

In this invention, unique nucleic acid (NA) construct and methods are described that by their incorporation into molecular detection assays, one can improve the assay detection performance, broadly defined, and reduce the workflow complexity and its turnaround time.

Aspects of the present disclosure provide a reaction chamber, comprising: a NA construct comprising a photosensitive chemical moiety, wherein the NA construct is in a first molecular state, wherein the NA construct is configured to change to a second molecular state after exposure to a light; at least one reagent; and at least one enzyme; wherein the reaction chamber is configured to allow the light to reach the nucleic acid construct.

In some embodiments of aspects provided herein, the NA construct is an oligonucleotide primer or a probe. In some embodiments of aspects provided herein, the at least one enzyme is a polymerase, reverse transcriptase, a terminal transferase, an exonuclease, an endonuclease, a restriction enzyme, or a ligase. In some embodiments of aspects provided herein, the wherein the at least one reagent comprises one or more amplification reagents. In some embodiments of aspects provided herein, the method further comprises a target NA. In some embodiments of aspects provided herein, the enzyme is configured to catalyze a reaction associated with the target NA, the at least one reagent and the NA construct. In some embodiments of aspects provided herein, the NA construct in the first molecular state is configured to be active in the reaction. In some embodiments of aspects provided herein, the NA construct in the second molecular state is configured to be inactive in the reaction. In some embodiments of aspects provided herein, the NA construct in the first molecular state is configured to be inactive in the reaction. In some embodiments of aspects provided herein, the NA construct in the second molecular state is configured to be active in the reaction. In some embodiments of aspects provided herein, the method further comprising another NA construct comprising another photosensitive chemical moiety, wherein the another NA construct is in a third molecular state, wherein the another NA construct is configured to change to a fourth molecular state after exposure to another light. In some embodiments of aspects provided herein, the another light is the light. In some embodiments of aspects provided herein, the NA construct in the first molecular state is configured to be active in the reaction and another NA construct in the third molecular state is configured to be inactive in the reaction. In some embodiments of aspects provided herein, the NA construct in the second molecular state is configured to be inactive in the reaction and the another NA construct in the fourth molecular state is configured to be active in the reaction. In some embodiments of aspects provided herein, the NA construct in the first molecular state and the another NA construct in the third molecular state are configured to be active in the reaction. In some embodiments of aspects provided herein, the NA construct in the second molecular state and the other NA construct in the fourth molecular state are configured to be inactive in the reaction. In some embodiments of aspects provided herein, the NA construct in the first molecular state and the another NA construct in the third molecular state are configured to be inactive in the reaction.

In some embodiments of aspects provided herein, the NA construct in the second molecular state and the another NA construct in the fourth molecular state are configured to be active in the reaction. In some embodiments of aspects provided herein, the enzyme is the polymerase, the reaction is polymerase chain reaction, and the NA construct is the oligonucleotide primer. In some embodiments of aspects provided herein, the photosensitive chemical moiety locates at 3'-terminus, at 5'-terminus, or in the middle of the NA construct. In some embodiments of aspects provided herein, the NA construct further comprises an additional photosensitive chemical moiety. In some embodiments of aspects provided herein, the fifth molecular state is the first molecular state, and the sixth molecular state is the second molecular state. In some embodiments of aspects provided herein, the reaction chamber is a closed-tube reaction chamber.

Another aspect of the present disclosure provides a of conducting a reaction, comprising: activating a reaction chamber to conduct a reaction, the reaction chamber comprising: a nucleic acid construct comprising a photosensitive chemical moiety in a first molecular state; at least one reagent; and at least one enzyme; and activating a light to reach the nucleic acid construct in the reaction chamber, thereby changing the nucleic acid construct to a second molecular state.

In some embodiments of aspects provided herein, the NA construct is an oligonucleotide primer or a probe. In some embodiments of aspects provided herein, the at least one enzyme is a polymerase, reverse transcriptase, a terminal transferase, an exonuclease, an endonuclease, a restriction enzyme, or a ligase. In some embodiments of aspects provided herein, the at least one reagent comprises one or more amplification reagents. In some embodiments of aspects provided herein, the reaction chamber further comprises a target nucleic acid. In some embodiments of aspects provided herein, the enzyme catalyzes the reaction of the target nucleic acid with the at least one reagent and the nucleic acid construct. In some embodiments of aspects provided herein, the nucleic acid construct in the first molecular state is active in the reaction. In some embodiments of aspects provided herein, the nucleic acid construct in the first molecular state is inactive in the reaction. In some embodiments of aspects provided herein, the nucleic acid construct in the second molecular state is active in the reaction. In some embodiments of aspects provided herein, the reaction chamber further comprises another nucleic acid construct comprising another photosensitive chemical moiety in a third molecular state, wherein the another nucleic acid construct is configured to change to a fourth molecular state after exposure to another light. In some embodiments of aspects provided herein, the another light is the light, and wherein the activating the light activates the nucleic acid construct. In some embodiments of aspects provided herein, the method further comprises: activating the another light to reach the another nucleic acid construct. In some embodiments of aspects provided herein, the method further comprises: deactivating the nucleic acid construct in the reaction after the activating the light. In some embodiments of aspects provided herein, the method further comprises: activating the another nucleic acid construct after the activating the light or after the activating the another light. In some embodiments of aspects provided herein, the method further comprises: deactivating the another nucleic acid construct after the activating the light or the activating the another light. In some embodiments of aspects provided herein, the method further comprises: activating the nucleic acid construct in the reaction after the activating the light. In some embodiments of aspects provided herein, the method further comprises: deactivating the another nucleic acid construct after the activating the light or the activating the another light. In some embodiments of aspects provided herein, the method further comprises: activating the another nucleic acid construct after the activating the light or the activating the another light. In some embodiments of aspects provided herein, the reaction is extension, digest, transcription, terminal transfer, or ligation. In some embodiments of aspects provided herein, when conducting the reaction in the reaction chamber, no external reagents are added into the reaction chamber In some embodiments of aspects provided herein, when conducting the reaction in the reaction chamber, none of the nucleic acid construct, the enzyme is the polymerase, the reaction is a polymerase chain reaction, and the nucleic acid construct is the oligonucleotide primer. at least one reagent, or the at least one enzyme are removed from the reaction chamber. In some embodiments of aspects provided herein, the photosensitive chemical moiety locates at 3-terminus, at 5-terminus, or in the middle of the nucleic acid construct. In some embodiments of aspects provided herein, the nucleic acid construct further comprises an additional photosensitive chemical moiety. In some embodiments of aspects provided herein, the target nucleic acid comprises a major allele and a minor allele, and wherein the reaction is polymerase chain reaction. In some embodiments of aspects provided herein, the nucleic acid construct comprises a sequence complementary to the major allele. In some embodiments of aspects provided herein, the nucleic acid construct in the first molecular state is inactive in the polymerase chain reaction with regard to making an amplicon of the major allele. In some embodiments of aspects provided herein, the nucleic acid construct in the second molecular state is active in the polymerase chain reaction with regard to making the amplicon of the major allele. In some embodiments of aspects provided herein, the nucleic acid construct in the second molecular state is inactive in the polymerase chain reaction with regard to making the amplicon of the major allele. In some embodiments of aspects provided herein, the another nucleic acid construct is a primer for the minor allele, and the method further comprises producing amplicons of the minor allele before the activating the light.

Aspects of the present disclosure provide a nucleic acid construct, comprising: a) a plurality of nucleotides; and b) one or more photocleavable moieties; wherein each of the one or more photocleavable moieties is independently located: a) at 3'-terminus of the nucleic acid construct; b) at 5'-terminus of the nucleic acid construct; c) between the 3'-terminus and the 5'-terminaus; d) on or connected to a nucleobase; e) on or connected to a ribose; f) between and connected to two consecutive members of the plurality of nucleotides; or g) a combination thereof.

In some embodiments of aspects provided herein, the nucleic acid construct is configured to be inactive in a biochemical reaction, wherein the biochemical reaction is polymerase-catalyzed chain elongation, polymerase chain reaction (PCR), reverse transcription polymerase chain reaction (RT-PCR), ligation, terminal transferases extension, hybridizations, exonuclease digest, endonuclease digest, or restriction digest. In some embodiments of aspects provided herein, the nucleic acid construct is configured to form a nucleic acid molecule after photocleavage of the one or more photocleavable moieties, and wherein the nucleic acid molecule is configured to be active in the biochemical reaction. In some embodiments of aspects provided herein, the nucleic acid construct is a primer, and wherein the biochemical reaction is polymerase-catalyzed chain elongation. In some embodiments of aspects provided herein, the one or more photocleavable moieties are located at the 3'-terminus. In some embodiments of aspects provided herein, each of the one or more photocleavable moieties is independently located between the 3'-terminus and the 5'-terminaus and on a selected nucleobase. In some embodiments of aspects provided herein, each of the one or more photocleavable moieties is independently located between the 3'-terminus and the 5'-terminaus and between the two consecutive members of the plurality of nucleotides. In some embodiments of aspects provided herein, the 3'-terminus is configured to be inactive in the biochemical reaction. In some embodiments of aspects provided herein, the nucleic acid construct comprises a first nucleic acid section and a second nucleic acid section complementary to the first nucleic acid section, wherein the nucleic acid construct is configured to form a hairpin structure. In some embodiments of aspects provided herein, the first nucleic acid section and the second nucleic acid section do not comprise the one or more photocleavable moieties.

Aspects of the present disclosure provide a method of conducting the polymerase-catalyzed chain elongation using the nucleic acid construct of the present disclosure, comprising: a) providing a reaction mixture comprising the nucleic acid construct, at least one template nucleic acid molecule, a polymerase, wherein the nucleic acid construct has sequence complementary with the template nucleic acid molecule; b) subjecting the reaction mixture to conditions for the polymerase-catalyzed chain elongation; and c) radiating the reaction mixture or the nucleic acid construct with photons of light, thereby performing the polymerase-catalyzed chain elongation.

In some embodiments of aspects provided herein, the subjecting in b) does not enable the performing in c). In some embodiments of aspects provided herein, the nucleic acid construct remains intact in the reaction mixture before the radiating in c). In some embodiments of aspects provided herein, the method further comprises: in c), cleaving the one or more photocleavable moieties. In some embodiments of aspects provided herein, the method further comprises: in c), forming the nucleic acid molecule. In some embodiments of aspects provided herein, the performing in c) comprises using the nucleic acid molecule formed in c) after the radiating as a primer for the polymerase-catalyzed chain elongation. In some embodiments of aspects provided herein, the reaction mixture further comprises another primer, wherein the another primer is active in the polymerase-catalyzed chain elongation. In some embodiments of aspects provided herein, the another primer is active in the polymerase-catalyzed chain elongation before the radiating in c). In some embodiments of aspects provided herein, the polymerase-catalyzed chain elongation in b) produces an amplicon comprising the another primer. In some embodiments of aspects provided herein, the polymerase-catalyzed chain elongation is a quantitative polymerase chain reaction (Q-PCR), the method further comprises: in c), 1) performing the polymerase-catalyzed chain elongation on two or more nucleotide sequences in the presence of the nucleic acid construct of the present disclosure to produce two or more amplicons in a fluid; 2) providing an array comprising a solid surface with a plurality of nucleic acid probes at independently addressable locations, the array configured to contact the fluid; and 3) measuring hybridization of the two or more amplicons to two or more nucleic acid probes of the plurality of nucleic acid probes while the fluid is in contact with the array to obtain an amplicon hybridization measurement, wherein the amplicons comprise a quencher. In some embodiments of aspects provided herein, the polymerase-catalyzed chain elongation is a quantitative polymerase chain reaction (Q-PCR), the method further comprises: in c), 1) providing an array comprising a solid support having a surface and a plurality of different probes, the plurality of different probes immobilized to the surface at different addressable locations, each addressable location comprising a fluorescent moiety; 2) performing PCR amplification on a sample comprising a plurality of nucleotide sequences; the PCR amplification carried out in a fluid, wherein: (i) the nucleic acid construct of the present disclosure is a PCR primer for each nucleic acid sequence and comprises a quencher; and (ii) the fluid is in contact with the plurality of different probes, wherein amplicons produced in the PCR amplification hybridize with the plurality of probes, thereby quenching signal from the fluorescent moiety; 3) detecting the signal from the fluorescent moiety at each of the addressable locations over time; 4) using the signal detected over time and determining an amount of the amplicons in the fluid; and 5) using the amount of the amplicons in the fluid to determine an amount of the nucleotide sequences in the sample. In some embodiments of aspects provided herein, the polymerase-catalyzed chain elongation is a quantitative polymerase chain reaction (Q-PCR), the method further comprises: in c): 1) providing the reaction mixture comprising a nucleic acid sample containing at least one template nucleic acid molecule, a primer pair and a polymerase, wherein the primer pair has sequence complementarity with the template nucleic acid molecule, and wherein the primer pair comprises a limiting primer and an excess primer, wherein at least one of the limiting primer and the excess primer is the nucleic acid construct of the present disclosure; 2) subjecting the reaction mixture to the Q-PCR under conditions that are sufficient to yield at least one target nucleic acid molecule as an amplification product of the template nucleic acid molecule and the limiting primer, which at least one target nucleic acid molecule comprises the limiting primer; 3) bringing the reaction mixture in contact with a sensor array having (i) a substrate comprising a plurality of probes immobilized to a surface of the substrate at different individually addressable locations, wherein the probes have sequence complementarity with the limiting primer and are capable of capturing the limiting primer, and (ii) an array of detectors configured to detect at least one signal from the addressable locations, wherein the at least one signal is indicative of the limiting primer binding with an individual probe of the plurality of probes; 4) using the array of detectors to detect the at least one signal from one or more the addressable locations at multiple time points during the nucleic acid amplification reaction; and 5) detecting the target nucleic acid molecule based on the at least one signal indicative of the limiting primer binding with the individual probe of the plurality of probes.

Aspects of the present disclosure provides a system for assaying at least one target nucleic acid molecule using the nucleic acid construct of the present disclosure, comprising: 1) a reaction chamber comprising a reaction mixture comprising a nucleic acid sample containing at least one template nucleic acid molecule, a primer pair that has sequence complementary to the template nucleic acid molecule, and a polymerase, wherein the primer pair comprises a limiting primer and an excess primer, wherein at least one of the limiting primer and the excess primer is the nucleic acid construct of the present disclosure, wherein the reaction chamber comprising the reaction mixture is configured to facilitate a nucleic acid amplification reaction on the reaction mixture to yield at least one target nucleic acid molecule as an amplification product of the template nucleic acid; 2) a sensor array comprising (i) a substrate comprising a plurality of probes immobilized to a surface of the substrate at different individually addressable locations, wherein the probes have sequence complementarity with the limiting primer and are capable of capturing the limiting primer; and (ii) an array of detectors configured to detect at least one signal from the addressable locations, wherein the at least one signal is indicative of the limiting primer binding with an individual probe of the plurality of probes; and 3) a computer processor coupled to the sensor array and programmed to (i) subject the reaction mixture to the nucleic acid amplification reaction, and (ii) detect the at least one signal from one or more of the addressable locations at multiple time points during the nucleic acid amplification reaction.

Aspects of the present disclosure provides nucleic acid construct, comprising: a) a plurality of nucleotides; and b) one or more photocleavable moieties; wherein each of the one or more photocleavable moieties is independently located: a) between 3'-terminus of the nucleic acid construct and 5'-terminaus of the nucleic acid construct; b) on or connected to a nucleobase; c) on or connected to a ribose; d) between and connected to two consecutive members of the plurality of nucleotides; or e) a combination thereof.

In some embodiments of aspects provided herein, the nucleic acid construct is configured to be active in a biochemical reaction, wherein the biochemical reaction is polymerase-catalyzed chain elongation, polymerase chain reaction (PCR), reverse transcription polymerase chain reaction (RT-PCR), ligation, terminal transferases extension, hybridizations, exonuclease digest, endonuclease digest, or restriction digest. In some embodiments of aspects provided herein, the nucleic acid construct is configured to form a nucleic acid molecule after photocleavage of the one or more photocleavable moieties, and wherein the nucleic acid molecule is inactive in the biochemical reaction. In some embodiments of aspects provided herein, the nucleic acid construct is configured to form a nucleic acid molecule near after photocleavage of the one or more photocleavable moieties, and wherein the nucleic acid molecule is active in the biochemical reaction, wherein the nucleic acid molecule locates near the 3'-terminus. In some embodiments of aspects provided herein, the nucleic acid construct is a primer, and wherein the biochemical reaction is polymerase-catalyzed chain elongation. In some embodiments of aspects provided herein, each of the one or more photocleavable moieties is independently located between the 3'-terminus and the 5'-terminaus and on a selected nucleobase. In some embodiments of aspects provided herein, the nucleic acid construct is configured to form a hairpin structure in the absence of the one or more photocleavable moieties, thereby rendered inactive as the primer in the absence of the one or more photocleavable moieties. In some embodiments of aspects provided herein, each of the one or more photocleavable moieties is independently located between the 3'-terminus and the 5'-terminaus and between the two consecutive members of the plurality of nucleotides. In some embodiments of aspects provided herein, the nucleic acid construct comprise a first sequence complimentary to a template nucleic acid molecule, and wherein the first sequence locates at or near the 3'-terminus. In some embodiments of aspects provided herein, the nucleic acid construct further comprises a second sequence complimentary to the template nucleic acid molecule, wherein the second sequence locates at or near the 5'-terminus, and wherein at least one of the one or more photocleavable moieties locates between the first sequence and the second sequence. In some embodiments of aspects provided herein, the one or more photocleavable moieties is separated from the first sequence and/or the second sequence by at least one nucleotide. In some embodiments of aspects provided herein, the nucleic acid construct is configured to form a hairpin loop between the first sequence and the second sequence when both the first sequence and the second sequence hybridize with the template nucleic acid molecule. In some embodiments of aspects provided herein, the second sequence comprises connects with a 5' to 5' linkage to rest of the nucleic acid construct, and wherein the second sequence is configured to be non-extensible in the polymerase-catalyzed chain elongation.

Aspects of the present disclosure provide a method of conducting the polymerase-catalyzed chain elongation using the nucleic acid construct of the present disclosure, comprising: a) providing a reaction mixture comprising the nucleic acid construct, the template nucleic acid molecule, a polymerase, wherein the nucleic acid construct comprises at least the first sequence; b) subjecting the reaction mixture to conditions for the polymerase-catalyzed chain elongation, thereby performing the polymerase-catalyzed chain elongation; and c) radiating the reaction mixture or the nucleic acid construct with photons of light, thereby stopping the polymerase-catalyzed chain elongation.

In some embodiments of aspects provided herein, the method further comprises: in c), cleaving the one or more photocleavable moieties. In some embodiments of aspects provided herein, the method further comprises: in c), forming the nucleic acid molecule after the radiating, wherein the nucleic acid molecule dissociate from the template nucleic acid molecule. In some embodiments of aspects provided herein, the nucleic acid molecule forms a hairpin structure, and wherein the hairpin structure comprises at least part of the first sequence. In some embodiments of aspects provided herein, the nucleic acid molecule comprises the first sequence.

Aspects of the present disclosure provide a method of conducting a light-enabled nested polymerase chain reaction (PCR), comprising: a) providing a reaction mixture comprising a first primer pair, a second primer pair, a template nucleic acid molecule comprising an inner nucleic acid sequence, and a polymerase, wherein each member of the first primer pair is independently the nucleic acid construct of the present disclosure, wherein each member of the second primer pair is independently the nucleic acid construct of the present disclosure, wherein the inner nucleic acid sequence is nested within the template nucleic acid molecule; b) subjecting the reaction mixture to conditions for a first chain elongation using the first primer pair to amplify the template nucleic acid molecule, thereby forming amplicons of the template nucleic acid or a complementary sequence of the template nucleic acid molecule; and c) radiating the reaction mixture with photons of light, thereby deactivating the first primer pair and stopping the first elongation, activating the second primer pair and starting a second chain elongation using the activated second primer pair, and forming amplicons of the inner nucleic acid sequence or complementary sequence of the inner nucleic acid sequence, wherein a)-c) are conducted in a closed tube fashion.

In some embodiments of aspects provided herein, the light enabled PCR is a quantitative polymerase chain reaction (Q-PCR), the method further comprises: 1) performing the light enabled PCR on two or more nucleotide sequences in the presence of the first primer pair and second primer pair to produce two or more amplicons in a fluid; 2) providing an array comprising a solid surface with a plurality of nucleic acid probes at independently addressable locations, the array configured to contact the fluid; and 3) measuring hybridization of the two or more amplicons to two or more nucleic acid probes of the plurality of nucleic acid probes while the fluid is in contact with the array to obtain an amplicon hybridization measurement, wherein the amplicons comprise a quencher.

In some embodiments of aspects provided herein, the light enabled PCR is a quantitative polymerase chain reaction (Q-PCR), the method further comprises: 1) providing an array comprising a solid support having a surface and a plurality of different probes, the plurality of different probes immobilized to the surface at different addressable locations, each addressable location comprising a fluorescent moiety; 2) performing PCR amplification on a sample comprising a plurality of nucleotide sequences; the PCR amplification carried out in a fluid, wherein: (i) each of the first pair of primers and the second pair of primer for each nucleic acid sequence comprises a quencher; and (ii) the fluid is in contact with the plurality of different probes, wherein amplicons produced in the PCR amplification hybridize with the plurality of probes, thereby quenching signal from the fluorescent moiety; 3) detecting the signal from the fluorescent moiety at each of the addressable locations over time; 4) using the signal detected over time and determining an amount of the amplicons in the fluid; and 5) using the amount of the amplicons in the fluid to determine an amount of the nucleotide sequences in the sample. In some embodiments of aspects provided herein, the light enabled PCR is a quantitative polymerase chain reaction (Q-PCR), the method further comprises: 1) providing the reaction mixture comprising a nucleic acid sample containing at least one template nucleic acid molecule, a primer pair and a polymerase, wherein the primer pair has sequence complementarity with the template nucleic acid molecule, and wherein the primer pair comprises a limiting primer and an excess primer, wherein at least one of the limiting primer and the excess primer is the nucleic acid construct of the present disclosure; 2) subjecting the reaction mixture to the Q-PCR under conditions that are sufficient to yield at least one target nucleic acid molecule as an amplification product of the template nucleic acid molecule and the limiting primer, which at least one target nucleic acid molecule comprises the limiting primer; 3) bringing the reaction mixture in contact with a sensor array having (i) a substrate comprising a plurality of probes immobilized to a surface of the substrate at different individually addressable locations, wherein the probes have sequence complementarity with the limiting primer and are capable of capturing the limiting primer, and (ii) an array of detectors configured to detect at least one signal from the addressable locations, wherein the at least one signal is indicative of the limiting primer binding with an individual probe of the plurality of probes; 4) using the array of detectors to detect the at least one signal from one or more the addressable locations at multiple time points during the nucleic acid amplification reaction; and 5) detecting the target nucleic acid molecule based on the at least one signal indicative of the limiting primer binding with the individual probe of the plurality of probes.

Aspects of the present disclosure provides a nucleic acid construct, comprising: a) a plurality of nucleotides; and b) one or more photocleavable moieties; wherein each of the one or more photocleavable moieties is independently located: a) between 3'-terminus of the nucleic acid construct and 5'-terminaus of the nucleic acid construct; b) on or connected to a nucleobase; c) on or connected to a ribose; d) between and connected to two consecutive members of the plurality of nucleotides; or e) a combination thereof.

In some embodiments of aspects provided herein, the nucleic acid construct is a probe, and wherein the nucleic acid construct is configured to be inactive in hybridization with a target nucleic acid molecule. In some embodiments of aspects provided herein, the nucleic acid construct is configured to form a nucleic acid molecule after photocleavage of the one or more photocleavable moieties, and wherein the nucleic acid molecule is configured to be active in the hybridization with the target nucleic acid molecule. In some embodiments of aspects provided herein, the nucleic acid construct comprises one free end. In some embodiments of aspects provided herein, the nucleic acid construct comprises an immobilized end or an end that is non-extensible in a polymerase-catalyzed chain elongation. In some embodiments of aspects provided herein, each of the one or more photocleavable moieties is independently located between the 3'-terminus and the 5'-terminaus and on a selected nucleobase, wherein the selected nucleobase is configured to hybridize with the target nucleic acid molecule in absence of the one or more photocleavable moieties. In some embodiments of aspects provided herein, each of the one or more photocleavable moieties is independently located between the 3'-terminus and the 5'-terminaus and between the two consecutive members of the plurality of nucleotides. In some embodiments of aspects provided herein, the nucleic acid construct comprises a first nucleic acid section and a second nucleic acid section complementary to the first nucleic acid section, wherein the nucleic acid construct is configured to form a hairpin structure. In some embodiments of aspects provided herein, the first nucleic acid section and the second nucleic acid section do not comprise the one or more photocleavable moieties.

Aspects of the present disclosure provide a method of conducting the hybridization using the nucleic acid construct of the present disclosure, comprising: a) providing a reaction mixture comprising the nucleic acid construct, and the target nucleic acid molecule; b) subjecting the reaction mixture to conditions for the hybridization; and c) radiating the reaction mixture or the nucleic acid construct with photons of light, thereby performing the hybridization.

In some embodiments of aspects provided herein, the subjecting in b) does not enable the performing in c). In some embodiments of aspects provided herein, the nucleic acid construct remains intact in the reaction mixture before the radiating in c). In some embodiments of aspects provided herein, the method further comprises: in c), cleaving the one or more photocleavable moieties. In some embodiments of aspects provided herein, the method further comprises: in c), forming the nucleic acid molecule. In some embodiments of aspects provided herein, the radiating breaks the hairpin structure of the nucleic acid construct and forms the nucleic acid molecule.

Aspects of the present disclosure provide nucleic acid construct, comprising: a) a plurality of nucleotides; and b) one or more photocleavable moieties; wherein each of the one or more photocleavable moieties is independently located: a) between 3'-terminus of the nucleic acid construct and 5'-terminaus of the nucleic acid construct; b) on or connected to a nucleobase; c) on or connected to a ribose; d) between and connected to two consecutive members of the plurality of nucleotides; or e) a combination thereof.

In some embodiments of aspects provided herein, the nucleic acid construct is a probe, and wherein the nucleic acid construct is configured to be active in hybridization with a target nucleic acid molecule. In some embodiments of aspects provided herein, the nucleic acid construct is configured to form a nucleic acid molecule after photocleavage of the one or more photocleavable moieties, and wherein the nucleic acid molecule is configured to be inactive in the hybridization with the target nucleic acid molecule. In some embodiments of aspects provided herein, the nucleic acid construct comprises one free end. In some embodiments of aspects provided herein, the nucleic acid construct comprises an immobilized end or an end that is non-extensible in a polymerase-catalyzed chain elongation. In some embodiments of aspects provided herein, each of the one or more photocleavable moieties is independently located between the 3'-terminus and the 5'-terminaus and between the two consecutive members of the plurality of nucleotides. In some embodiments of aspects provided herein, each of the one or more photocleavable moieties is independently located between the 3'-terminus and the 5'-terminaus and on a selected nucleobase, wherein the selected nucleobase is configured to hybridize with another nucleobase of the nucleic acid construct in absence of the one or more photocleavable moieties. In some embodiments of aspects provided herein, the nucleic acid construct comprises a first nucleic acid section and a second nucleic acid section complementary to the first nucleic acid section, wherein the nucleic acid construct is configured to form a hairpin structure in absence of the one or more photocleavable moieties. In some embodiments of aspects provided herein, the first nucleic acid section or the second nucleic acid section do comprise the one or more photocleavable moieties.

Aspects of the present disclosure provide a method of conducting the hybridization using the nucleic acid construct of the present disclosure, comprising: a) providing a reaction mixture comprising the nucleic acid construct, and the target nucleic acid molecule; b) subjecting the reaction mixture to conditions for the hybridization; and c) radiating the reaction mixture or the nucleic acid construct with photons of light, thereby stopping the hybridization.

In some embodiments of aspects provided herein, the method further comprises: in c), cleaving the one or more photocleavable moieties. In some embodiments of aspects provided herein, the method further comprises: in c), forming the nucleic acid molecule. In some embodiments of aspects provided herein, the method further comprises: in c), forming the hairpin structure in the nucleic acid molecule. In some embodiments of aspects provided herein, the method further comprises conducting a polymerase-catalyzed chain elongation, wherein: 1) the reaction mixture further comprises a polymerase and a primer, wherein in b) the nucleic acid construct hybridize with the target nucleic acid molecule in b); 2) subjecting the reaction mixture in b) to conditions for the polymerase-catalyzed chain elongation using the primer, wherein the polymerase-catalyzed chain elongation stalls at or near a position from which the nucleic acid construct forms a duplex with the target nucleic acid molecule; and 3) after the radiating in c), removing the duplex and exposing a single-stranded sequence previously hybridized with the nucleic acid construct, thereby allowing polymerase-catalyzed chain elongation to continue and elongate through the single-stranded sequence. In some embodiments of aspects provided herein, the polymerase-catalyzed chain elongation is a quantitative polymerase chain reaction (Q-PCR), the method further comprises: 1) performing the polymerase-catalyzed chain elongation on two or more nucleotide sequences comprising the target nucleic acid molecule in the presence of the nucleic acid construct of the present disclosure, thereby producing two or more amplicons in a fluid; 2) providing an array comprising a solid surface with a plurality of nucleic acid probes at independently addressable locations, the array configured to contact the fluid; and 3) measuring hybridization of the two or more amplicons to two or more nucleic acid probes of the plurality of nucleic acid probes while the fluid is in contact with the array to obtain an amplicon hybridization measurement, wherein the amplicons comprise a quencher. In some embodiments of aspects provided herein, the polymerase-catalyzed chain elongation is a quantitative polymerase chain reaction (Q-PCR), the method further comprises: 1) providing an array comprising a solid support having a surface and a plurality of different probes, the plurality of different probes immobilized to the surface at different addressable locations, each addressable location comprising a fluorescent moiety; 2) performing PCR amplification on a sample comprising a plurality of nucleotide sequences comprising the target nucleic acid molecule; the PCR amplification carried out in a fluid comprising the nucleic acid construct of the present disclosure, wherein: (i) a PCR primer for each nucleic acid sequence comprises a quencher; and (ii) the fluid is in contact with the plurality of different probes, wherein amplicons produced in the PCR amplification hybridize with the plurality of probes, thereby quenching signal from the fluorescent moiety; wherein the radiating occurs during the PCR; 3) detecting the signal from the fluorescent moiety at each of the addressable locations over time; 4) using the signal detected over time and determining an amount of the amplicons in the fluid; and 5) using the amount of the amplicons in the fluid to determine an amount of the nucleotide sequences in the sample. In some embodiments of aspects provided herein, the polymerase-catalyzed chain elongation is a quantitative polymerase chain reaction (Q-PCR), the method further comprises: 1) providing the reaction mixture comprising a nucleic acid sample containing at least one template nucleic acid molecule comprising the target nucleic acid molecule, a primer pair and a polymerase, wherein the primer pair has sequence complementarity with the at least one template nucleic acid molecule, wherein the primer pair comprises a limiting primer and an excess primer, wherein the reaction mixture further comprises at least one of the nucleic acid construct of the present disclosure; 2) subjecting the reaction mixture to the Q-PCR under conditions that are sufficient to yield an amplification product of the template nucleic acid molecule and the limiting primer, which amplicon comprises the limiting primer; 3) bringing the reaction mixture in contact with a sensor array having (i) a substrate comprising a plurality of probes immobilized to a surface of the substrate at different individually addressable locations, wherein the probes have sequence complementarity with the limiting primer and are capable of capturing the limiting primer, and (ii) an array of detectors configured to detect at least one signal from the addressable locations, wherein the at least one signal is indicative of the limiting primer binding with an individual probe of the plurality of probes; 4) using the array of detectors to detect the at least one signal from one or more the addressable locations at multiple time points during the nucleic acid amplification reaction; and 5) detecting the target nucleic acid molecule based on the at least one signal indicative of the limiting primer binding with the individual probe of the plurality of probes.

Aspects of the present disclosure provide a nucleic acid construct, comprising: a) a plurality of nucleotides; and b) one or more photocleavable moieties at 5'-terminus of the nucleic acid construct, wherein the 5'-terminus of the nucleic acid construct is configured to be resistant to cleavage by an exonuclease; wherein each of the one or more photocleavable moieties is independently located: a) on or connected to a nucleobase; b) on or connected to a ribose; or c) a combination thereof.

In some embodiments of aspects provided herein, the nucleic acid construct is configured to form a nucleic acid molecule after photocleavage of the one or more photocleavable moieties, and wherein the nucleic acid molecule is not resistant to the cleavage by the exonuclease. In some embodiments of aspects provided herein, the nucleic acid construct is configured to hybridize to a target nucleic acid molecule and remain resistant to the cleavage by the exonuclease.

Aspects of the present disclosure provide method of conducting a polymerase-catalyzed chain elongation, comprising: a) providing a reaction mixture comprising the nucleic acid construct of the present disclosure, the target nucleic acid molecule, a primer, a polymerase, wherein the target nucleic acid molecule comprises a nucleic acid sequence complimentary to the nucleic acid construct; b) subjecting the reaction mixture to conditions for the polymerase-catalyzed chain elongation of the primer using the target nucleic acid molecule as a template; and c) radiating the reaction mixture or the nucleic acid construct with photons of light; thereby performing the polymerase-catalyzed chain elongation through the nucleic acid sequence.

In some embodiments of aspects provided herein, the subjecting in b) does not enable the performing in c). In some embodiments of aspects provided herein, the nucleic acid construct remains intact in the reaction mixture before the radiating in c). In some embodiments of aspects provided herein, the method further comprises: in c), cleaving the one or more photocleavable moieties. In some embodiments of aspects provided herein, the method further comprises: in c), forming the nucleic acid molecule. In some embodiments of aspects provided herein, the performing in c) comprises digesting the nucleic acid molecule formed in c) after the radiating by the exonuclease, wherein the polymerase is the exonuclease. In some embodiments of aspects provided herein, the performing in c) comprises extending the primer through the nucleic acid sequence after the radiating and/or after the digesting.

Aspects of the present disclosure provide a method of conducting the polymerase-catalyzed chain elongation using the nucleic acid construct, comprising: a) providing a reaction mixture comprising the nucleic acid construct, the template nucleic acid molecule, a polymerase, wherein the nucleic acid construct comprises at least the first sequence located at or near the 3'-terminus and the second sequence located at or near the 5'-terminus, wherein the first sequence is active in the polymerase-catalyzed chain elongation; b) subjecting the reaction mixture to conditions for the polymerase-catalyzed chain elongation, thereby performing the polymerase-catalyzed chain elongation and producing a plurality of first amplicons comprising sequences of both the first sequence and the second sequence or complementary sequence to both the first sequence and the second sequence; and c) radiating the reaction mixture or the nucleic acid construct with photons of light, thereby cleaving the nucleic acid construct, and producing a plurality of second amplicons comprising the first sequence or complementary sequence to the first sequence, with the proviso that each of the plurality of second amplicons does not contain the second sequence or complementary sequence to the second sequence.

Aspects of the present disclosure provide a method of conducting a polymerase-catalyzed chain elongation using at least one of the nucleic acid construct of the present disclosure, comprising: a) providing a reaction mixture comprising the nucleic acid construct, the template nucleic acid molecule, a polymerase; b) subjecting the reaction mixture to conditions for the polymerase-catalyzed chain elongation; and c) radiating the reaction mixture or the nucleic acid construct with photons of light; thereby performing the polymerase-catalyzed chain elongation, wherein the polymerase-catalyzed chain elongation is PCR, RT-PCR, QPCR or qRT-PCR.

In some embodiments of aspects provided herein, the at least one of the nucleic acid construct is a primer for the PCR, RT-PCR, QPCR or qRT-PCR. In some embodiments of aspects provided herein, the at least one of the nucleic acid construct is a solution-phase probe for the PCR, RT-PCR, QPCR or qRT-PCR. In some embodiments of aspects provided herein, the at least one of the nucleic acid construct is an immobilized probe for the PCR, RT-PCR, QPCR or qRT-PCR. In some embodiments of aspects provided herein, the at least one of the nucleic acid construct are more than two nucleic acid constructs, and are a combination of a primer for the PCR, RT-PCR, QPCR or qRT-PCR, a solution-phase probe for the PCR, RT-PCR, QPCR or qRT-PCR, and an immobilized probe for the PCR, RT-PCR, QPCR or qRT-PCR, each of which is independently selected.

Aspects of the present disclosure provide an automated microarray system of quantifying microarray data comprising: a) a solid support having a surface and a plurality of different probes, wherein the plurality of different probes are immobilized to the surface; b) a fluid volume comprising an analyte, wherein the fluid volume is in contact with the solid support, wherein at least one of the plurality of different probes and the analyte comprises at least one of the nucleic acid construct of the present disclosure; c) a detector or a detect assembly configured to detect signals measured at multiple time points from each of a plurality of spots on the solid support while the fluid volume is in contact with the solid support, wherein the signals are optical signals or electrochemical signals; d) a computer configured to convert signals into microarray data, wherein the computer further comprises instructions configured to cause the microarray data to be processed by the computer according to a processing method comprising: 1) determining an estimate of an interaction between the plurality of different probes and the analyte comprising (i) analytical expression and (ii) by calibration of the microarray using at least one standard probe on the solid support; 2) generating a stochastic-matrix that utilizes the estimate in a Markov chain model that comprises modeling hybridization, cross-hybridization, and unbound transition probabilities between states; 3) obtaining affinity-based array data using the detector or the detector assembly; 4) applying the affinity-based array data to the stochastic-matrix; 5) applying an optimization algorithm selected from the group consisting of a maximum likelihood estimation algorithm, a maximum a-posteriori criterion, a constrained least squares calculation, and any combination thereof that exploits and does not suppress non-specific interactions by considering the non-specific interactions as interference rather than noise; and 6) outputting optimized affinity-based array data to a user, wherein the optimized affinity-based array data has an improved signal-to-noise ratio compared to the affinity-based array data obtained by using the detector or the detector assembly.

Aspects of the present disclosure provide an integrated biosensor array, comprising, in order, a molecular recognition layer comprising at least one of the nucleic acid construct of the present disclosure, an optical layer, and a sensor layer integrated in a sandwich configuration, wherein: a) the molecular recognition layer comprises a plurality of different probes attached at different independently addressable locations, each of the independently addressable locations configured to receive an excitation photon flux directly from a single source located on a single side of the molecular recognition layer, wherein the molecular recognition layer transmits light to the optical layer, wherein at one of the plurality of different probes comprises the at least one of the nucleic acid construct; b) the optical layer comprises an optical filter layer, wherein the optical layer transmits light from the molecular recognition layer to the sensor layer, whereby the transmitted light is filtered; and the sensor layer comprises an array of optical sensors that detect the filtered light transmitted through the optical layer, the sensor layer comprising sensor elements fabricated using a CMOS fabrication process; wherein the molecular recognition layer, the optical layer and the sensor layer comprise an integrated structure in which the molecular layer is in contact with the optical layer and the optical layer is in contact with the sensor layer.

In TGF, responses of the analytes to a series of finite time optical excitation pulses are analyzed after each excitation pulse is turned off. In conventional TGF, the emitted photon flux from fluorophores may be measured after every individual excitation pulse. One way to measure the photon flux is to quantify the photo-induced charge within specific integration time interval of a detector (FIG. 17). Such measured signals, when combined with fluorophore labelling of capture probes and/or analytes, can then be used to evaluate a presence, abundance, and occasionally the characteristics of the target analytes.

In certain applications, TGF may have advantages over CW fluorescence. For example, TGF may offer a much higher signal-to background when fluorophore copy number is relatively low. With a sufficiently fast optical excitation switching source, there may be almost no background from the excitation signal during detection. Furthermore, if fluorophores with long life time are used (e.g., Lanthanide chelates), one can also eliminate short lived auto-fluorescence background emissions from surrounding materials and/or biomolecular structures. Examples of auto-fluorescence sources may include plastics, organic polymers, or intercellular debris.

While TGF may be advantageous, its practical implementation can be quite challenging. The first set of challenges may be related to the speed in which the pulsed excitation and detection may occur. In conventional TGF configurations, optical and electronics systems with pulse frequency>100 MHz may be needed. The second set of challenges may originate from the inherent low number of photons that are emitted after each excitation pulse, with a total count less than or equal to the number of fluorophores. Finally, TGF may offer limited "multi-color" capabilities compared to CW fluorescence. In TGF, differentiating fluorophores based on their life-time may require higher speed and lower noise performance for the optics and electronics.

In the present disclosure, apparatus and methods to create high-performance, highly-integrated, and cost-efficient TGF system using semiconductor biochip devices and technologies have been provided. The methods and apparatus of the present disclosure may be used in life science and molecular diagnostics in Genomics and Proteomics, particularly massively-parallel DNA and protein analysis and DNA sequencing.

An aspect of the present disclosure provides a device for detecting a presence or absence of an analyte in a solution, comprising: a chip comprising a sensor comprising an electronic shutter, wherein the sensor is configured to (i) collect a signal from the solution generated upon exposure of the solution to an excitation pulse within a first time period, (ii) with aid of the electronic shutter, remove photo-induced charge generated within a second time period in the sensor by the excitation pulse, wherein the second time period is different from the first time period, and (iii) subsequent to the photo-induced charge being removed, generate an output signal derived at least in part from the signal, wherein the output signal is indicative of the presence or absence of the analyte.

In some embodiments, the second time period precedes the first time period. In some embodiments, the second time period is greater than duration of the excitation pulse. In some embodiments, the chip comprises a plurality of individually addressable locations, wherein the sensor comprising the electronic shutter is disposed on a first location of the plurality of individually addressable locations; and wherein an additional sensor comprising an additional electronic shutter is disposed on an additional location of the plurality of individually addressable locations.

In some embodiments, the signal comprises an electrical signal, and wherein the sensor further comprises at least one transducer configured to convert an optical signal from the solution to the electrical signal. In some embodiments, the electronic shutter comprises an electronic shutter switch operably coupled to the at least one transducer, which electronic shutter switch is configured to facilitate the removal of the photo-induced charge from the at least one transducer upon application of a voltage to the electronic shutter switch. In some embodiments, the sensor further comprises at least one integrator configured to integrate the electrical signal. In some embodiments, the sensor further comprises at least one integration switch disposed between and operably coupled to the at least one transducer and the at least one integrator, wherein the at least one integration switch is configured to transfer the electrical signal from the at least one transducer to the at least one integrator. In some embodiments, the sensor further comprises at least one additional transducer operably coupled to the at least one integrator, which the at least one additional transducer is configured to convert the electrical signal integrated by the at least one integrator to the output signal. In some embodiments, the signal comprises photo-induced charge, and wherein the output signal comprises voltage. In some embodiments, the chip is included in a complementary metal oxide semiconductor (CMOS) integrated circuit (IC).

In some embodiments, the chip further comprises a biosensing layer adjacent to the sensor, and the biosensing layer comprises at least one probe that specifically binds to the analyte. In some embodiments, the signal is derived at least in part from an optical signal produced by a label associated with the analyte upon binding of the analyte to the at least one probe. In some embodiments, the label is a fluorophore. In some embodiments, the signal is derived at least in part from an optical signal or change thereof from the at least one probe or the analyte upon binding of the analyte to the at least one probe. In some embodiments, the at least one probe comprises an energy donor and the analyte comprises an energy acceptor. In some embodiments, the energy donor is a fluorophore, and wherein the energy acceptor is an additional fluorophore or a quencher. In some embodiments, the biosensing layer comprises at least one control probe, and wherein the sensor is configured to collect a control signal from the at least one control probe and normalize the collected signal using the control signal. In some embodiments, the at least one control probe does not bind to or interact with the analyte. In some embodiments, the device further comprises a reaction chamber, a controllable fluidic unit, a temperature control unit, and a digital unit. In some embodiments, the reaction chamber is configured to interface the solution with the chip, and wherein the interfacing comprises an interaction between the analyte and the biosensing layer of the chip. In some embodiments, the controllable fluidic unit is configured to transfer at least a portion of the solution into or out of the reaction chamber. In some embodiments, the digital unit is configured to receive or store the output signal from the chip. In some embodiments, the chip is configured to repeat (i)-(ii) multiple times prior to (iii). In some embodiments, the output signal is a single output.

An aspect of the present disclosure provides a method for detecting a presence or absence of an analyte in a solution, comprising:

(a) activating a chip comprising a sensor comprising an electronic shutter, wherein the sensor is configured to (i) collect a signal generated upon exposure of the solution to an excitation pulse within a first time period, (ii) with aid of the electronic shutter, remove photo-induced charge generated within a second time period in the sensor by the excitation pulse, wherein the second time period is different from the first time period, and (iii) subsequent to the photo-induced charge being removed, generate an output signal derived at least in part from the signal, wherein the output signal is indicative of the presence or absence of the analyte;

(b) removing the photo-induced charge generated within the second time period in the sensor by the excitation pulse, with aid of the electronic shutter;

(c) collecting the signal generated upon exposure of the solution to the excitation pulse within the first time period; and (d) subsequent to the photo-induced charge being removed, generating the output signal derived at least in part from the signal, which output signal is indicative of the presence or absence of the analyte.

In some embodiments, the sensor is a time-gated fluorescence (TGF) photo sensor. In some embodiments, the method further comprises integrating the signal collected in (c) using the sensor. In some embodiments, the method further comprises, repeating (b)-(c) one or more times. In some embodiments, the one or more times comprise greater than or equal to about 100 times.

Another aspect of the present disclosure provides a device for detecting a signal, comprising: a chip comprising a sensor and an electronic shutter, wherein the sensor is configured to (i) detect the signal within a given time period, and (ii) yield data indicative of a charge generated by the signal, and wherein the electronic shutter is configured to remove a photo-induced charge which comprises a charge generated by an excitation pulse within a time period prior to the given time period; and a readout circuitry operatively coupled to the sensor, wherein the readout circuitry is configured to transmit the data from the sensor to memory.

In some embodiments, the readout circuitry is part of the chip. In some embodiments, the memory is external to the readout circuitry. In some embodiments, the signal is a fluorescence signal. In some embodiments, the chip comprises a sensor array comprising a plurality of individually addressable locations; the sensor and the electronic shutter is disposed on a first location of the plurality of individually addressable locations; and a second sensor and a second electronic shutter is disposed on a second location of the plurality of individually addressable locations. In some embodiments, the sensor is further configured to integrate the charge generated by the signal. In some embodiments, the sensor comprises an integration switch. In some embodiments, the sensor comprises at least one photo-to-charge transducer and at least one charge integrator, and the at least one integration switch locates between the at least one photon-to-charge transducer and the at least one charge integrator. In some embodiments, the chip is included in a complementary metal oxide semiconductor (CMOS) integrated circuit (IC). In some embodiments, the CMOS IC further comprises a heater and temperature control system. In some embodiments, the heater and temperature control system controls temperature at the plurality of individually addressable locations.

In some embodiments, the chip further comprises a biosensing layer adjacent to the sensor, and the biosensing layer comprises a surface comprising a plurality of probes. In some embodiments, probes of the plurality of probes are identical. In some embodiments, the sensor receives a fluorescent light from a fluorescent source associated with the biosensing layer. In some embodiments, the fluorescent source is a fluorophore. In some embodiments, the fluorophore is attached to at least one probe of the plurality of probes. In some embodiments, the plurality of probes comprise at least one control probe. In some embodiments, the at least one control probe does not bind to or interact with a target molecule. In some embodiments, each probe of the plurality of probes specifically binds to or interacts with a target molecule. In some embodiments the target molecule comprises a target molecular label. In some embodiments, the target molecular label comprises a target fluorophore. In some embodiments, each probe of the plurality of probes further comprises a molecular label. In some embodiments, the molecular label comprises a fluorophore. In some embodiments, the specific binding or interaction between the probe and the target molecule changes the fluorescence emitted from the fluorophore. In some embodiments, the device further comprises a reaction chamber, a controllable fluidic system, a temperature control system, and a digital system. In some embodiments, the reaction chamber interfaces a sample with the biochip, and the interfacing comprises an interaction between the sample and the biosensing layer of the chip. In some embodiments, the controllable fluidic system transfers at least one reagent into and/or out of the reaction chamber. In some embodiments, the at least one reagent comprises the sample. In some embodiments, the temperature control system sets a first temperature at the reaction chamber at a first time point. In some embodiments, the digital system sends instructions to the chip and the temperature control system. In some embodiments, the digital system further stores the data from the chip. In some embodiments, the digital system further receives the data from the chip.

Still another aspect of the present disclosure provides a method for detecting a signal, comprising activating a chip comprising a sensor and an electronic shutter, wherein the sensor is configured to (i) detect the signal within a given time period, and (ii) yield data indicative of a charge generated by the signal, and wherein the electronic shutter is configured to remove a photo-induced charge which comprises a charge generated by an excitation pulse within a time period prior to the given time period; (b) using the electronic shutter to remove the photo-induced charge within the time period prior to the given time period; (c) using the sensor to detect the signal within the given time period and yield the data indicative of the charge generated by the signal; and (d) transmitting the data to memory.

In some embodiments, the sensor is a time-gated fluorescence (TGF) photo sensor. In some embodiments, (c) further comprises integrating the charge generated by the signal using the sensor. In some embodiments, the method further comprises, repeating (a)-(c) one or more times. In some embodiments, the one or more times comprise greater than or equal to about 10 times. In some embodiments, the one or more times comprise greater than or equal to about 50 times. In some embodiments, the one or more times comprise greater than or equal to about 100 times. In some embodiments, the method further comprises generating an output signal using the chip. In some embodiments, the output signal is a single output signal. In some embodiments, the chip comprises a plurality of independently addressable locations. In some embodiments, the chip further comprises an additional sensor and an additional electronic shutter, the sensor and the electronic shutter are disposed on a first location of the plurality of independently addressable locations, and the additional sensor and the additional electronic shutter are disposed on a second location of the independently addressable locations. In some embodiments, the first location is different from the second location. In some embodiments, the method further comprises using the additional electronic shutter to remove an additional photo-induced charge within the time period prior to the given time period. In some embodiments, the method further comprises using the additional sensor to detect an additional charge generated by an additional signal within the given time period and yield additional data indicative of the additional charge generated by the additional signal. In some embodiments, the method further comprises integrating the additional charge using the sensor. In some embodiments, the plurality of independently addressable locations comprises greater than or equal to about 100 locations. In some embodiments, the plurality of independently addressable locations comprises greater than or equal to about 1,000 locations. In some embodiments, the plurality of independently addressable locations comprises greater than or equal to about 100,000 locations. In some embodiments, the plurality of independently addressable locations comprises greater than or equal to about 100 locations are pixels.

Another aspect of the present disclosure provides a method for operating a time-gated fluorescence (TGF) detection, comprising (a) activating a chip comprising a surface and an integrated circuit (IC) comprising at least one photo-sensor, wherein the IC comprises an electronic shutter; (b) directing a pulse of excitation light from an excitation light source to the surface; (c) during a first time period, using the electronic shutter to remove a first photo-induced charge from the photo-sensor, wherein the first photo-induced charge comprises a charge generated by the pulse of excitation light during the first time period; (d) during a second time period subsequent to the first time period, measuring a second photo-induced charge generated in the photo-sensor, wherein the surface is not exposed to the excitation pulse during the second time period; and (e) integrating the second photo-induced charge measured in (d) during the second time period.

In some embodiments, the excitation pulse is generated by a laser. In some embodiments, the integrating is conducted by using a sub-circuit comprised in the chip. In some embodiments, the method further comprises, repeating (a)-(e) one or more times. In some embodiments, the one or more times comprise greater than or equal to about 10 times. In some embodiments, the one or more times comprise greater than or equal to about 50 times. In some embodiments, the one or more times comprise greater than or equal to about 100 times. In some embodiments, the method further comprises generating an output signal. In some embodiments, the output signal is a single output. In some embodiments, the method further comprises resetting once the sub-circuit. In some embodiments, the sub-circuit is not reset during the repeating. In some embodiments, the sub-circuit is not reset between each of the repeating. In some embodiments, the method further comprises, prior to (b), resetting the sub-circuit. In some embodiments, there is a gap between the first time period and the second time period. In some embodiments, the surface comprises a biosensing layer comprising at least one probe. In some embodiments, the at least one probe comprises a fluorophore. In some embodiments, the fluorophore emits a fluorescent signal when excited by the excitation light. In some embodiments, the surface comprises a target molecule. In some embodiments, the at least one target molecule comprises a fluorophore. In some embodiments, the fluorophore emits a fluorescent signal when excited by the excitation light. In some embodiments, the at least one probe specifically binds to or interacts with the target molecule, thereby modulating the fluorescent signal emitted from the fluorophore comprised in the at least one probe. In some embodiments, the integrating comprises integrating photocurrent. In some embodiments, the method further comprises converting the integrated photocurrent from an analog format to a digital format.

Another aspect of the present disclosure provides a device comprising: a chip operatively coupled to a light source, the chip comprising a sensor which is configured to: (a) periodically detect one or more signals from an analyte associated with a surface of the chip, wherein the one or more signals are produced during or subsequent to subjecting the analyte to the light source; (b) integrate at least a subset of the one or more signals detected in (a) to produce an integrated signal; and (c) generate an output signal based on the integrated signal.

In some embodiments, the chip comprises an integrated complementary metal-oxide semiconductor (CMOS) chip. In some embodiments, the output signal is a single output signal. In some embodiments, the sensor is a time-gated fluorescence (TGF) sensor. In some embodiments, the device does not comprise an optical filter disposed adjacent to the chip. In some embodiments, the output signal is indicative of a characteristic of the analyte. In some embodiments, the chip comprises a sensor array comprising a plurality of sensors. In some embodiments, each of the plurality of sensors is disposed at an individually addressable location of the sensor array. In some embodiments, the analyte comprises a fluorophore. In some embodiments, the output signal is used to measure a lifetime of the fluorophore. In some embodiments, the analyte is immobilized on the surface. In some embodiments, the analyte is part of a molecule immobilized on the surface. In some embodiments, the analyte is immobilized on the surface via a linker. In some embodiments, the one or more signals comprise fluorescent photons. In some embodiments, the sensor comprises a transducer configured to convert the fluorescence photons into an electrical signal. In some embodiments, the sensor comprises a transducer configured to convert the fluorescence photons into charges. In some embodiments, the sensor further comprises an integrator configured to integrated the one or more signals. In some embodiments, the sensor comprises a switch operatively coupled to the transducer and the integrator. In some embodiments, the switch transfers the charges from the transducer to the integrator. In some embodiments, the integrator is operatively coupled to an additional transducer. In some embodiments, the additional transducer converts the charges to an electrical signal, thereby generating the output signal comprising the electrical signal. In some embodiments, the electrical signal comprises a voltage. In some embodiments, the light source is a pulsed light source. In some embodiments, the pulsed light source is a laser, or a light emitting diode. In some embodiments, the pulsed light source is periodically modulated in a predetermined frequency.

Another aspect of the present disclosure provides a method comprising: (a) activating a chip comprising a sensor which is configured to (i) periodically detect one or more signals from an analyte associated with a surface of the chip, wherein the one or more signals are produced during or subsequent to subjecting the analyte to a light source; (ii) integrate at least a subset of the one or more signals detected in (i) to produce an integrated signal; and (iii) generate an output signal based on the integrated signal; (b) directing the light source to the chip to generate the one or more signals; (c) detecting periodically the one or more signals from the analyte during or subsequent to subjecting the analyte to the light source; (d) integrating the at least the subset of the one or more signals to produce the integrated signal; and (e) generating an output signal based on the integrated signal.

In some embodiments, the light source is a pulsed light source. In some embodiments, (c) is conducted periodically at given intervals. In some embodiments, (c) occurs during or after each time the pulsed light source is off. In some embodiments, the output signal is a single output signal. In some embodiments, (d) is conducted using an integrator. In some embodiments, (c) or (e) is conducted using a transducer. In some embodiments, the output signal is an electrical signal. In some embodiments, the one or more signals are detected by the sensor in the absence of passing through an optical filter.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
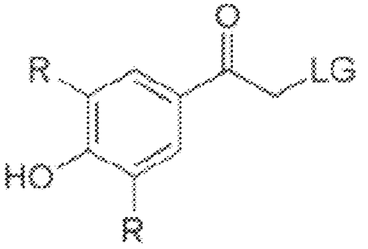
FIG. 1 shows examples of photocleavable groups (LG=leaving group)
Figure 1:
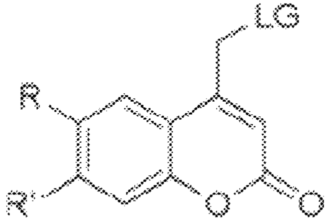
Figure 1:
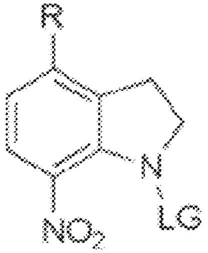
Figure 1:
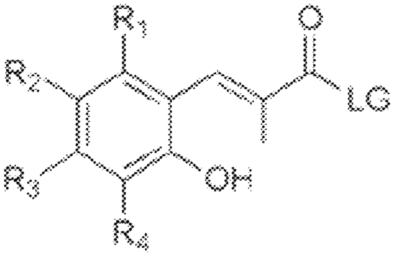
Figure 1:
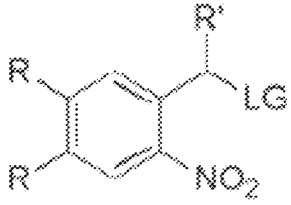
Figure 1:
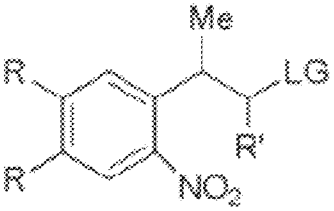

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides chemically-modified and photo-triggered nucleic acid (NA) constructs that have unique properties, such that the constructs can transform its chemical structure when triggered by photons of light in a photochemical fashion, thereby changing its chemical/biochemical functions. These photo-triggered changing properties of the chemically-modified NA constructs can be utilized in molecular detection reactions/processes.

In some embodiments, the photo-triggered NA constructs can be used in NA detection assays that are used in life-science research and molecular diagnostics. In these assays, NA molecules are the target of the assay and/or are used as molecular recognition elements for the assay. The photo-triggered NA construct is added to the assay such that by appropriately applying photons of light to the system, the photo-triggered NA construct can improve the assay detection accuracy and/or reduce the workflow complexity and/or shorten the turnaround time. Other advantages are also possible.

Some example detection assays are NA amplification tests (NAATs) that use polymerase chain reaction processes; NA affinity-based detection systems that take advantage of 2-dimensional and addressable DNA microarrays; and DNA sequencing arrays that incorporate solid-phase sequence-by-synthesis (SBS) methods.

Photo-Triggered Nucleic Acid Constructs and their Use in Operations

The term "photo-triggered nucleic acid construct", or "NA construct," as used herein, generally refers to NA molecules that comprise of 1) one or more photosensitive systems or photosensitive chemical moieties that can reside in a first molecular state prior to exposure to photons of light; and 2) one or more DNA or RNA molecules covalently or non-covalently linked to the one or more photosensitive systems or photosensitive chemical moieties. When photons of light are applied to the one or more photosensitive systems or chemical moieties in the nucleic acid construct, the one or more photosensitive systems or photosensitive chemical moieties change from the first molecular state into a second molecular state, which in turn changes the biochemical properties of the NA construct. For example, the photons of light can cause chemical changes in the NA construct by breaking or making chemical bond(s) in the one or more photosensitive systems or photosensitive chemical moieties.

The NA construct can comprise about 1, 2, 3, 4, 5, 6, 7, 8, 9, 10, 20, 30, 40, 50, 60, 70, 80, 90, 100, 200, 300, 400, 500, 600, 700, 800, 900 NA molecules. The NA construct comprises at least 1, 2, 3, 4, 5, 6, 7, 8, 9, 10, 20, 30, 40, 50, 60, 70, 80, 90, 100, 200, 300, 400, 500, 600, 700, 800, 900 NA molecules. The NA construct can comprise no more than 2, 3, 4, 5, 6, 7, 8, 9, 10, 20, 30, 40, 50, 60, 70, 80, 90, 100, 200, 300, 400, 500, 600, 700, 800, 900 NA molecules.

The term, "photosensitive system" or "photosensitive chemical moiety," as used herein, generally refers to a single or an assortment of chemical structures comprising photolabile chemical bond(s). The photosensitive system or the photosensitive chemical moiety can absorb wavelength-specific photons to increase the reaction rate of certain chemical reactions in which the photosensitive system or the photosensitive chemical moiety can participate. Other descriptive words, such as light-sensitive, light-cleavable, light-activatable, photolabile, photoactivatable or photocleavable, can be used interchangeably with the word photosensitive.

The term "molecular state" as used herein, generally refers to the atomic and molecular structure and the chemical, physiochemical, biochemical, electrochemical, and photochemical properties that associate with one or more specific molecules, such as, for example, NA constructs.

The term "biochemical properties," as used herein, generally refers to characteristics of the NA construct in biological and chemical reactions. The biochemical properties of the nucleic acid construct can change depending on the molecular state of the NA construct. The molecular state of the NA construct can change by reactions of the one or more photosensitive systems or photosensitive chemical moieties. In addition, the biochemical properties of the NA construct in the first molecular state can be different from those in the second molecular state.

In some embodiments, the first molecular state is the inactive molecular state for the NA construct while the second molecular state is the active molecular state for the NA construct. In some embodiments, the first molecular state is the active molecular state for the NA construct while the second molecular state is the inactive molecular state for the NA construct.

Each NA construct may have different biochemical property, including different reactivities in biochemical reactions. Examples of biochemical properties can include, for example, whether the NA construct can facilitate, block or participate in a particular biochemical reactions, such as, for example, a polymerase chain reaction or hybridization reaction. The different biochemical properties can be triggered by photons of light.

The biochemical property of a NA construct can include different molecular states of the NA construct. For example, the biochemical properties of the NA construct in the first molecular state can be different from the biochemical properties of the NA construct in the second molecular state. The biochemical properties of the NA construct in the first molecular state and the second molecular state can be designed such that photons of light can start and/or stops specific molecular reactions that the NA construct can participate in. Such changes in molecular state can be triggered by photons of light. Examples of biochemical properties for a primer can be active primers and inactive primer, etc. In some embodiments, the present disclosure describes methods and systems to toggle primers in the extension reactions between "active" and "inactive" molecular states with photons of light. In some embodiments, active/inactive molecular state-switching can be enabled by cleaving a photocleavable bond within a nucleic acid construct. In the present disclosure, the terms of "latent", "inactivated", "inert" and "non-functional" are synonymous with the term "inactive". Similar terminology is used when describing "probes".

The NA constructs typically reside in a reaction chamber to which photons of light can be applied to by a light source system.

1. Photosensitive Systems or Photosensitive Chemical Moieties

A photosensitive system or photosensitive chemical moiety can be a single or a plurality of chemical structures comprising photolabile chemical bond(s). The photosensitive system or photosensitive chemical moiety can change its structure or chemical propertied when radiated by photons of light. The photosensitive system or photosensitive chemical moiety can absorb wavelength-specific photons to increase the reaction rate of certain chemical reactions which the photosensitive system or the photosensitive chemical moiety can facilitate or participate in. For example, these chemical reactions can:

- Alter the chemical structures of the photosensitive system or the photosensitive chemical moiety;
- Break the structure of the photosensitive system the photosensitive chemical moiety into a plurality of smaller structures;
- Add an external chemical structure to the photosensitive system; or
- Form an intramolecular bond or bonds within the photosensitive system or the photosensitive chemical moiety;
- Form an intermolecular bond or bonds between two or more photosensitive systems or photosensitive chemical moieties or external chemical structures (relative to the photosensitive systems and photosensitive chemical moieties); or
- A combination thereof.

In some embodiments, the photosensitive systems or photosensitive chemical moiety can be incorporated within the structure of a nucleic acid molecule. For example, the photosensitive systems or photosensitive chemical moiety can be:

- Placed at functional group(s) of the NA, for example, on the hetero atoms of the nucleobase or on the 3'-OH of the ribose ring;
- Used as part of a linker group between two NA sequences, wherein, in the presence of photons of light, the linker group can break into smaller groups, thereby separating the two previously linked NA sequences into two independent nucleic acid sequences (i.e., they are not linked any more);
- Placed at the 5'-termini of a NA strand, wherein the presence of the photosensitive systems or photosensitive chemical moiety prevents certain biochemical reaction from happening on the 5'-termini of the nucleic acid strand, e.g., a photolabile group on the 5' phosphate group of the terminal NA;
- Placed at the 3'-termini of a NA strand, wherein the presence of the photosensitive systems or photosensitive chemical moiety prevents certain biochemical reaction from happening on the 3'-termini of the NA strand, e.g., a photolabile group on the 3'-OH group of the terminal NA; or
- A combination thereof.

Examples of some photosensitive chemical moieties can be found in Mayer, G. and Heckel, A., "Biologically active molecules with a 'light switch'," Angew. Chem., Int. Ed., 2006; 45(30), pp. 4900-4921, which is entirely incorporated herein by reference. Examples of some photosensitive chemical moieties may include ortho-nitrobenzyloxy linkers, ortho-nitrobenzylamino linkers, alpha-substituted ortho-nitrobenzyl linkers, ortho-nitroveratryl linkers, phenacyl linkers, para-alkoxyphenacyl linkers, benzoin linkers, or pivaloyl linkers. See R. J. T. Mikkelsen, "Photolabile Linkers for Solid-phase Synthesis," ACS Comb. Sci. 2018; 20(7):377-399; S. Peukert and B. Giese, "The Pivaloylglycol Anchor Group: A New Platform for a Photolabile Linker in Solid-Phase Synthesis," J. Org. Chem. 1998, 63(24): 9045-9051, each of which is entirely incorporated herein by reference.

For example, nitrobenzyl-based chemical moieties can be, such as, for example, those shown below:

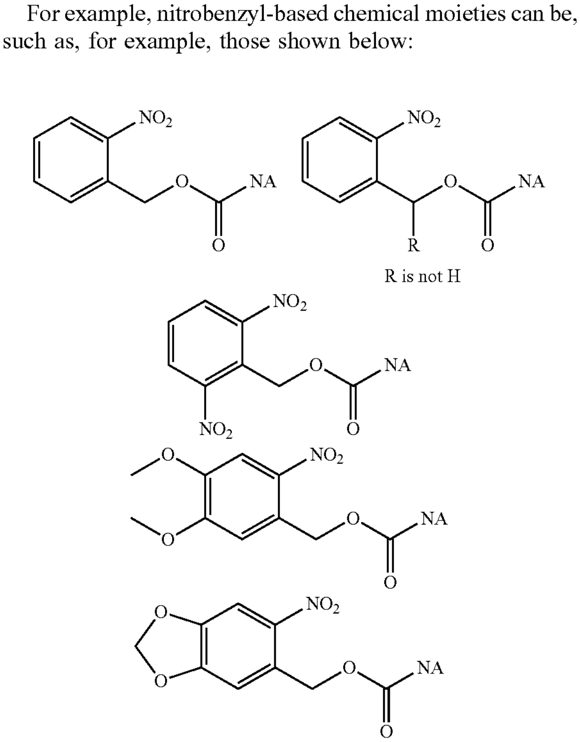

NA is a nucleic acid, a nucleotide, a nucleobase, a 5' phosphate, or a part of a linker The nitrobenzyl-based chemical moieties may undergo Norrish Type II mechanism with incident photons to provide the cleaved products as shown below:

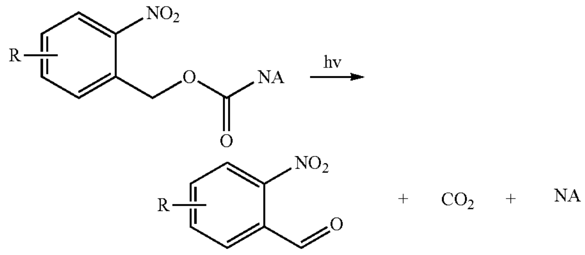

NA is a nucleic acid, a nucleotide, a nucleobase, or part of a linker

Some examples of photocleavable groups can be found in FIG. 1. LG refers to a leaving group in FIG. 1. Among them, some examples are 4-methoxy-7-nitroindolinyl (MNI), I-nitrobenzyl (O—NB), 3-(4,5-dimethoxy-2-nitrophenyl) 2-butyl (DMNPB) 4-carboxymethoxy-5,7-dinitroindoinyl (CDNI).

2. Molecular States

The term "molecular state" as used herein, generally refers to the atomic and molecular structure and the chemical, physiochemical, biochemical, electrochemical, and photochemical properties that associate with one or more specific molecules, such as, for example, NA constructs. For example, the NA construct can exhibit its molecular state(s) within a defined aqueous environment or under other reaction conditions for nucleic acids in the presence of other molecules. The molecular state of NA constructs may include propensities of the NA constructs to undergo certain reactions, such as, for example, ligations, coupling reactions, chain elongation, chain digestion, etc.

The biochemical property of a NA construct can include different molecular states of the NA construct. For example, the biochemical properties of the NA construct in the first molecular state can be different from the biochemical properties of the NA construct in the second molecular state. The biochemical properties of the NA construct in the first molecular state and the second molecular state can be designed such that photons of light can start and/or stops specific molecular reactions that the NA construct can participate in. Such changes in molecular state can be triggered by photons of light. For example, photochemical reactions can change the molecular structure of a nucleic acid reagent, thereby changing the biochemical properties and reactivities of the nucleic acid reagent in biochemical reactions.

For example, a NA construct can be an "active primer," which is a primer in the traditional PCR sense that can support nucleotide addition (i.e., extension of the growing strand) facilitated by a polymerase enzyme. In other words, an active primer can be capable of base pairing to a complementary template sequence to form anti-parallel duplex structure at the experimental conditions, and can possess a native (available) 3'-hydroxyl group to which the polymerase enzyme can add another nucleotide, thus extending the primer by at least one base. An "inactive primer" can be a primer that cannot support or facilitate nucleotide addition, either by virtue of its inability to adequately bind the template strand (unable to base pairing) or the absence of an available 3'-hydroxyl group of a terminal nucleotide. For example, placing a photocleavable chemical moiety on the 3'-hydroxyl group of terminal nucleotide can block the polymerase reaction. Upon exposure to light, the photocleavable chemical moiety on the 3'-hydroxyl group can be removed and the resulting free 3'-hydroxyl group can be available for the extension of the growing strand. Similar mechanism can apply in ligase-catalyze reactions in terms of blocking and deblocking the ligation site on the NA. Other examples of base-pairing inhibitors can be chemical groups placed on at least one strand of the DNA (e.g., the growing strand) such that they prevent the DNA strand to bind to its complementary strand due to steric reasons or other chemical reasons.

In some embodiments, the present disclosure describes methods and systems to toggle primers in the extension reactions between "active" and "inactive" molecular states with photons of light. By changing the molecular states of the primers, the present disclosure can enable novel amplification strategies, especially with respect to the "closed tube" methods (i.e., no extra reagents are added after the PCR reaction starts) and "multiplex" methods that are highly desirable in the field of NA amplification-based diagnostics. The present disclosure describes methods to effectively change the composition (and properties, such as, the molecular states) of the primer set during the amplification reaction, without adding or removing reagents or changing the reaction chamber between reactions. Therefore, "inactive" molecular state describes the status and functional state of a particular primer and but not its use. Inactive primers can be made active and vice-versa upon the exposure to the light. Even though the examples below show individual components for simplicity and demonstration, some complex multiplex assays might require up to 10, 20, 30, 40, 50, 60, 70, 80, 90, 100 primers, or even more. The active/inactive molecular state-switching can be triggered by the same light exposure or different light exposure. For example, one photocleavable chemical moiety can react at one wavelength of the light while another photocleavable chemical moiety can react at another wavelength of the light.

In some embodiments, active/inactive molecular state-switching can be enabled by cleaving a photocleavable bond within a NA construct, thereby cutting the original nucleic acid strand(s) into parts. In some embodiments, active/inactive molecular state-switching is enabled by cleaving a photocleavable bond within a NA construct, thereby removing blocking groups from certain nucleic acid units of the NA construct. For example, upon exposure to light, the blocking group on base-pairing inhibitors can be remove and the NA sequence of the NA construct remain intact (i.e., the length and the identities of the sequence of the NA construct remain the same before and after the removal of the blocking groups).

In the present disclosure, the terms of "latent", "inactivated", "inert" and "non-functional" are synonymous with the term "inactive". Similar terminology is used when describing "probes" which are related to signal transduction and would not participate in polymerase-catalyzed extensions such as PCR.

3. Biochemical Properties

The term "biochemical properties," as used herein, generally refers to characteristics of the NA construct in biological and chemical reactions, including, for example, the propensity or ability of the NA construct to engage in certain biochemical or chemical reactions. In addition, the biochemical properties of the NA construct in the first molecular state can be different from those in the second molecular state. One example of such biochemical properties can be the ability of the NA construct to start or stop a molecular reaction after radiation by photons of light. For example, the biochemical properties may include, but are not limited to, the abilities of:

- The NA construct in a single stranded form to base-pair with itself and form a hairpin structure, or form a homodimer with another copy of the NA construct, form a heterodimer with another NA molecule;
- DNA polymerase enzymes to extend the NA construct using a template NA;
- RNA polymerase enzymes to extend the NA construct using a template NA;
- Reverse transcriptase enzymes to extend the NA construct using a template NA;
- Terminal transferase enzymes to extend the NA construct;
- Exonuclease enzymes to digest the NA construct;
- Endonuclease enzymes to break the NA construct;
- Restriction enzymes to break the NA construct at specific coordinates within its sequence; and
- Ligase enzymes to use the NA construct as a substrate or template.

The biochemical properties of the nucleic acid construct can change according to the molecular state of the NA construct. The molecular state of the NA construct can change by reactions of the one or more photosensitive systems or photosensitive chemical moieties.

4. Reaction Chamber

The term "reaction chamber," as used herein, generally refers to a physical system that confines an aqueous solution or other media, and in which the NA constructs resides. The reaction chamber may allow the photons of light to reach the NA constructs residing inside and may have a temperature control to set and dynamically change the temperature within the chamber, such as, the temperature of the aqueous solution.

In some embodiments, the reaction chamber can have a volume ranging from about 0.1 nanoliter (nL) to about 10 milliliter (mL). In some cases, the reaction chamber may have a volume ranging from about 1 microliter (μL) to about 100 μL. In some embodiments, the reaction chamber is about 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, or 900 nL. In some embodiments, the reaction chamber is about 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, or 900 μL. In some embodiments, the reaction chamber is about 0.1, 0.2, 0.3, 0.4, 0.5, 0.6, 0.7, 0.8, 0.9, 1, 2, 3, 4, 5, 6, 7, 8, 9, or 10 mL.

The reaction chamber can have a temperature ranging from about 4° C. to about 100° C. The temperature of the reaction chamber can be controlled with accuracies as about ±0.01° C., ±0.02° C., ±0.03° C., ±0.04° C., ±0.05° C., ±0.06° C., ±0.07° C., 0.08° C., ±0.09° C., ±0.1° C., ±0.2° C., ±0.3° C., or ±0.4° C. . . . In some embodiments, the temperature of the reaction chamber may range from about 30° C. to about 95° C., and the accuracy of controlling the temperature can be controlled to within ±0.1° C.

5. Light

The term "light," as used herein with respect to the reaction chamber, generally refers to the photon flux confined within specific wavelengths and applied to the reaction chamber for a duration of time. The wavelengths of light can be from about 200 nanometer (nm) to about 2000 nm. In some embodiments, the wavelengths of light can from about 200 nm to about 400 nm, from about 300 nm to about 500 nm, or from about 400 nm to about 600 nm. In some embodiments, the total optical power of the light can be from about 0.001 $mW/cm^2$ to about 1,000 $mW/cm^2$, from about 0.01 $mW/cm^2$ to about 100 $mW/cm^2$, from about 0.1 $mW/cm^2$ to about 10 $mW/cm^2$, from about 0.05 $mW/cm^2$ to about 20 $mW/cm^2$, or from about 0.02 $mW/cm^2$ to about 50 $mW/cm^2$. The duration of light exposure time can be from about 0.1 second (sec) to about 10,000 sec, from 0.25 sec to about 5,000 sec, from about 0.5 sec to about 1,000 sec, from about 0.75 sec to about 500 sec, from about 1 sec to about 100 sec.

6. Light Source

The term "light source system," as used herein, generally refers to the combination of devices that in concert generate photons of light within defined wavelengths and control its power to be applied to the nucleic acid constructs. The light source system may include a photon source that can be a light-emitting diode (LED), laser source, incandescent lamp, or gas discharge lamp. The light source system may include a power control device to control the light output power. The light source system may include wavelength-selective optical filters to ensure that its output light is within the desired wavelengths. The light source system may include optical devices to focus and/or collimate its output photon flux.

Modification of Nucleic Acids to Enable Photosensitivity

Various methods can be used to make NA molecules or structures having photochemical properties. For example, a method may comprise the use of solid-support phosphoramidite chemistry. The method may comprise synthesizing or growing nucleic acid sequence on a solid support to a position where a modification may be desired. Next, a special phosphoramidite may be coupled to the growing nucleic acid molecule at the modification position. The modified nucleic acid molecule may or may not be extended after the modification. Once the reaction is completed, the nucleic acid molecule may then be cleaved from the solid support. The cleaved nucleic acid molecule may or may not be subjected to additional reactions or treatment (e.g., purification, modification etc.).

Examples of photosensitive systems or photosensitive chemical moieties, as described above, can be a photocleavable group on part of the nucleotide (either the ribose part or the nucleobase part or between any of the chemical moieties of the nucleic acid), or as a part of a linker between two single stranded nucleic acid. The linker can have two photocleavable bonds, each of which bonds with a nucleic acid segment. There can be many types of modifications of nucleic acids that can enable photosensitivity as shown elsewhere in this disclosure. Below are some specific examples.

1. Photo-Cleavable Structures

Figure 2:
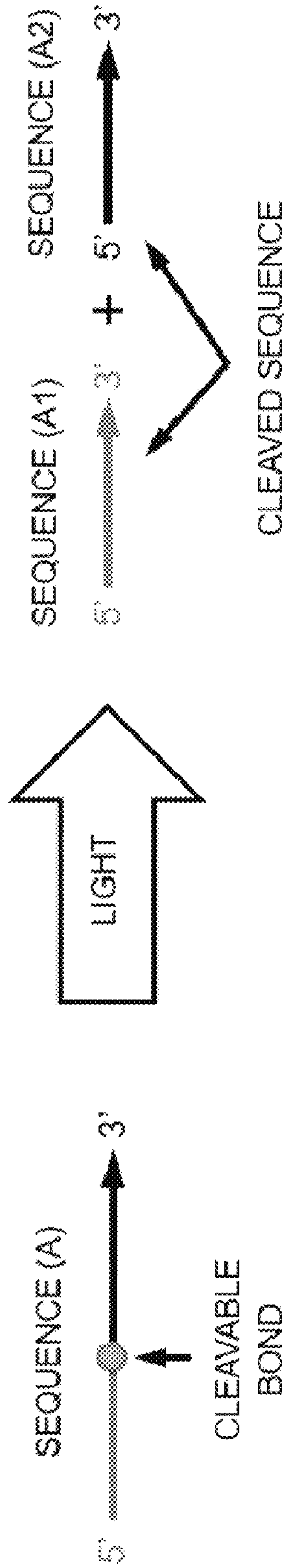
FIG. 2 shows an example nucleic acid molecule comprising photo-cleavable bonds.

FIG. 2 shows an example NA molecule comprising photo-cleavable bonds. In a photo-cleavable NA structure, two nucleic acid fragments can be linked together by a photosensitive system or photosensitive chemical moiety, which can include one or more photo-cleavable bonds. When the photo-cleavable NA structure molecule is exposed to light from a light source, the molecule may be cleaved into two or more segments due to the present of the photo-cleavable bonds. As a result, the original NA Sequence (A) can be broken into, for example, two smaller pieces of Sequence (A1) and Sequence (A2) as shown in FIG. 2.

In some embodiments, the photosensitive system can be designed such that after the breakage, the cleaved chemical residue remains at the released 3'-end of Sequence (A1) and/or the 5'-end of Sequence (A2). Sequence (A) can be a single stranded or double stranded NA. When Sequence (A) is a double stranded NA, on each strand there may be at least one photo-cleavable bond. In some embodiments, the location of the photo-cleavable bonds may be adjacent to the same pairing NA such that the breakage can produce blunt ends in Sequence (A1) and Sequence (A2), respective. In some embodiment, the location of the photo-cleavable bonds may be staggered on each strand such that after the cleavable, the Sequence (A1) and Sequence (A2) may have sticky ends (overhangs).

Figure 3:
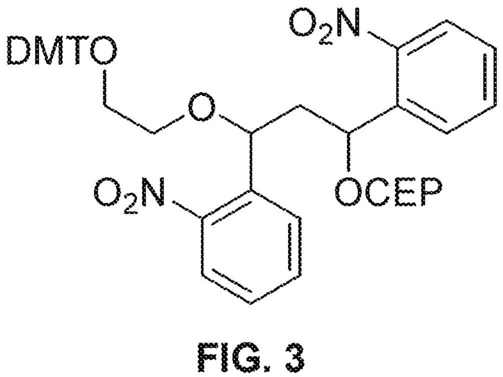
FIG. 3 shows an example of reagents having a photocleavable structure.

An example compound having photo-cleavable bond(s) is shown in FIG. 3. As shown in FIG. 3 this compound can be used with other DMT phosphoramidite-containing monomers in chemical nucleic acid molecule synthesis of NA construct to insert the photo-cleavable bond(s) into a chain of NA. In the example shown in FIG. 3, the O-nitrobenzyl photolabile blocking groups may link two segments of NA molecules. Without the radiation the photo-labile bonds are intact in the NA construct. The intact NA construct may display molecular state 1 of the biochemical properties of the NA construct. Then upon exposure to a light source the NA construct molecule may be cleaved into two separated nucleic acid fragments, and may yield 3'-hydroxyl and 5'-phosphorylated termini, respectively, in the two newly-formed NA fragments. Due to the breakage of the photo-labile bond(s), the molecular state of the original NA construct may change to new molecular states associated with the two nucleic acid fragments. This is an example of light-triggered molecular state change.

2. 3'-End Extension Inhibitors

Figure 4:
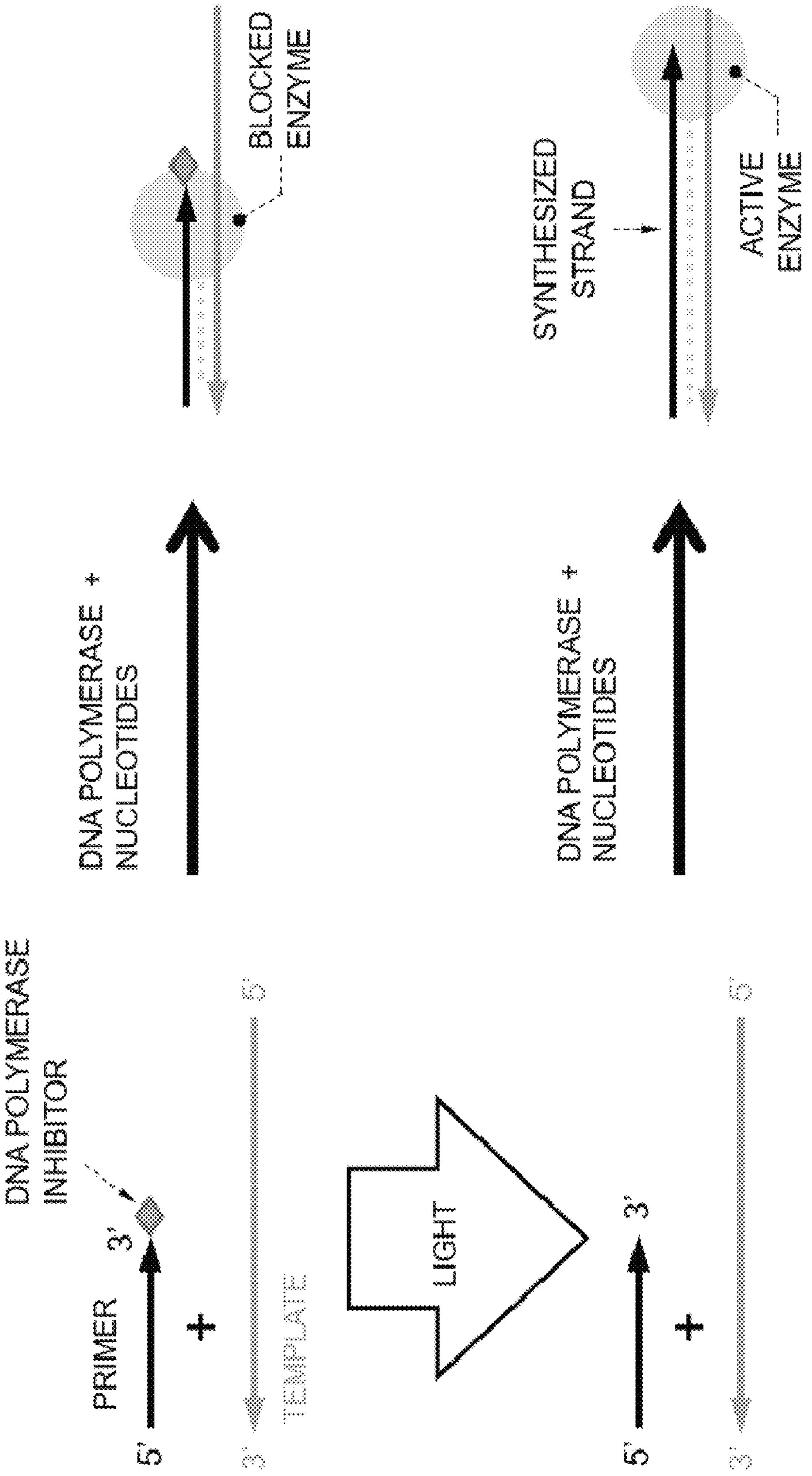
FIG. 4 shows an example of a nucleic acid construct comprising 3'-end extension inhibitor.

In a NA construct comprising a 3'-end extension inhibitor, a photosensitive system or photosensitive chemical moiety can be chemically attached to the 3'-end terminal unit of the NA sequence. Because of the presence of the 3'-end extension inhibitor, the 3' extension site is blocked for extension enzymes, including but not limited to, polymerases, transcriptase enzymes, and terminal transferases, etc., so that the enzyme cannot extend the growing strand from the 3'-end terminal unit, and the extension of the growing strand by the enzyme is inhibited. However, exposure to light can remove the blockage and allow the enzymes to extend the growing strand. An example of NA constructs is shown in FIG. 4 wherein the chemical reaction facilitated by a DNA polymerase is initially blocked by the presence of the photosensitive system or photosensitive chemical moiety at the 3'-end of a primer. Then, exposure to light can remove the blocking group and allow the enzyme to synthesize a primed DNA using a template. In this case, a light is directed to the molecule, the polymerase inhibitor may be removed from the molecule, making the molecule extendable by the polymerase.

Figure 5:
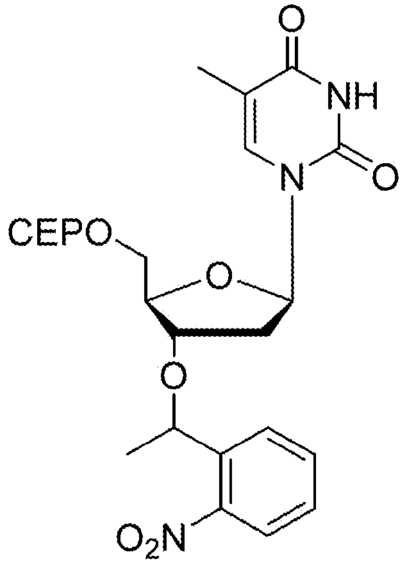
FIG. 5 shows an example of reagents for a 3'-end extension inhibitor.

An example of 3'-end terminal unit that can be inserted into a 3'-end polymerase extension inhibitors is shown in FIG. 5. DMT phosphoramidite monomers and this 3'-end terminal unit may be used in the chemical synthesis of nucleic acid molecules (oligonucleotides). Once the 3'-end terminal unit is installed at the 3'-end and in the absence of light exposure, the O-nitrobenzyl photolabile blocking group on the 3' hydroxy group of the ribose ring of the 3'-end terminal unit may prevent extension at that position by a DNA polymerase. Upon light exposure the blocking group can be removed to reveal the naked 3' hydroxy group on the ribose ring and restore the extension capability of the NA construct.

3. 5'-End Exonuclease Protectors

Figure 6:
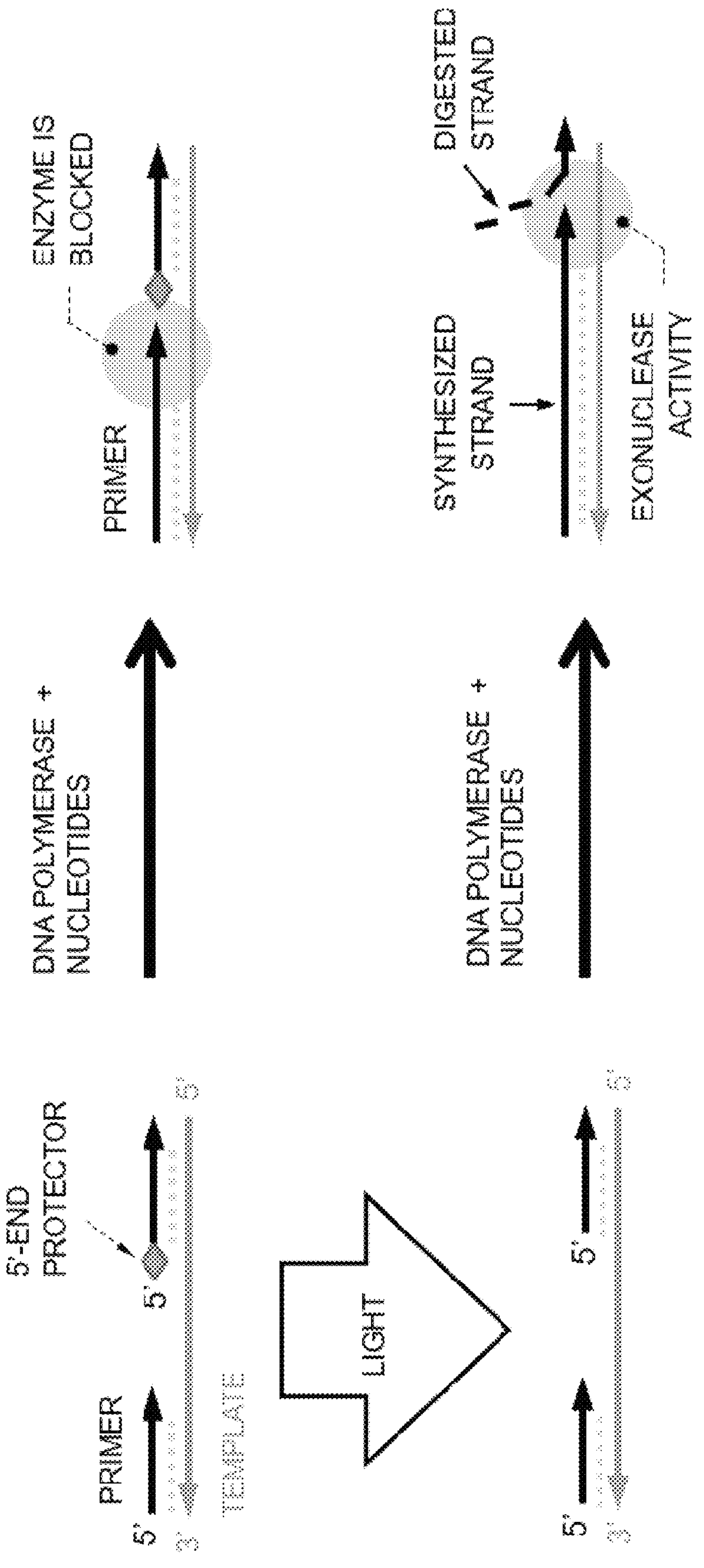
FIG. 6 shows an example of nucleic acid construct comprising 5'-end exonuclease inhibitor
Figure 7:
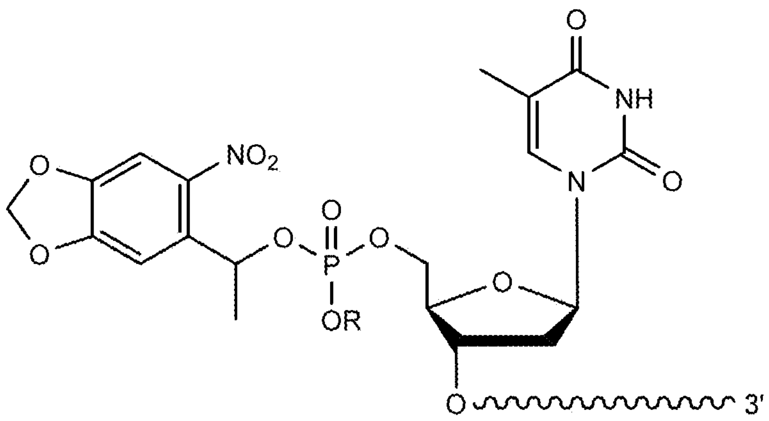
FIG. 7 shows an example of a 5'-end exonuclease inhibitor.

In a NA construct comprising a 5'-end exonuclease protector, a photosensitive system or photosensitive chemical moiety is chemically attached to the 5'-end terminal unit of the nucleic acid sequence. Because of the presence of the 5'-end exonuclease protector, the 5'-end digestion of the strand by exonuclease enzymes can be blocked and the strand is protected from cleavage or digestion. Exposure to light can remove the blockage and allow 5' to 3' strand digestion. For example, such a nucleic acid constructs is shown in FIG. 6 where the activities of a DNA polymerase 5'-end exonuclease can be initially blocked, and upon exposure to light and the removal of the 5'-end blocking group, the activities can be regained and allow the enzyme to digest the strand as shown in FIG. 6. Examples of photosensitive system or photosensitive chemical moiety that can be used as 5'-end exonuclease protector is shown in FIG. 7. The hydrophobic tail on the 5'-phosphate diester on the nucleotide can block the digestion of the nucleic acid comprising the nucleotide at the 5' termini by an exonuclease. Exposure of light on the nucleic acid can remove the blocking group on the 5'-phosphate and allow the digestion by the exonuclease on the 5' termini nucleotide.

4. Base-Pairing Inhibitors

Figure 8:
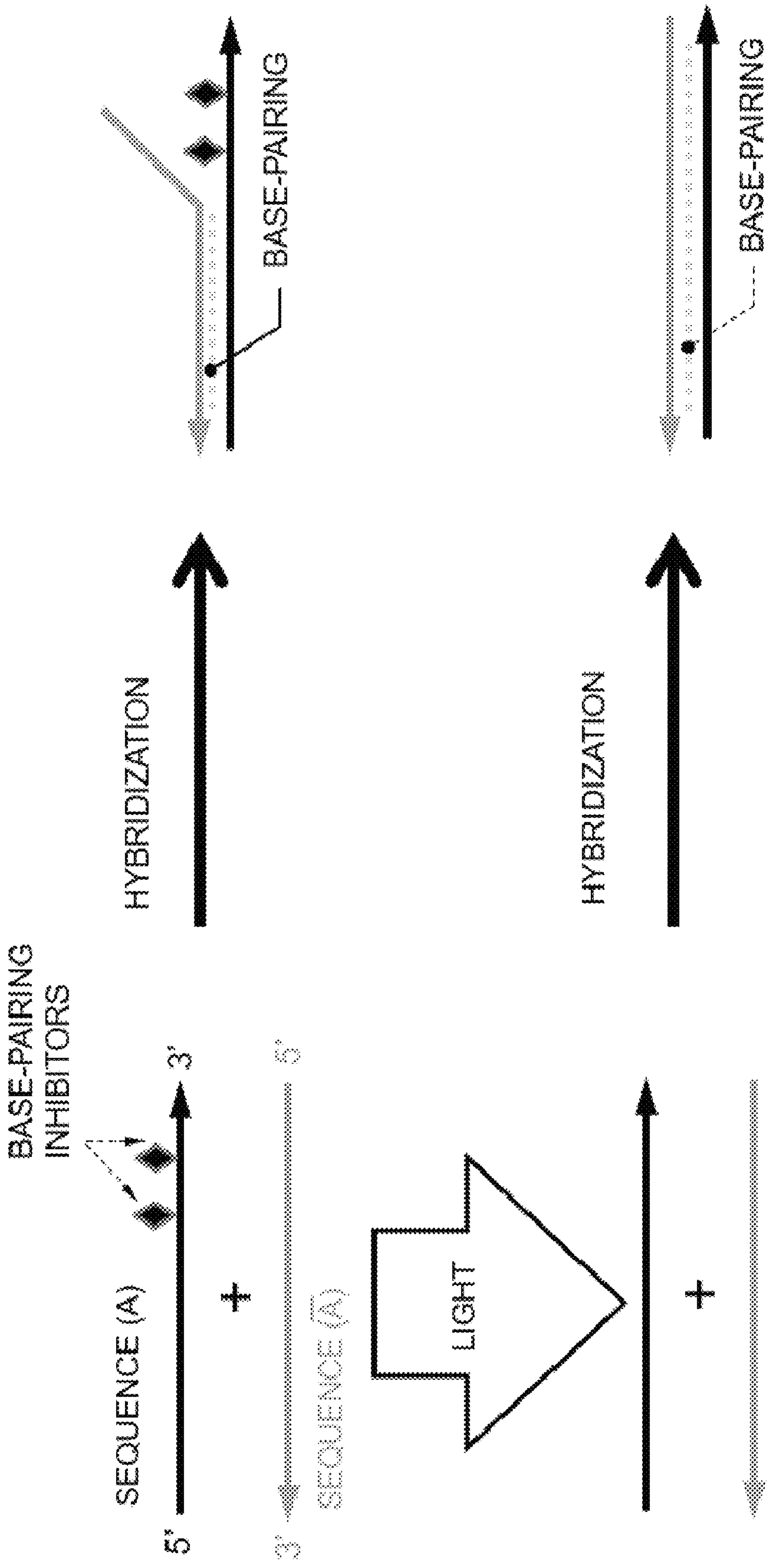
FIG. 8 shows an example of nucleic acid construct comprising photo-cleavable base-pairing inhibitor.

In a NA construct comprising base-pairing inhibitors, a photosensitive system or photosensitive chemical moiety can be chemically attached to one or more nucleobases of the nucleotide units within the NA construct. The base-pairing inhibitors can be in tandem within the nucleic acid sequence or can be distributed within the nucleic acid sequence. The presence of the base-pairing inhibitor can inhibit base-pairing of complementary sequences to the NA construct. Subsequent exposure to light can remove the blocking group and allow the normal base-pairing to occur between the deblocked NA construct and the complementary sequence. An example of such NA constructs is shown in FIG. 8, which shows an example NA molecule comprising photosensitive base-pairing inhibitors. When the NA molecule is not exposed to a light source, due to the existence of base-pair inhibitors, at least a subunit of the NA molecule lacks base-pairing capacity. Such base-pairing capacity may be restored by subjecting the nucleic acid molecule to a light source for a given time period (e.g., greater than or equal to about 1 minute (min), 2 min, 3 min, 4 min, 5 min, 6 min, 7 min, 8 min, 9 min, 10 min, 11 min, 12 min, 13 min, 14 min, 15 min, 16 min, 17 min, 18 min, 19 min, 20 min, or more). Alternatively, the nucleic acid molecule may be subjected to a light source until the photolysis is complete.

Figure 9:
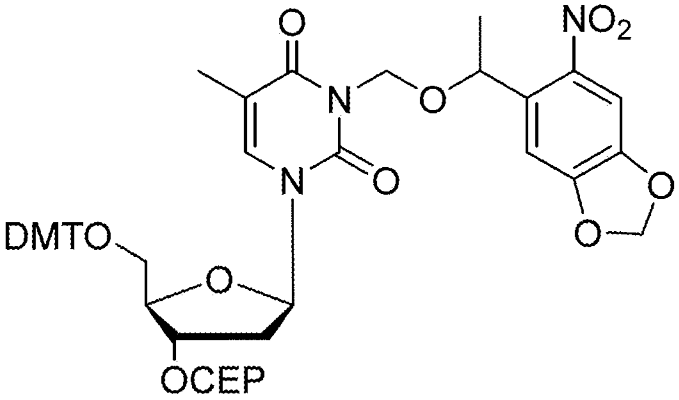
FIG. 9 shows an example of reagents for a photo-cleavable base-pairing inhibitor.

Various compounds can be used as photosensitive base-pairing inhibitors, e.g., a compound as shown in FIG. 9. The reagent shown in FIG. 9 and other DMT phosphoramidite monomers can be used in chemical NA molecule synthesis. Once installed, the O-nitrobenzyl photolabile blocking group may be used to prevent Watson-Crick base pairing due to steric hinderance and/or lack of hydrogen bonding. Upon exposure to a light source (e.g., UV light), the blocking group (shown on the nucleobase) may be removed to restore base pairing capability of the nucleic acid molecules. Photosensitive base-pairing inhibitors that comprising a photo-cleavable chemical moiety on the nucleobase, such as, for example, the compound shown in FIG. 9 (or other similar compounds that have different nucleobases with the photo-cleavable chemical moiety attached to a hetero atom such as nitrogen or oxygen on the nucleobase) can be made according to H. Lusic, et al., "Photochemical DNA Activation," Org. Lett., 2007, 9(10): 1903-1906; U.S. PG. Pub. No. 2010/0099159; each of which is entirely incorporated herein by reference.

The different chemical modifications on a nucleic acid, as disclosed above, can be used to build different types of NA constructs, as shown below, for different utilizations.

Types of Photo-Triggered Nucleic Acid Constructs and Uses Thereof

Also provided herein are NA constructs which have unique biochemical properties relevant to molecular detection that may be triggered when the NA molecules are exposed to a photons of light. These NA constructs, while being used in a reaction chamber, may enhance or decrease the rate, specificity, yield and/or fidelity of the biochemical reaction that are used in common molecular detection assays. Example reactions are polymerase chain reaction (PCR), polymerase-catalyzed chain elongation, reverse transcription polymerase chain reaction (RT-PCR), ligation, terminal transferases extension, hybridization, exonuclease digest, endonuclease digest, and restriction digest, among others. If a reaction comprises of NA components functioning as the target and/or reagent and/or catalyst and/or others, the present disclosure can be used to moderate the reaction by replacing the native component with NA constructs or inserting NA construct into the native components. Examples of nucleic acid molecules or structures having photochemical properties may include, but not limited to, primers, oligonucleotides, polynucleotides, oligonucleotide-containing molecules, nucleotides, or nucleic acid probes. The nucleic acid probes may include hybridization probes which may selectively interact with a target analytes (such as amplicons) during or at the end of a given reaction (such as PCR or RT-PCR). There can be many different types of nucleic acid constructs as shown below.

1. Light-Start Primers

Light-start primers are NA sequences that cannot base-pair with a complementary NA sequence template and/or cannot create an initiation site for nucleic acid synthesis enzymes due to the presence of the photosensitive systems or photosensitive chemical moieties, or blocking groups comprising or connected to the photosensitive systems or photosensitive chemical moieties. When light is applied, these light-start primers can remove the blocking group(s) and subsequently become enabled for nucleic acid synthesis in the presence of a nucleic acid template and a nucleic acid synthesis enzyme.

Figure 10:
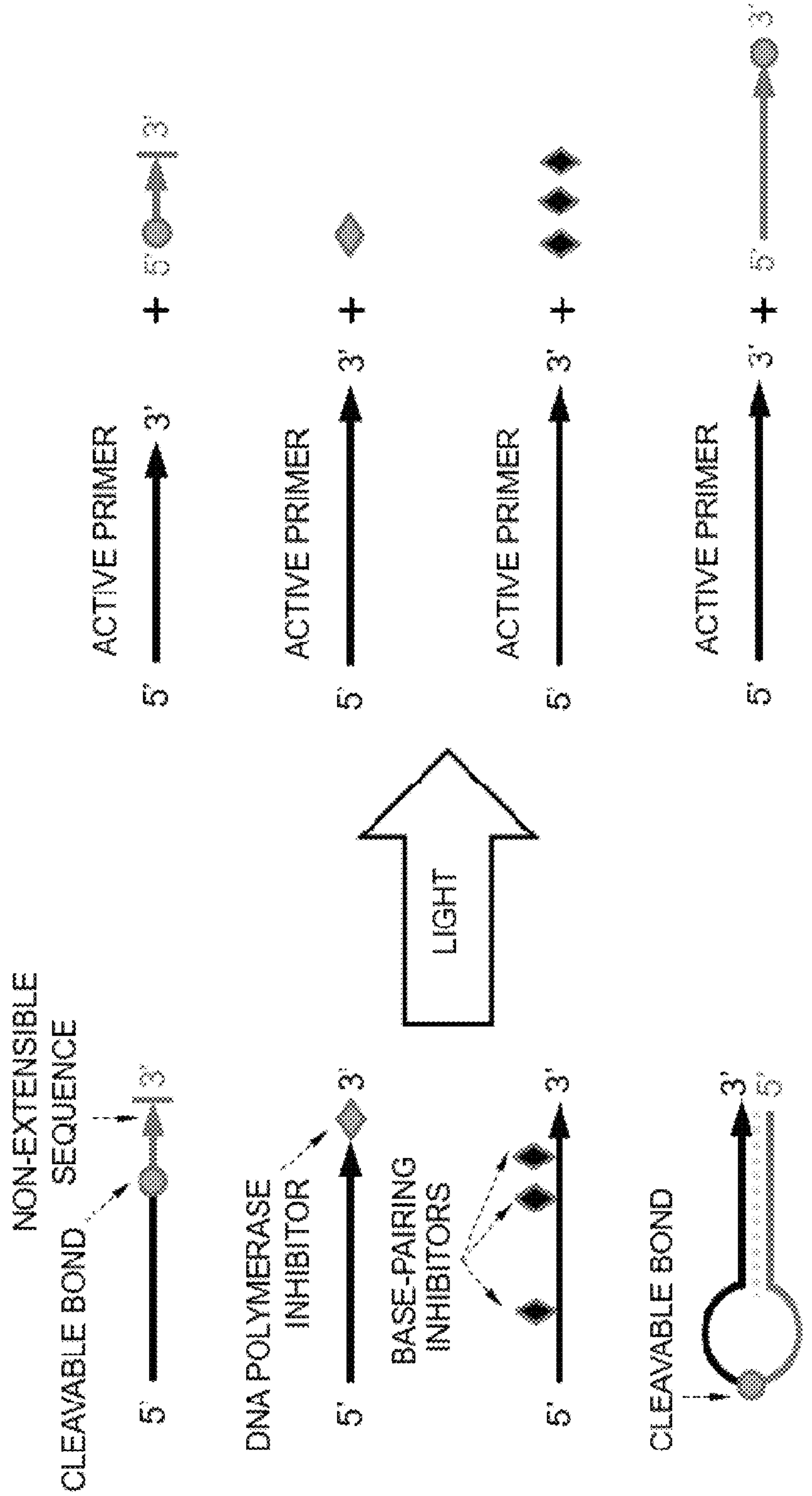
FIG. 10 shows examples of light-start primers.

FIG. 10 shows examples of light-start primers and their applications in biochemical processes with their corresponding example sequences listed in Table I. In one embodiment, the primers may comprise an internal photo-cleavable bond modification in a linear NA construct (e.g., a primer), wherein the light-start primer is designed with a photo-cleavable modification such that upon exposure to the light the blocking strand can be removed, and the resulting primer can form a proper initiation site for the polymerase to act on (FIG. 10, top panel). In another embodiment, the primers may comprise a polymerase blocker at the 3' terminus of a nucleic acid construct (e.g., a primer), wherein the light-start primer is designed using a 3'-end extension inhibitor modification such that when applying light the inhibition can be removed, thereby creating a proper initiation site for the polymerase to act on (FIG. 10, second panel from the top). In one embodiment, the primers may comprise one or more base-pairing inhibitors distributed within the sequence of a NA construct (e.g., a primer), wherein the light-start primer is designed using a base-pairing inhibitor modification such that, initially, the primer comprising the base-pair inhibitors cannot hybridize to the template or form the initiation site for the polymerase. When upon exposure to the light, the inhibition can be removed, and the resulting primer can create a proper initiation site for the polymerase to act on (FIG. 10, third panel from the top). In another embodiment, the primers may comprise a cleavable bond within a hairpin structure of a nucleic acid (e.g., a hairpin primer) the light-start primer is designed using a photo-cleavable hairpin monomer structure. Initially, the 3'-end region of the primer can be unavailable for base-pairing due to the presence of the hairpin. When exposure to the light, the hairpin can be destroyed, and the resulting primer can become available for extension (FIG. 10, bottom panel). In some embodiments, the primers may not be active (i.e., in the inactive molecular state) prior to being exposed to a light source due to the presence of the photosensitive systems or photosensitive chemical moieties on the nucleic acid constructs. However, when the light-start primers are subjected to a light source, the light from the light source may remove some or all of the inhibitors/blockers, or cleave the cleavable bonds comprised in the light-start primers, thereby restoring the capability of the primers into the active molecular state.

TABLE I

Example sequences for light-start primers.

| SEQ ID NO | Sequence | Primer Type |
|---|---|---|
| 1 | 5'-CTCGGTCGTCCAATATCGAA[**PC**]AACT-3'-[**EI**] | internal cleavable bond modification |

TABLE I-continued

| Example sequences for light-start primers. | | |
|---|---|---|
| SEQ ID NO | Sequence | Primer Type |
| 2 | 5'-CTCGGTCGTCCAATATCGAA-3'-[**PCEI**] | 3'-end extension inhibitor modification |
| 3 | 5'-CTCGG**T***CGT**C*C***AATATCG**A*A***-3' | base-pairing inhibitors |
| 4 | 5'-TTCGATATT[**PC**]CTCGGTCGTCC AATATCGAA-3' | a cleavable bond within a hairpin |

[PC]: Photo-cleavable modification
[EI]: Extension inhibitor
[PCEI]: Photo-cleavable polymerase extension inhibitor
N*: Nucleobases with photo-cleavable/photo-removable base pairing inhibitors 2. Light-Stop Primers Light-stop primers are NA constructs that can act as the initiation site for polymerases and facilitate NA synthesis in the presence of a nucleic acid template. When light is applied, these light-stop primers can become inactive and cannot enable further NA synthesis. The light-stop primers may be active prior to a light exposure, but may become inactive after being subjected to a light source. FIGS. 11A-11D demonstrate examples of light-stop primers and applications thereof with their corresponding example sequences listed in Table II.

Figures 11A, 11B, 11C, 11D:
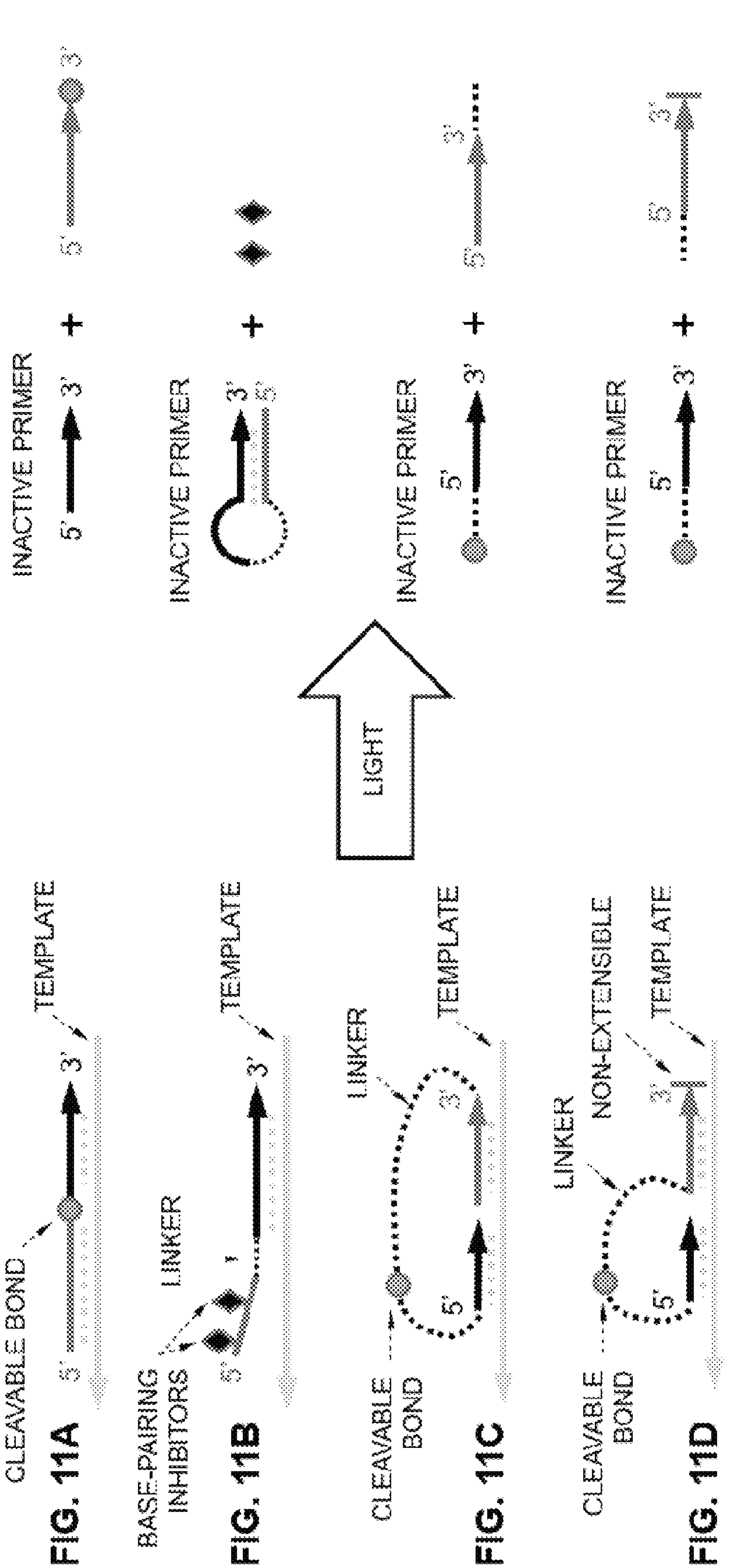
FIGS. 11A-11D show examples of light-stop primers.

FIGS. 11A and 11B show examples of the light-stop cooperative primers comprising photo-cleavable modifications. Applying light can break the NA constructs and subsequently make the priming thermodynamically unfavorable. The primers may comprise a cleavable bond between two segments of the primer and may require the two linked segments of the primer to hybridize to the same template in order to form a stable primer-template heterodimer. The primers may be active to enzymatic reactions prior to a light exposure. After exposed to the light, the two segments of the cooperative primer may be separated due to the cleavage of the cleavable bond, and may become inactive because the binding of only one segment to the template may become thermodynamically unfavorable for the primer-template heterodimer for each segment.

FIGS. 11C and 11D show examples of light-stop hybridization primers. In FIG. 11C the light-stop primer is designed with a photo-cleavable modification such that applying light can break the primer into separated parts, and can subsequently reduce the base-pairing strength of the transformed primer-template heterodimer, As a result, the priming becomes thermodynamically unfavorable and the primer-template heterodimer can be broken. In FIG. 11D the light-stop primer is designed using a base-pairing inhibitor modifications distributed in the sequence of the primer. Applying light can remove the inhibition and can subsequently create a stable hairpin structure for the transformed primer. Because the transformed primer forms a hairpin structure, the primer-template heterodimer can be disrupted since it is thermodynamically unfavorable for the intermolecular hybridization when compared with the intramolecular hybridization of the hairpin structure.

TABLE II

| Example sequences for light-stop primers. | | |
|---|---|---|
| SEQ ID NO | Sequence | Primer Type |
| 5 | 5'-CTCGGTCGTCCA[**PC**]ATATCGAA-3' | internal photo-cleavable bond modification |
| 6 | 5'-**T***T**C*G***A**T***ATT[**LK**]CTCGGTC GTCCAATATCGAA-3' | base-pairing inhibitors |
| 7 | 5'-CGTCCAATATCGAA-3'[**LK**][**PC**][**LK**]5'-CTCGGT-3' | co-operative primer systems with photo-cleavable modification |
| 8 | 3'-CTGGCTC-5'[**LK**][**PC**][**LK**]5'-GTCCAATATCGAA-3' | co-operative primer systems with photo-cleavable modification |

[LK]: Non-extensible linker
[PC]: Photo-cleavable modification
N*: Nucleobases with photo-cleavable/photo-removable base pairing inhibitors 3. Light-Start Hybridization Probes Light-start hybridization probes are NA constructs that can specifically identify with and base pair with their complementary sequence only after light is applied. Prior to that, the light-start hybridization probes are inactive and cannot hybridize to their complementary sequence. Examples of light-start hybridization probes are shown in FIGS. 12A and 12B with their corresponding example sequences listed in Table III.

Figures 12A, 12B:
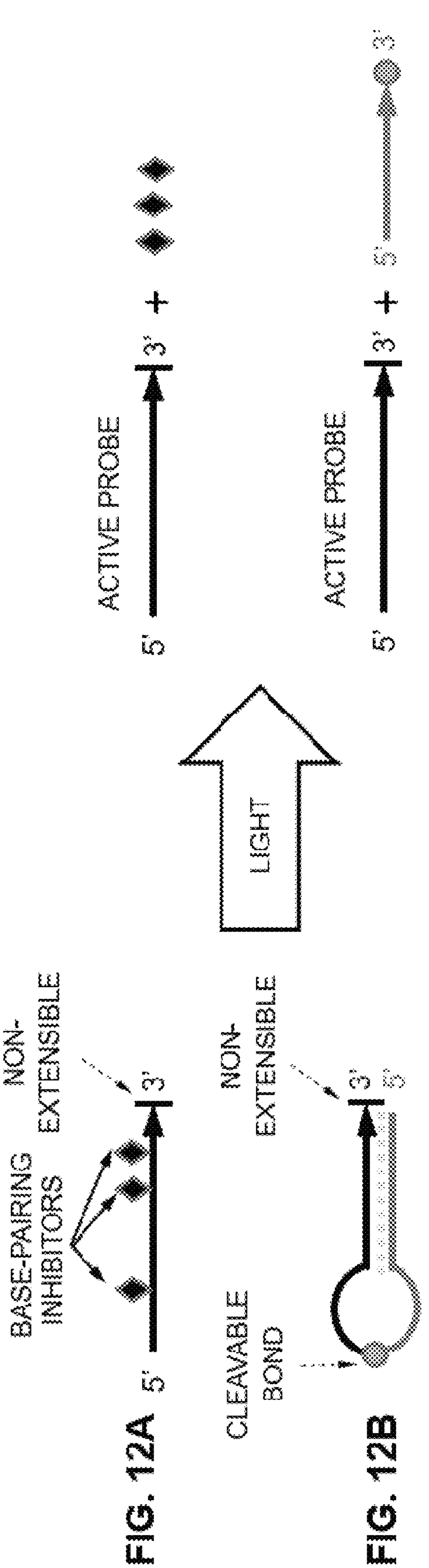
FIGS. 12A-12B show examples of light-start hybridization probes.

In FIG. 12A the light-start hybridization probe is designed using a base-pairing inhibitor modification. Initially, the light-start hybridization probe comprising the base-pair inhibitors cannot hybridize to its complementary sequence. Applying light can remove the inhibition to hybridization due to the removal of the base-pairing inhibitors and can allow base-pairing, thereby the transformed light-start hybridization probe can hybridize to its complementary sequence.

In FIG. 12B the light-start hybridization probe is designed to comprise a photo-cleavable hairpin monomer structure. Initially, the probe base-pairing to its complementary sequence is thermodynamically unfavorable due to the presence of the hairpin monomer having intramolecular hybridization. Applying light can disrupt the hairpin by cutting the probe into two separated parts, and make the transformed probe available for base-pairing and hybridization to its complementary sequence.

TABLE III

Example sequences for light-start hybridization probes.

| SEQ ID NO | Sequence | Hybridization Probe Type |
|---|---|---|
| 9 | 5'-ACC*G*TTAG*GATG*C-3'-[**EI**] | base-pairing inhibitors |
| 10 | 5'-GCATCCTAACGGTTAA[**PC**]AATAC CGTTAGGATGC-3'-[**EI**] | Hairpins with photo-cleavable modification |

[EI]: Extension inhibitor
[PC]: Photo-cleavable modification
N*: Nucleobases with photo-cleavable/photo-removable base pairing inhibitors 4. Light-Stop Hybridization Probes Light-stop hybridization probes are nucleic acid constructs that can specifically identify with and base pair with their complementary sequence. However, upon exposure to light, they can become inactive and cannot hybridize to their complementary sequence anymore.

Figures 13A, 13B:
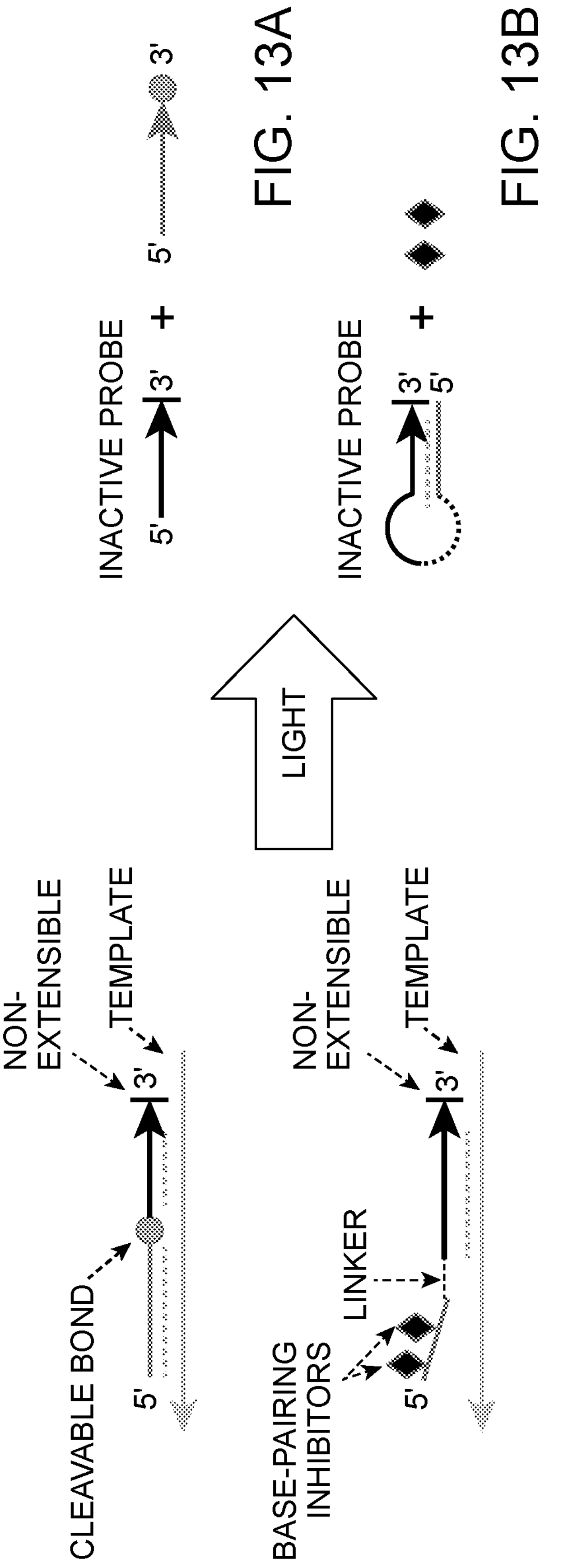
FIGS. 13A-13B show examples of light-stop hybridization probes.

In FIGS. 13A-13B examples are shown for the light-stop hybridization probe structures with their corresponding example sequences listed in Table IV.

In FIG. 13A, a the light-stop hybridization probe is designed to comprise a photo-cleavable modification linking two segments of the light-stop hybridization probe. Before exposure to light, both segments of the light-stop hybridization probe hybridize to the target NA, thereby staying in the active molecular state. Upon exposure to light, the light-stop hybridization probe can break the photo-cleavable bond, thereby producing two unlinked segments of the light-stop nucleic acid probe, and can make the probe-template heterodimer formation thermodynamically unfavorable. For example, at least one segment can be designed to have non-complementary sequences with respect to the target nucleic acid and may provide a signal change if not hybridized with the target nucleic acid or separate from the other segment of the light-stop hybridization probe. At least one segment of the transformed light-stop hybridization probe can be in the inactive molecular state.

In FIG. 13B, the light-stop hybridization probe is designed to comprise one or more base-pairing inhibitors. Before exposure to light, the presence of the base-pairing inhibitors may prevent self-base pairing within the light-stop hybridization probe to form a hairpin structure. Instead, the light-stop hybridization probe hybridize to the target nucleic acid, thereby staying in the active molecular state. Upon exposure to light, the light-stop hybridization probe can remove the base-pairing inhibition and can create a stable hairpin structure for at least one segment of the transformed light-stop hybridization probe, thereby making the probe-template heterodimer formation thermodynamically unfavorable. The hairpin structure of the light-stop hybridization probe can be in the inactive molecular state.

TABLE IV

Example sequences for light-stop hybridization probes.

| SEQ ID NO | Sequence | Hybridization Probe Type |
|---|---|---|
| 11 | 5'-ACCGTTA[**PC**]GGATGC-3'-[**EI**] | photo-cleavable modification |
| 12 | 5'-GC*A*TCCT*AACG*G*T[**LK**]AA TACCGTTAGGATGC-3'-[**EI**] | base-pairing inhibitors |

Figure 14:
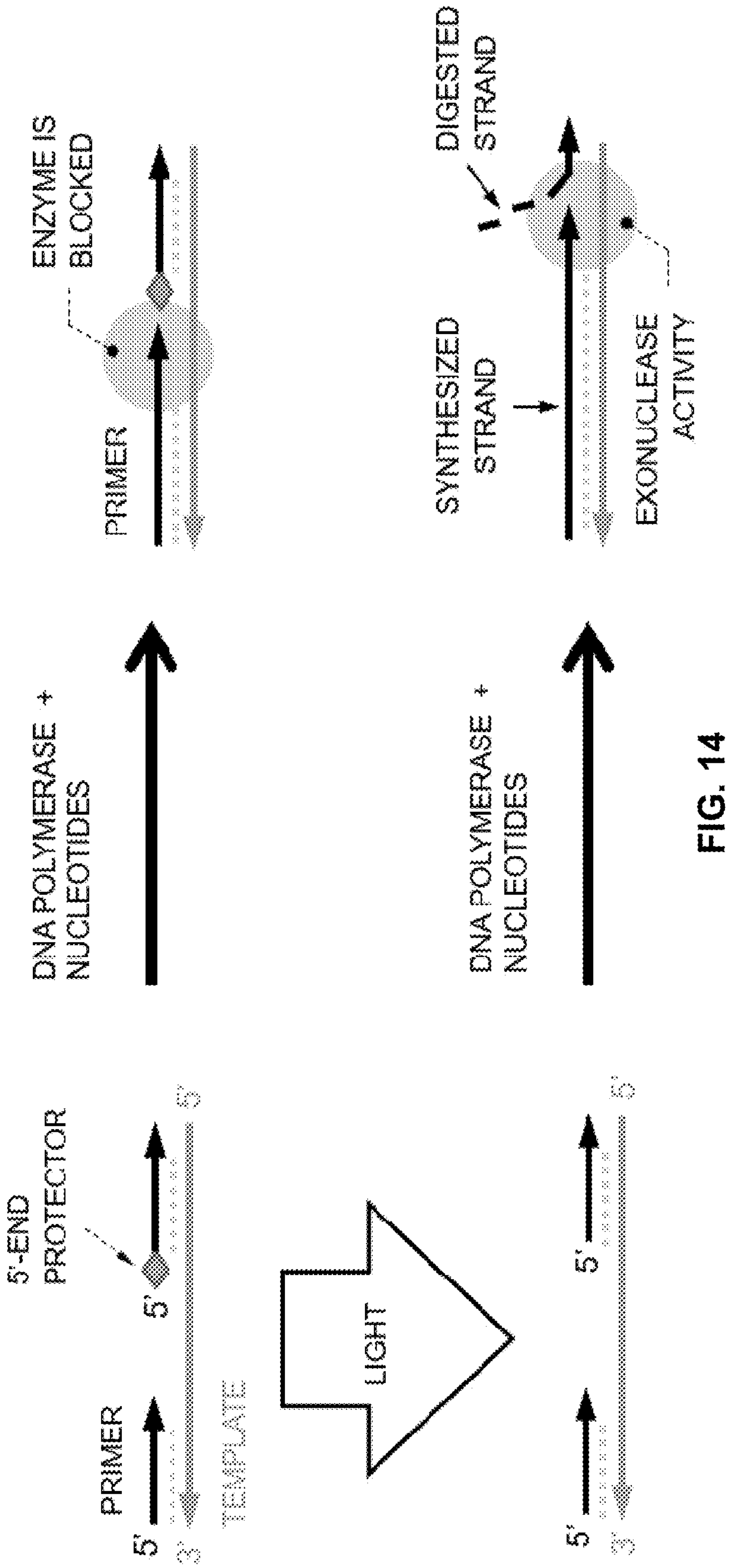
FIG. 14 schematically illustrates an example of 5'-end exonuclease protector FIG. 15 schematically illustrates an example of light-enabled nested PCR.

[EI]: Extension inhibitor
[PC]: Photo-cleavable modification
N*: Nucleobases with photo-cleavable/photo-removable base pairing inhibitors 5. Light-Start 5'-End Exonuclease Probes Light-start 5'-end exonuclease probes are NA constructs comprising a 5'-end exonuclease protector modification that can be removed by light. The 5'-end exonuclease protector can be a photosensitive system or photosensitive chemical moiety chemically attached to the 5'-end terminal unit of the NA sequence. Because of the presence of the 5'-end exonuclease protector, the 5'-end digestion of the nucleic acid strand by exonuclease enzymes can be blocked and the nucleic acid strand is protected from cleavage or digestion. The light-start 5'-end exonuclease probes are in the inactive molecular state. Upon exposure to light the 5'-end exonuclease protector can be removed, and 5' to 3' strand digestion can be facilitated. For example, such a nucleic acid constructs is shown in FIG. 14 where DNA polymerase 5'-end exonuclease is initially blocked, and exposure to light can remove the blocking group and allow the enzyme to digest the strand.

In general, heteroatoms on the nucleobase, 3'-OH, 5'-OH, and the phosphate group (at either 3' or 5' positions) can bond to a photosensitive chemical moiety, such as, for example, any one shown in FIG. 1. A photocleavable linker can have one or more photosensitive chemical moieties attached to the ends of the linker such that upon exposure to light, the one or more photosensitive chemical moieties can break away from the nucleic acid fragments they attached to. Various photocleavable chemical moieties can be used in various ways.

TGF System Overview

The present disclosure provides methods, devices, reagents and systems based on time-gated fluorescence (TGF). The system may comprise a TGF based biochip. The TGF biochip may be semiconductor-integrated. In some cases, the semiconductor platform and manufacturing process through which the system is created is complementary metal-oxide-semiconductor (CMOS).

The methods and systems of the present disclosure may be used to detect, analyze, and/or quantify a plurality of analytes present in an aqueous sample through TGF transduction methods. The TGF CMOS biochip can be a monolithically-integrated biosensor array with addressable locations. See, e.g., U.S. Pat. Nos. 9,708,647, 9,499,861 and 10,174,367, each of which is entirely incorporated herein by reference. Each addressable location may comprise an independently operating TGF photo-sensor that detects TGF signals from its dedicated sensing area. The sensing/detection may be conducted in real-time and in the presence of an aqueous sample, or when such a sample is washed away. The TGF photo-sensor can adopt periodic charge integration (PCI) methods in which periodical signal accumulation is performed by applying multiple time-gated excitation pulses. The TGF CMOS biochip system can physically interface with the aqueous sample and apply physiochemical processes to the sample, including, for example, applying time-varying temperature profiles, biochemical reagents, or pulsed excitation photon fluxes to the sample.

Figure 18:
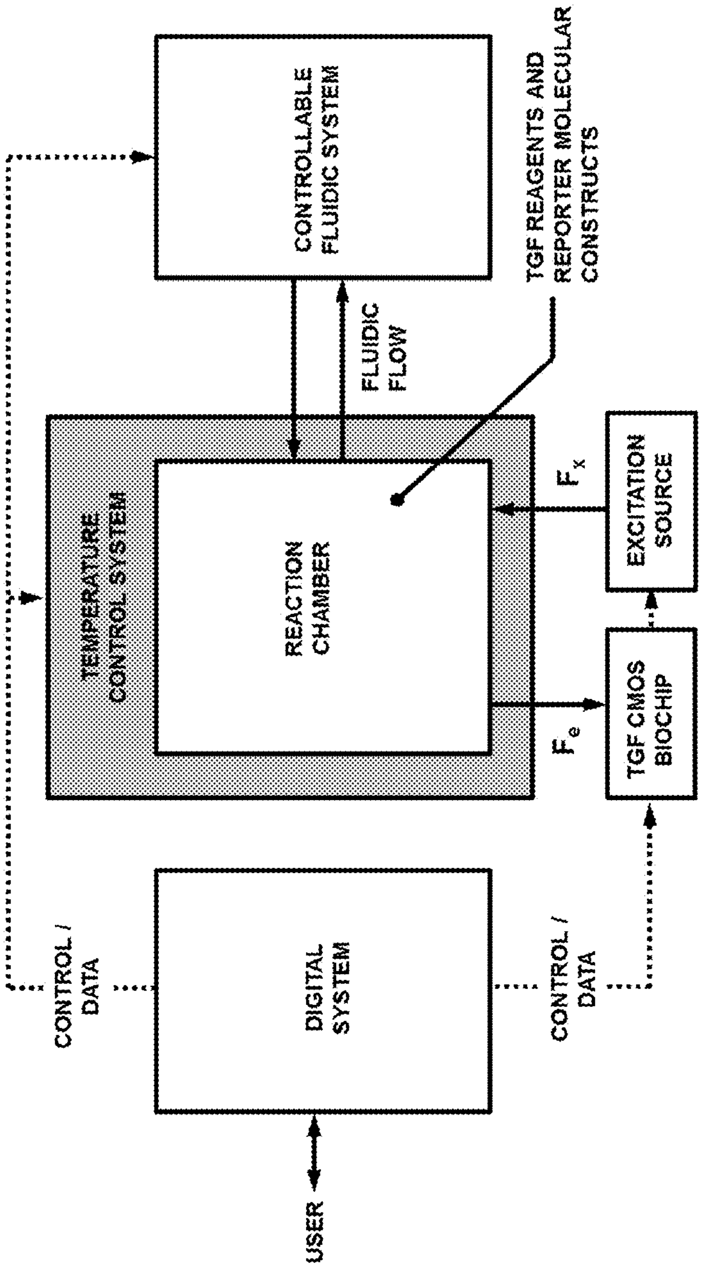
FIG. 18 illustrates architecture and functional blocks of an example time-gated fluorescence (TGF) system.

The TGF CMOS biochip system, as illustrated in FIG. 18, can comprise of components including, but not limited to:

1. TGF CMOS biochip which can identify and detect analytes interfaces to its top surface through TGF transductions methods in a 2D-array format;
2. Reaction Chamber which can interface the sample fluid (e.g., a fluidic aqueous sample that includes the analytes) with the TGF CMOS biochip;
3. Excitation Source which can introduce wavelength-specific photon flux into the reaction chamber and/or TGF CMOS biochip surface in a controlled fashion and synchronized with the TGF CMOS biochip operation;
4. Controllable Fluidic System configured to move into and/or, remove and/or, hold the reagents and/or sample from, and into, the reaction chamber in a controlled fashion and synchronized with the TGF CMOS biochip operation;
5. Temperature Controller which can set the temperature of the fluidic within the reaction chamber in a controlled fashion and synchronized with the TGF CMOS biochip operation; and
6. TGF Reagents and Reporter Molecular Constructs which can enable the detection of the analytes and targets by the TGF CMOS biochip within the reaction chamber and according to a specific assay methodology.
7. Digital System which can coordinate the operation of one or more components comprised in the system, collect the data and/or communicate the data to a processing and/or data analysis unit.

TGF CMOS Biochip

Figure 19:
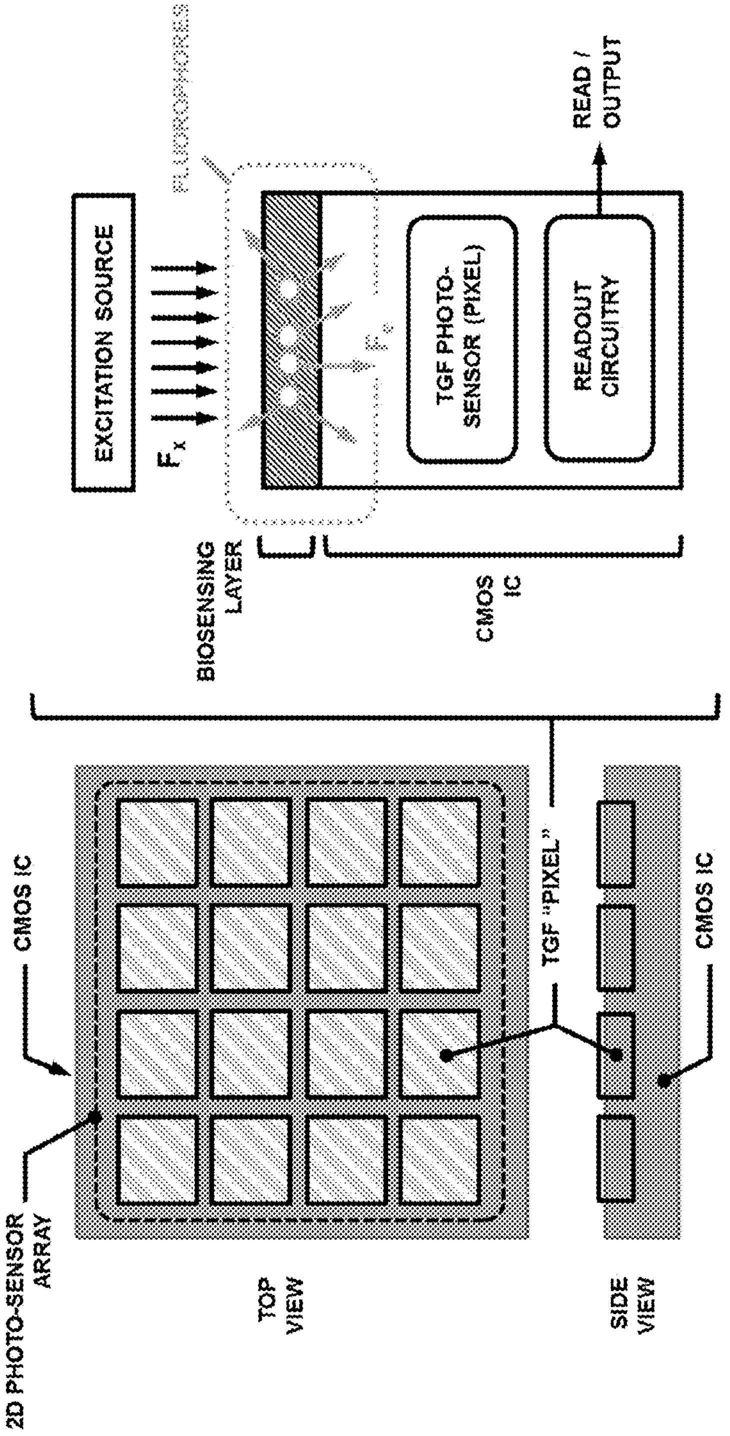
FIG. 19 illustrates architecture and functional blocks of an example time-gated fluorescence (TGF) complementary metal-oxide semiconductor (CMOS) biochip.

As shown in FIG. 19, The TGF CMOS biochip can comprise components including, but not limited to:

A. (MOS Integrated Circuit (IC), which can include the following functional blocks embedded within its monolithically-integrated semiconductor substrate:
   i. TGF photo-sensor array comprising a plurality of detectors in a 2D array format. The individual detectors (e.g., a "biosensing element" or "pixel") can measure the emitted photon flux from the fluorophores ($F_e$) at their addressable location, in parallel, simultaneously, and independently. The detectors can also adopt periodic charge integration (PCI) TGF methods;
   ii. Readout circuitry which may acquire data from individual TGF pixels and communicate them sequentially, in parallel, or a combination thereof, to an off-chip unit (external destination); and
   iii. On-chip passive resistive heater and temperature sensor.
B. Biosensing Layer, which can be located on a surface of the CMOS IC and can utilize TGF methods to create analyte-specific, localized TGF signal coupled with the TGF pixels. The biosensing layer may comprise a plurality of probes at independently (and/or individually) addressable locations on a solid surface. Each pixel can comprise a plurality of identical or different probes molecules that can specifically bind to or interact with a specific target/analyte or reagents in the reaction chamber;

CMOS Integrated Circuits (IC)

Figure 20:
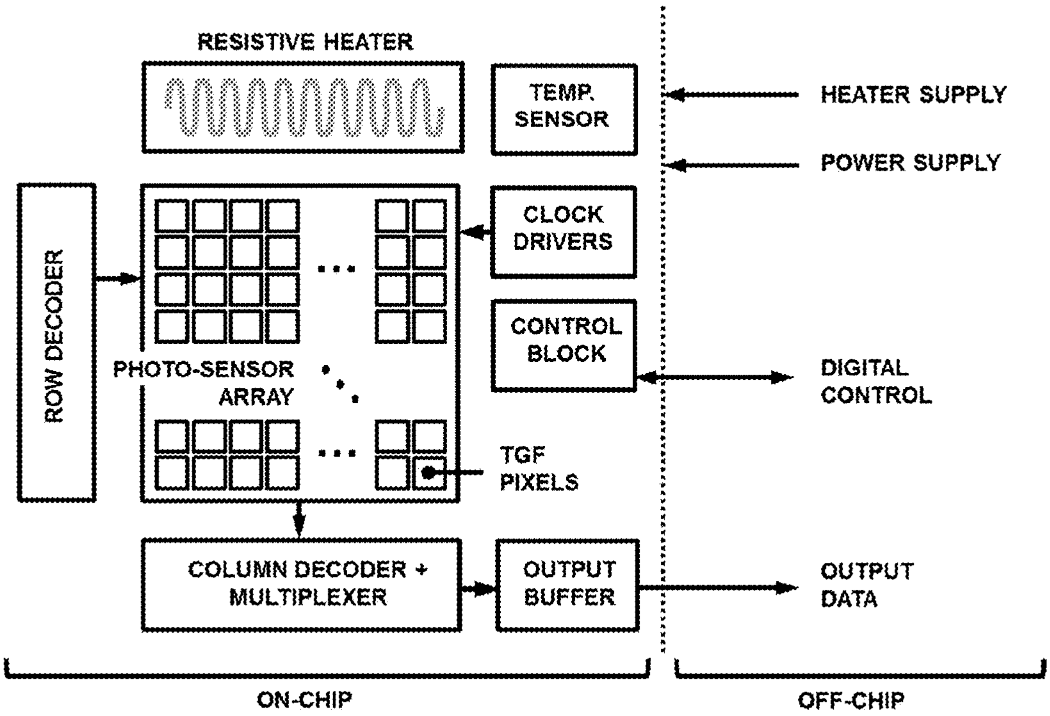
FIG. 20 illustrates architecture of an example CMOS integrated circuit (IC) for the TGF CMOS biochip system.

The architecture of the integrated CMOS IC for the TGF biochip is illustrated in FIG. 20. The CMOS die include a 2D photo-sensor array, with a similar general readout circuitry architecture to other biosensor arrays. See, e.g., U.S. Pat. Nos. 9,708,647, 9,499,861 and 10,174,367, each of which is entirely incorporated herein by reference. The photo-sensor array, where identical CMOS embedded TGF pixels are placed may be read sequentially (i.e., one pixel at a time) using a row and column decoder. The output of the chip, sent to off-chip through an output buffer, can be either analog or digital.

The chip may also include a resistive heater and a temperature sensor to accommodate the temperature control of the reaction chamber (e.g., Hassibi, A. et al. "A fully integrated CMOS fluorescence biochip for DNA and RNA testing," IEEE Journal of Solid-State Circuits, 52(11):2857-2870, 2017). In addition, the CMOS IC can also include a control block to be programmed and accessed off-chip by the user to set the functionality of the chip and manage the data acquisition.

Figure 21:
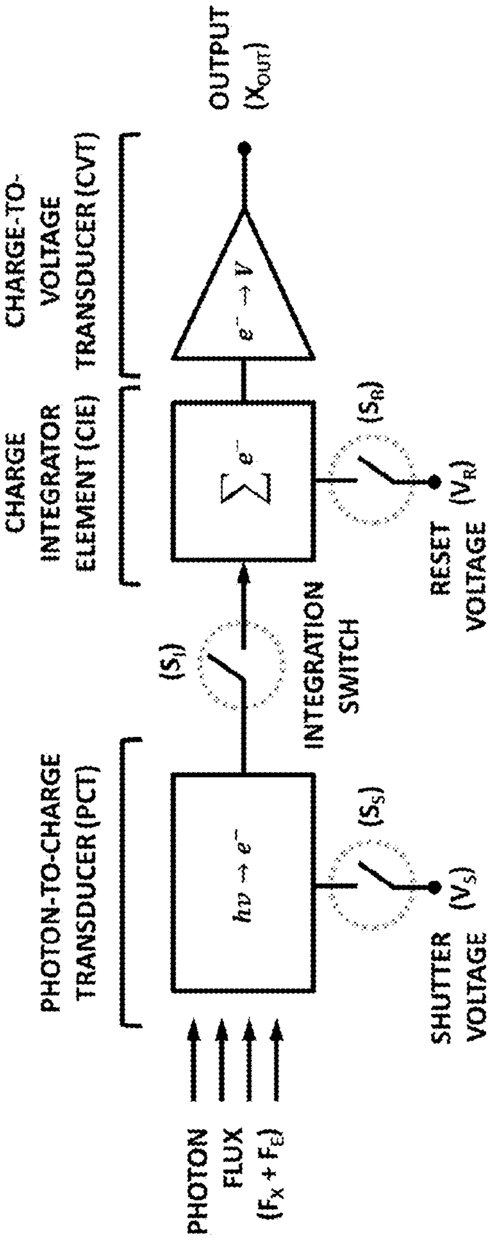
FIG. 21 shows topology of an example TGF pixel with an electronic shutter and periodic charge integrating (PCI) capability.

The general topology of an example TGF pixel is shown in FIG. 21. The TGF receive both $F_e$ and $F_x$ from the addressable location on its biosensing layer and the photons may be converted into electrical charge by using a photon-charge transducer (PCT). Examples of PCT in CMOS processes include lateral photodiodes (e.g., Cauwenberghs, G., et al. "Which photodiode to use: A comparison of CMOS-compatible structures," IEEE sensors journal, 9(7):752-760, 2009), or pinned photodiode devices (e.g., Hondongwa, D. B. et al. "A review of the pinned photodiode for CCD and CMOS image sensors," IEEE J. Electron Devices Soc., 2(3):33-43, 2014). The PCT device may comprise two switches connected to it. The first may be an electronic shutter switch ($S_S$) which removes the charge completely out of the PCT through connecting it to the electronic shutter voltage source ($V_S$). The second may be an integration switch ($S_I$) which transfer the created charge into a charge integrator element (CIE). The CIE device may be continually connected to a charge-to-voltage transducer (CVT) to produce a TGF pixel output. In addition, the CIE may have a reset switch ($S_R$) to remove the integrated charge at any time and basically "reset" the CIE output value to $V_R$.

Figure 22:
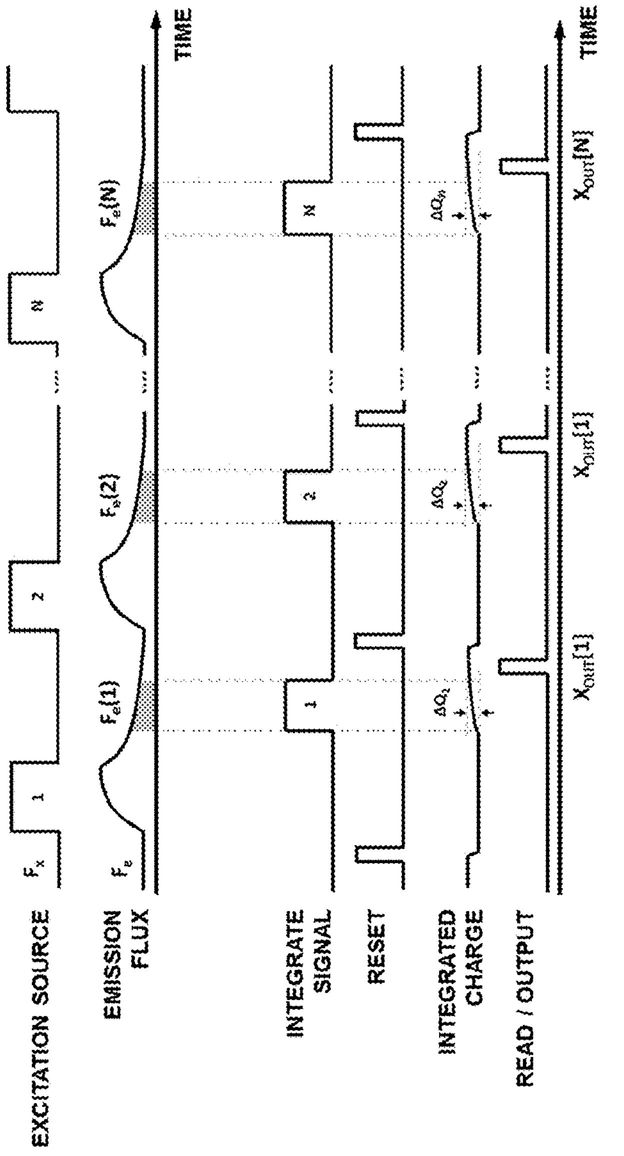
FIG. 22 shows timing diagram of a conventional TGF system.

TGF pixel of the present disclosure may be different from conventional detectors for TGF or time-resolved fluorescence. One difference is the absence of the $S_S$ and $S_I$ and the capability of selectively discarding or integrating the generated charge of the PCT. In FIG. 22, an example timing diagram for the operation for a conventional TGF system is shown. As FIG. 22 shows, $F_e$ is measured after every N individual $F_x$ pulse by quantifying the photo-induced charge during integration time intervals. The N outputs ($X_{OUT}[1]$ to $X_{OUT}[N]$) are then averaged to estimate, $F_e$. Multiple challenges and non-idealities may exist with this system. For example:

- It may be needed to take N consecutive measurements (reads) to estimate $F_e$ or every pixel. Since $F_e$ may be low, extensive averaging may be required and, for example, values of N>100 may be needed in such TGF systems.
- Due to the low level of signal (e.g., 10 total electrons per $F_e$ pulse), CVT may require very high gain (e.g., >20 μV/e) with an analog-to-digital quantization noise of equivalent to less than a few electrons per read.

When large biosensor arrays may be implemented with number of pixels M>1000, the number of reads per frame becomes N×M which can become quickly overwhelming. For example, if a fluorophore used in TGF has a lifetime of $\tau_L$=100 ns, it is possible to create the $F_x$ pulse sequence with period 1 ms=10 TL. If N=100 and M=1000, then the readout speed will be 105 reads/ms or 100 million sample/s. Given the noise requirements of the system, this may require very complex readout circuitry and call for a significant amount of power. As a result, one may consider reducing the pulse sequence frequency and essentially slowing down TGF measurements.

Figure 23:
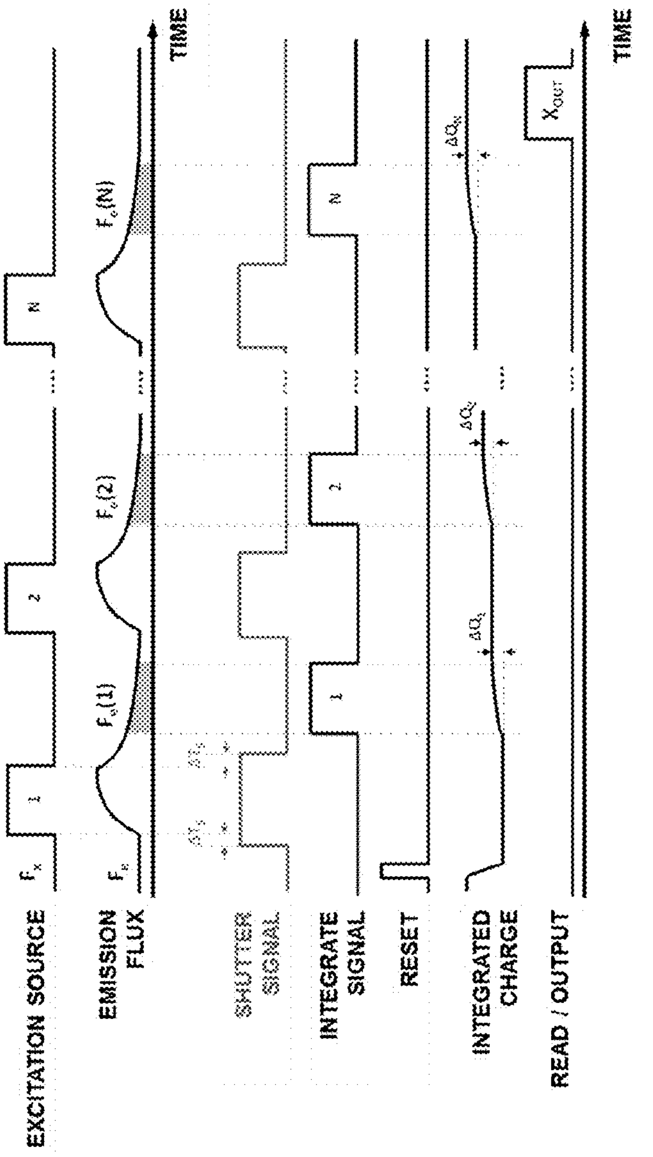
FIG. 23 shows timing diagram of an example periodic charge integrating (PCI) TGF pixel.

In the present disclosure, by using the topology shown in FIG. 20, the above-mentioned challenges may be addressed. FIG. 23, depicts a timing diagram of the TGF pixel of the present disclosure, which adopts an in-pixel periodic charge integration (PCI) scheme to improve both the speed and performance of the TGF measurements. As FIG. 23 shows, by using $S_S$ and $S_I$ and applying an electronic shutter, responses of N pulses of the PCT may be integrated into the CIE which may create a single output. This may enable a readout of output once every N pulses with an amplitude N times larger than conventional TGF. Additional advantages to this approach may include, but are not limited to:

One read in PCI-TGF may be equal to N reads in conventional TGF.

The accumulated charge and the output amplitude signal of PCI-TGF may be N times of conventional TGF and can be read N times slower. Therefore, PCI-TGF can use a much more relaxed the readout circuitry with lower speed and signal higher chain quantization noise.

When large biosensor arrays, with number of pixels, M>1000 elements are used, the required readout and pixel scanning speed requirement may be N times less than conventional TGF. Therefore, it may become quite feasible to create arrays with $M>10^6$, a number that may be necessary for the adoption of for massively parallel arrays used in life-science research.

The challenges in the implementation of PCI-TGF may revolve around the circuit and device implementation of the switches, efficient approaches of transferring charge in time intervals compatible with TGF, and CIE.

Biosensing Layer

The biosensing layer as provided herein may include an organic layer that may be created on top of a CMOS IC and interfacing the reaction chamber to: (a) form addressable location(s) for probes on top of the pixels; and (b) enable TGF transduction by first capturing targets and subsequently creating TGF signals as a function of the probe target interactions and/or structure of the captured target.

Biosensing layers may be created by various methods. For example, specific probe structures may be physically printed, immobilized, or spotted or chemically synthesized on a surface. In some cases, probes are first randomly distributed within the array 2D surface and then identified prior to detecting the targets by alternative approaches that are known in the field. In some cases, the surface of the IC (typically made of $SiO_2$ or $Si_3N_4$) may be chemically modified with linkers and/or thin film structures to become compatible with probe attachment.

Figures 24A, 24B, 24C, 24D, 24E, 24F, 24G:
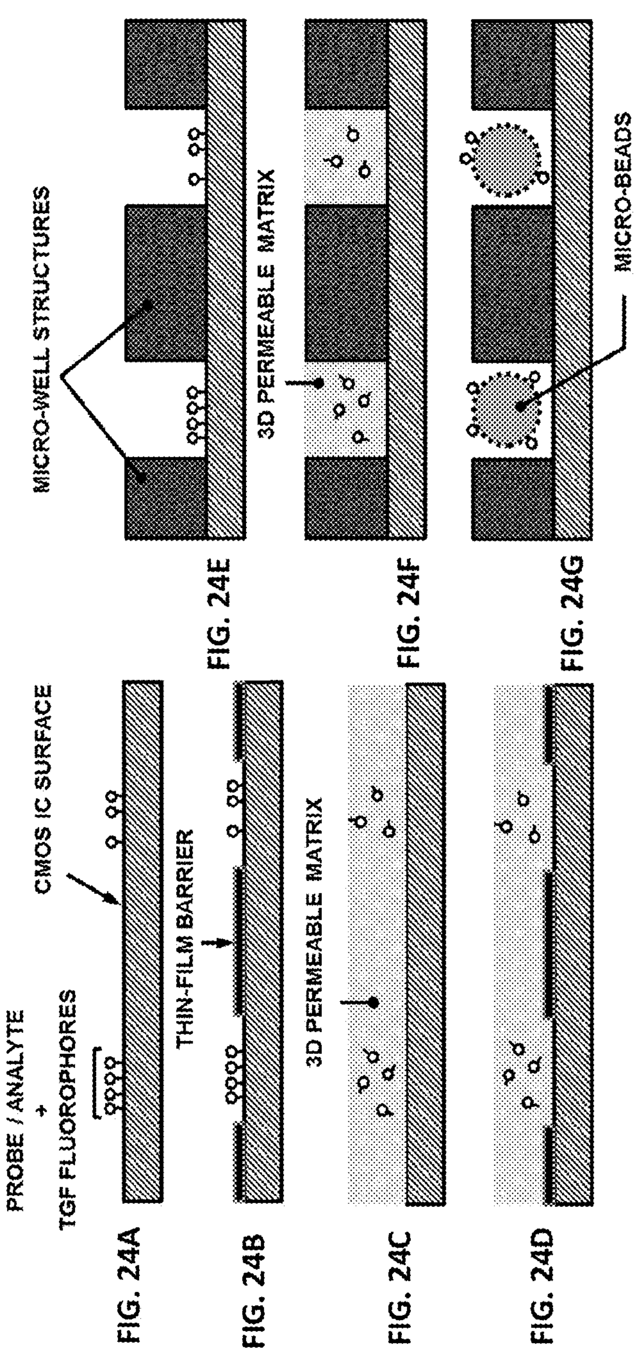
FIG. 24A shows a planar surface configuration of a biosensing layer structure for a TGF CMOS biochip in accordance with one of the embodiments of the present disclosure.
FIG. 24B shows a planar surface configuration of a biosensing layer structure for a TGF CMOS biochip with a thin film barrier in accordance with one of the embodiments of the present disclosure.
FIG. 24C shows a configuration of a 3D and permeable matrix coated on the surface of a biosensing layer for a TGF CMOS biochip in accordance with one of the embodiments of the present disclosure.
FIG. 24D shows a configuration of a 3D and permeable matrix coated on the surface of a biosensing layer with a thin film barrier for a TGF CMOS biochip in accordance with one of the embodiments of the present disclosure.
FIG. 24E shows a microwell configuration for a biosensing layer of a TGF CMOS biochip in accordance with one of the embodiments of the present disclosure.
FIG. 24F shows a microwell configuration for a biosensing layer with a 3D and permeable matrix coating the microwell for a TGF CMOS biochip in accordance with one of the embodiments of the present disclosure.
FIG. 24G shows a configuration of a combination of microwells and micro-beads with immobilized beads for a TGF CMOS biochip in accordance with one of the embodiments of the present disclosure.

FIGS. 24A-24G shows examples of biosensing structures that are compatible with CMOS ICs and TGF transduction methods, including PCI-TGF. In FIG. 24A and FIG. 24B, a planar surface may be implemented to immobilize probes and an addressable array may be created with and without a thin film barrier, respectively. In FIG. 24C and FIG. 24D, a 3D and permeable matrix may be coated on the surface to allow for probe immobilization at the intimate proximity of the surface) In FIG. 24E and FIG. 24F, microwells may be used to better isolate the immobilized probes and isolate the TGF pixels. In FIG. 24G, a combination of microwells and micro-beads with immobilized beads may be used to create an addressable array.

Reaction Chamber

The reaction chamber as provided herein may be a fluidic chamber that interfaces with the CMOS TGF biochip and contains the fluidic sample with analytes, targets, and other biochemical reagents that are required for the execution of the TGF assay.

The volume of this reaction chamber can be between about 0.1 μL to 10,000 μL, e.g., between about 1 μL to 100 μL.

The reaction chamber may comprise a plurality of inlets and outlets to accommodate the interfacing with the controllable fluidic system to insert or remove fluids.

To accommodate TGF, the fluidic system can provide a transparent optical travel path for the pulse $F_x$ to go through the fluidic and reach the biosensing layer. The transmittance in the wavelengths of $F_x$ can be from 1% to 99.9%, but typically is from 5% to 80%.

The reaction chamber can be built using a variety of materials such as polymers, glass, semiconductor, crystals, or ceramics materials, or a combination of them.

Excitation Source

The excitation source as provided herein may comprise an optical light source that can create a wavelength selective photon flux ($F_x$) with a controllable and time-varying amplitude. The light source may illuminate the biosensing layer of the system and the coordinates in which TGF transduction takes place.

The excitation source center wavelength can be anywhere between about 200 nm to 1500 nm, e.g., between about 300 nm to 800 nm.

The excitation source spectral span (bandwidth) may be from about 1 nm to 500 nm, e.g., from about 10 nm to 100 nm.

The excitation source photon flux may be directional and may be optically collimated.

The excitation source peak output power may be from about 10 mW to 100 W, e.g., from about 100 mW to 10 W.

The excitation source power may be controllable and modulated with bandwidth of up to about 1 GHZ, e.g., up to about 1 MHz The excitation source turns off and on times may be as fast as about 0.1 nanosecond (ns), e.g., as fast as about 1 microsecond (μs).

Controllable Fluidic System

The controllable fluidic system introduces into, and/or removes from, and/or confines within the reaction chamber aqueous media that can include samples and assay reagents, and/or TGF transduction reagents in a controlled fashion by the user. The workflow and sequence of each fluidic operation may be defined by the assaying method and can be, for example, flow-through and mono-directional, or closed-tube.

The controllable fluidic system may use fluidic components such as pumps, valves, and tubing to perform the workflow.

Temperature Controller

The temperature controller system can establish a specific temperature for the fluidic of the reaction chamber, and/or create a temperature profile that requires heating and/or cooling. A temperature controller can include a feedback control system that measures the temperature, using temperature sensors within the CMOS biochip IC and/or sensor devices coupled with the reaction chamber (such as a thermistor or a thermocouple), and, based on the measured temperature, add or remove heat from the reaction chamber using CMOS biochip IC heaters and/or thermal devices (such as Peltier devices or resistive heaters). Temperature controllers can comprise heat sinks for removing heat. Temperature controllers can have components within the CMOS IC, including resistive heaters and/or temperature sensors.

Temperature controllers can change the temperature of a substrate, reaction chamber, or array pixel. The rate of temperature change can be about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20° C./minute. The rate of temperature change can be at least about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20° C./minute. The rate of temperature change can be at most about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20° C./minute. Temperature controllers can change temperature at a linear rate (e.g., 5° C./second). Alternatively, temperature controllers can change temperature at a non-linear rate. Temperature controllers can increase or decrease temperature.

Digital System

The digital system is essentially a computing and controlling digital hardware And embedded software than can control and coordinate the functionality of the components of the system.

TGF Reagents and Reporter Molecular Constructs

To enable TGF transduction, we can use molecular structures and constructs that exhibit fluorescence activity. Such molecular structures are sometimes referred to as fluorophores (or fluorochromes, similarly to chromophores) which are chemical compound that can re-emit light upon light excitation with life-times from about 10 ps to 10 ms, e.g., from about 1 ns to 100 ns.

As provided herein, various types of fluorophores can be adopted by a TGF system. In some cases, fluorophores that have longer life-times, e.g., greater than about 100 ns, may be used. In cases where fluorophores with longer lifetime are used:

- Longer life-time fluorophores may require lower speed PCI-TGF systems in the CMOS Biochip IC;
- The excitation source switching speed can be more manageable, and more cost-efficient light sources can be used; and
- The negative effects of background autofluorescence from the biological sample and/or materials in the fluidic chamber and/or biolayer may be mitigated, if the they have shorter life-time compared to the adopted TGF fluorophore.

TGF systems may not need an excitation and emission filter set, or other filters of wavelength to transmit a desired signal for an analyte and/or remove background fluorescence from signals of the analyte. In some cases, the emission filter may filter out violet, blue, green, yellow, orange, and red light, or any combination thereof.

Various types of fluorophores may permit multi-color capabilities. In TGF, differentiating fluorophores may be determined by the differences in their fluorescence lifetimes after excitation. In some cases, these fluorophores can be reactive and/or conjugated dyes, nucleic acid dyes, fluorescent proteins, and cell function dyes. Once emission light is pulsed in the direction of a substrate containing the fluorophore species, a shutter may close off the detection apparatus from the emission light and the reflected emission light. The shutter may be removed to let in the desired fluorescent light. A first fluorophore with a shorter lifetime can be detected among the detected signals if the shutter opens shortly after the emission is stopped. A second fluorophore with a longer lifetime can be detected if the shutter is opened after waiting for a longer time after the emission is stopped. In this scenario, the second fluorophore (longer lifetime) may be detected with little or no interference of the first fluorophore (shorter lifetime). In addition, readings of the signals corresponding to the first fluorophore (shorter lifetime) in the presence of the second fluorophore (longer lifetime) can be estimated or calculated by calibration of the detected signals using information about the second fluorophore (longer lifetime) detected and/or determined later. Other experimental designs for the multiplex detection of multiple fluorophores are possible with or without the use of emission and excitation filter sets. Accordingly, multiple fluorophores can be detected in a single experiment by the opening and closing of the shutter following the emission in the absence of excitation and emission filter sets. Individual species of fluorophores can be detected based on the differences in their decay rates by varying the delay profiles of the shutter and the time during which the shutter is opened. The multi-color capability may be limited by shutter speed and the overlap between fluorescence decay rates of the fluorophores to be detected.

For example, in some examples, metal chelate, such as Lanthanide chelates can be used as TGF fluorophores. In some cases, TGF fluorophores may predominantly act as molecular reporters in TGF assays either as a standalone reporter or an element (donor or acceptor) in a fluorescence energy transfer moiety. Examples include, but are not limited to, Förster Resonance Energy Transfer (FRET) technologies. See Song, Y., et al., "Development of FRET assay into quantitative and high-throughput screening technology platforms for protein-protein interactions," *Annals of biomedical engineering* 39(4):1224-1234, 2011. The role of TGF fluorophores may include facilitating the generation of a specific TGF signal that may be correlated to the presence or absence of a molecular reaction or presence or absence of a specific target molecule.

TGF fluorophores can be used as labels for specific target analytes, in applications where the targets can be chemically modified to incorporate a TGF fluorophore. Examples includes, but are not limited to, Northern blots, Southern blots, DNA microarrays, quantitative Polymerase Chain Reaction (PCR), digital PCR, and diagnostic assays.

- In microarrays and Northern blots, the mRNA target analyte may be converted into a fluorophore-labelled complementary DNA (cDNA), for example, through reverse transcription.
- In Southern blots, a fluorophore-labeled cDNA may be used to identify a target sequence.
- In quantitative polymerase chain reaction (PCR) and digital PCR (dPCR), the fluorophore may be incorporated into an amplified nucleic acid sequence or a primer sequence to demonstrate the accumulation of a target sequence (See, e.g., Y. Wong et al., "Applications of digital PCR in precision medicine," Expert Review of Precision Medicine and Drug Development 2(3): 177-186, 2017).
- In a diagnostic assay, a device may be used to sequester target nucleic acids, and a fluorophore-labelled cDNA may be used for direct detection.

TGF fluorophores can also be used as labels for the detection of probes in sandwich assays. Examples include, but are not limited to, Western Blots, Enzyme-Linked Immunosorbent Assay (ELISA), Enzyme-Linked Immuno SPOT (ELISPOT) including FluoroSpot (See, e.g., G. Kesa et al., "Comparison of ELISpot and FluoroSpot in the Analysis of Swine Flu-Specific IgG and IgA Secretion by in Vivo Activated Human B Cells," Cells 1(2): 27-34, 2012), and protein arrays.

In these methods, the TGF fluorophores may be used as a direct method for detection, in which the fluorophore is conjugated to the primary detection antibody.

In these methods, the TGF fluorophore may also be used as an indirect method for detection, in which the fluorophore is conjugated to a secondary antibody.

ELISPOT is a type of assay that quantitatively measures the frequency of cytokine secretion for a single cell. The ELISPOT Assay is also a form of immunostaining that uses antibodies to detect an analyte, including but not limited to, any biological or chemical substance being identified or measured, such as, for example, protein analyte.

The FluoroSpot Assay is a variation of the ELISpot assay. The FluoroSpot Assay uses fluorescence to analyze multiple analytes. It can detect the secretion of more than one type of protein or other analytes.

TGF fluorophores can be used as labels in cell sorting, counting, and detecting methods. An example may be flow cytometry, in which cells are labeled with a fluorophore.

In this method, the cells may be sorted and counted by their fluorescence profiles.

In this method, the specific cellular characteristics and/or functions may be identified by their fluorescence profiles.

TGF fluorophores can be used in applications where solid-phase and immobilized probes are labeled. Examples are inverse fluorophore assays (e.g., A. Hassibi et al., "Multiplexed identification, quantification and genotyping of infectious agents using a semiconductor biochip," Nature biotechnology, 36(8):738-745, 2018)

TGF fluorophores can be used in assays in which the chemical reactions are monitored while a target molecule is introduced to a reacting reagent. The target molecule and/or the reacting reagent may include TGF fluorophores. Examples are Sanger sequencing, Next Generation Sequencing (NGS) assays such as sequence-by-synthesis (SBS) (See, Ansorge; Metzker; and Pareek et al., "Sequencing technologies and genome sequencing," *J. Appl. Genet.,* 52(4):413-435, 2011), sequence-by-hybridization (SBH) (See, Qin, Schneider and Brenner, "Sequencing by Hybridization of Long Targets," *PLoS One.,* 7(5):e35819, 2012), and pyrosequencing.

In this method, Single Molecule Real Time (SMRT) sequencing and Illumina sequencing can use TGF fluorophore-labeled nucleotides to determine the sequence of a nucleic acid Sequence information of nucleic acids may be used to improve people's lives. (See, e.g., Ansorge, W., "Next-generation DNA sequencing techniques," New Biotech. 25(4):195-203, 2009). Several DNA sequencing platforms have been commercially available. The availability of parallel NGS technologies may enable the comprehensive analysis for biological targets, including but not limited to genomes, transcriptomes and interactomes. (See, e.g., Shendure, J. and Ji, H., "Next-generation DNA sequencing," Nature Biotech. 26:1135-45, 2008). However, although NGS technologies may produce comprehensive results, their turnaround time may be too slow to address the rapid progression of an infectious process in critically ill patients. In addition, while multiplexing a large number of target amplification reactions (e.g., multiplexed PCR) may be possible, but it is not straightforward to detect multiple amplicons simultaneously.

Commercially available NGS sequencing platforms may include the Illumina Genome Analyzer, the Roche (454) Genome Sequencer, the Life Technologies SOLID platform, and real-time sequencers such as those from Pacific Biosciences. These platforms may require the construction of a set of DNA fragments from a biological sample. In most cases, the DNA fragments are flanked by platform-specific adapters.

Example Embodiments with Photo-Triggered Na Constructs

Example 1: Light-Start PCR

Figure 15:
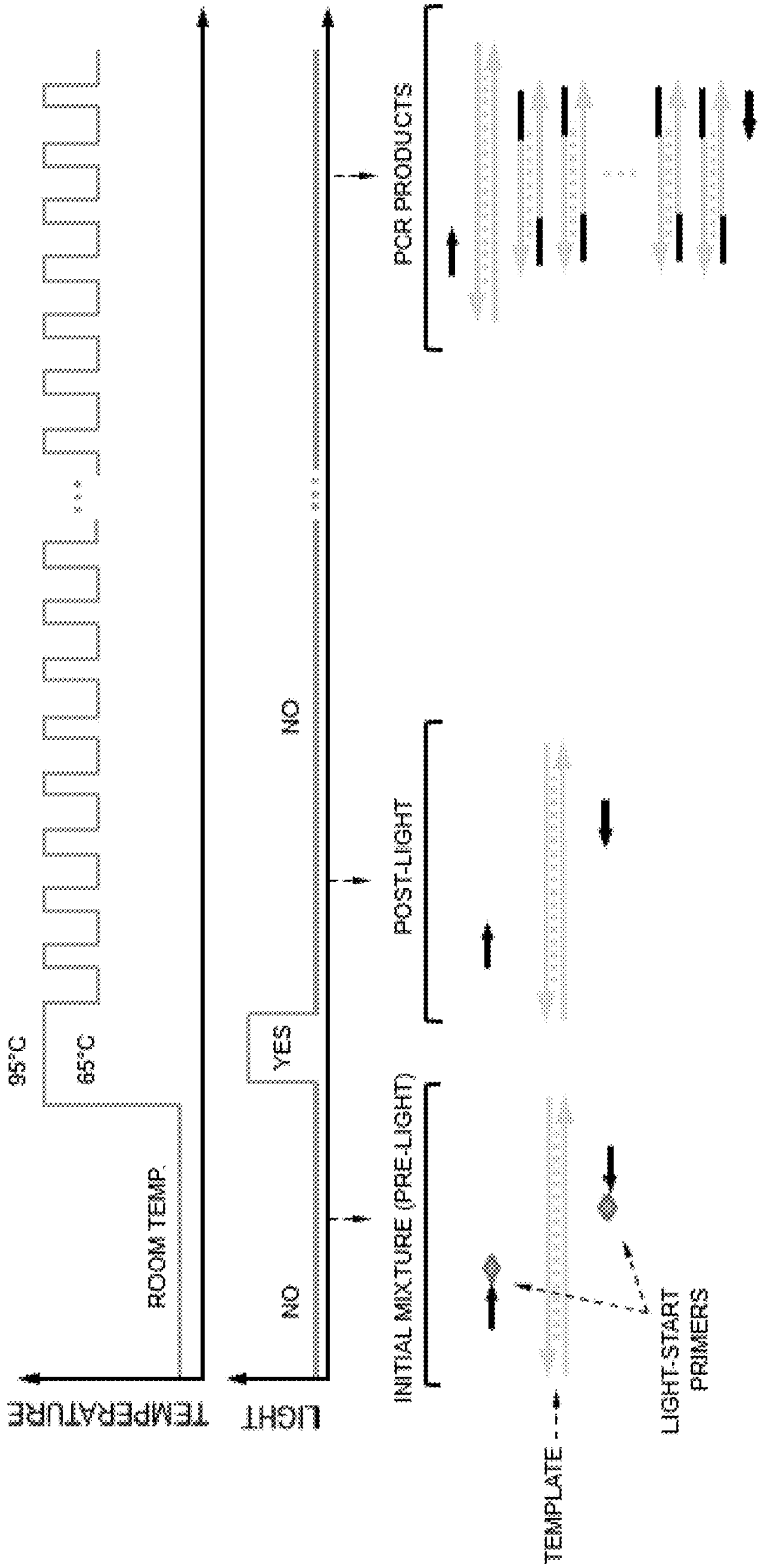

In this example, as depicted in FIG. 15, light-start primer pairs are used in a PCR assay. As depicted in FIG. 15, the PCR and elongation of primers starts after light is applied, but cannot start before the light is applied. Prior to the exposure to the light, neither polymerization, nor exponential amplification can occur because the primers are inactive due to the presence of 3'-end extension inhibitors (i.e., polymerase inhibitors at the 3'-end of the primers). The advantage of this method can be that it may reduce the presence of undesired products and/or primer-dimers that are due to non-specific DNA amplification at room (or colder) temperatures, for example during the introduction of the sample to the reaction or other pre-processing steps. Upon exposure to the light, the 3'-end extension inhibitors can be removed, and the primers can become active in polymerase-catalyzed extensions (i.e., extension of the growing strand, elongation).

This method, which henceforth can be referred to as "light-start PCR", can be an alternative to other PCR methods, such as, for example, hot-start PCR methods, where heating at elevated temperatures activate the amplification process. Sharkey D J, Scalice E R, Christy K G, Atwood S M, Daiss J L, "Antibodies as thermolabile switches: high temperature triggering for the polymerase chain reaction See Bio/Technology," 1994, 12(5): 506-9; N. Paul, J. Shum, T. Le, "Hot start PCR," Methods in Molecular Biology, Humana Press, 2010, 630:301-18. Thus, light-start PCR may not include reagents and molecules that act as thermolabile switches.

In some embodiments of this invention, both light-start PCR and hot-start PCR methods can be used to better ensure that the amplification remains inactive at lower temperatures and prior to PCR.

In some embodiments of this invention the light-start PCR is included in a quantitative PCR (Q-PCR) system. In some embodiments, a method employing the light-start PCR is a Q-PCR method comprising; (a) performing a nucleic acid amplification on two or more nucleotide sequences in the presence of at one light-start primer to produce two or more amplicons in a fluid; (b) providing an array comprising a solid surface with a plurality of nucleic acid probes at independently addressable locations, said array configured to contact said fluid; and (c) measuring the hybridization of the amplicons to the two or more nucleic acid probes while the fluid is in contact with the array to obtain an amplicon hybridization measurement wherein the amplicons comprise a quencher. In some embodiments, the primers comprising the light-primer are used to create the amplicons and the primers comprise a quencher. In some embodiments, one of the primers in a primer pair comprises a quencher. In some embodiments, both the primers in a primer pair comprise a quencher. In some embodiments, the quenchers are incorporated into the amplicons as they are formed. In some embodiments, deoxynucleotide triphosphates (d-NTP's) are used to make the amplicons, and one or more of the d-NTP's used to make the amplicon comprises a quencher. In some embodiments, the amplicon hybridization measurement is performed by measuring fluorescence from fluorescent moieties attached to the solid surface. In some embodiments, the fluorescent moieties are covalently attached to the nucleic acid probes. In some embodiments, the fluorescent moieties are attached to the substrate and are not covalently attached to the nucleic acid probes. In some embodiments, the amplicons comprise quenchers, and the measuring of hybridization is performed by measuring a decrease in fluorescence due to hybridization of amplicons to the nucleic acid probes.

In some embodiments, a method employing the light-start PCR is a Q-PCR method comprising: (a) providing an array comprising a solid support having a surface and a plurality of different probes, the different probes immobilized to the surface at different addressable locations, each addressable location comprising a fluorescent moiety; (b) performing PCR amplification on a sample comprising a plurality of nucleotide sequences; the PCR amplification carried out in a fluid, wherein: (i) a PCR primer for each nucleic acid sequence is a light-start primer and comprises a quencher; and (ii) the fluid is in contact with the probes, whereby amplified molecules can hybridize with probes, thereby quenching signal from the fluorescent moiety; (c) detecting the signals from the fluorescent moieties at the addressable locations over time; (d) using the signals detected over time to determine the amount of amplified molecules in the fluid; and (e) using the amount of amplified molecules in the fluid to determine the amount of the nucleotide sequences in the sample. In some embodiments, the determining of the amount of amplified molecules is performed during or after multiple temperature cycles of the PCR amplification. In some embodiments, more than one PCR primer for each nucleic acid sequence comprises a quencher. In some embodiments, the detecting of the signals from the fluorescent moieties at the addressable locations over time comprises measuring the rate of hybridization of the amplified molecules with the probes. In some embodiments, the sample comprises messenger RNA or nucleotide sequences derived from messenger RNA, and the determination of the amount of nucleic acid sequence in the sample is used to determine the level of gene expression in a cell or group of cells from which the sample was derived. In some embodiments, the sample comprises genomic DNA or nucleotide sequences derived from genomic DNA, and the determination of the amount of nucleic acid sequence in the sample is used to determine the genetic makeup of a cell or group of cells from which the sample was derived. In some embodiments, two or more PCR primers corresponding to two or more different nucleotide sequences have different quenchers. In some embodiments, two or more different addressable locations comprise different fluorescent moieties. In some embodiments, the different quenchers and/or different fluorescent moieties are used to determine cross-hybridization. In some embodiments, a diagnostic test for determining the state of health of an individual comprising performing the method of performing the Q-PCR method using a light-start primer on a sample from such individual.

In some embodiments, the Q-PCR method is a method for assaying at least one target nucleic acid molecule, comprising: (a) providing a reaction mixture comprising a nucleic acid sample containing at least one template nucleic acid molecule, a primer pair comprising said light-start primer and a polymerase, wherein the primer pair has sequence complementarity with the template nucleic acid molecule, and wherein the primer pair comprises a limiting primer and an excess primer; (b) subjecting the reaction mixture to a nucleic acid amplification reaction under conditions that are sufficient to yield the at least one target nucleic acid molecule as an amplification product of the template nucleic acid molecule and the limiting primer, which at least one target nucleic acid molecule comprises the limiting primer; (c) bringing the reaction mixture in contact with a sensor array having (i) a substrate comprising a plurality of probes immobilized to a surface of the substrate at different individually addressable locations, wherein the probes have sequence complementarity with the limiting primer and are capable of capturing the limiting primer, and (ii) an array of detectors configured to detect at least one signal from the addressable locations, wherein the at least one signal is indicative of the limiting primer binding with an individual probe of the plurality of probes; (d) using the array of detectors to detect the at least one signal from one or more the addressable locations at multiple time points during the nucleic acid amplification reaction; and (e) detecting the target nucleic acid molecule based on the at least one signal indicative of the limiting primer binding with the individual probe of the plurality of probes. In some embodiments, the at least one signal is produced upon binding of the probes to the limiting primer. In some embodiments, the reaction mixture comprises a plurality of limiting primers having different nucleic acid sequences, and the probes specifically bind to the plurality of the limiting primers. In some embodiments, the reaction mixture is provided in a reaction chamber configured to retain the reaction mixture and permit the probes to bind to the limiting primer. In some embodiments, the method further comprises correlating the detected at least one signal at multiple time points with an original concentration of the at least one template nucleic acid molecule by analyzing a binding rate of the probes with the limiting primer. In some embodiments, the probes are oligonucleotides. In some embodiments, the target nucleic acid molecule forms a hairpin loop when hybridized to an individual probe. In some embodiments, the sensor array comprises at least about 100 integrated sensors. In some embodiments, the at least one signal is an optical signal that is indicative of an interaction between an energy acceptor and an energy donor. In some embodiments, the energy acceptor is coupled to the excess primer and/or the limiting primer. In some embodiments, the energy acceptor is coupled to the target nucleic acid molecule. In some embodiments, the energy acceptor is a quencher. In some embodiments, the energy donor is a fluorophore. In some embodiments, the at least one signal is an electrical signal that is indicative of an interaction between an electrode and a redox label. In some embodiments, the redox label is coupled to the excess primer and/or the limiting primer. In some embodiments, the redox label is coupled to the target nucleic acid molecule. In some embodiments, (d) comprises measuring an increase in the at least one signal relative to background. In some embodiments, (d) comprises measuring a decrease in the at least one signal relative to background. In some embodiments, the target nucleic acid molecule is detected at a sensitivity of at least about 90%. In some embodiments, the at least one signal is detected while the reaction mixture comprising the target nucleic acid molecule is in fluid contact with the sensor array. In some embodiments, (b) comprises generating a plurality of target nucleic acid molecules having sequence complementarity with the template nucleic acid. In some embodiments, the array of detectors is configured to detect a plurality of signals from the addressable locations, wherein each of the plurality of signals is indicative of the limiting primer binding with an individual probe of the plurality of probes. In some embodiments, (d) comprises using the array of detectors to detect a plurality of signals from the addressable locations at the multiple time points, wherein each of the plurality of signals is indicative of the limiting primer binding with an individual probe of the plurality of probes. In some embodiments, (e) comprises identifying the limiting primer.

In some embodiments, the present disclosure provides a system for assaying at least one target nucleic acid molecule, comprising: (a) a reaction chamber comprising a reaction mixture comprising a nucleic acid sample containing at least one template nucleic acid molecule, a primer pair that has sequence complementary to the template nucleic acid molecule, and a polymerase, wherein the primer pair comprises a limiting primer and an excess primer, wherein the reaction chamber comprising the reaction mixture is configured to facilitate a nucleic acid amplification reaction on the reaction mixture to yield at least one target nucleic acid molecule as an amplification product of the template nucleic acid; (b) a sensor array comprising (i) a substrate comprising a plurality of probes immobilized to a surface of the substrate at different individually addressable locations, wherein the probes have sequence complementarity with the limiting primer and are capable of capturing the limiting primer; and (ii) an array of detectors configured to detect at least one signal from the addressable locations, wherein the at least one signal is indicative of the limiting primer binding with an individual probe of the plurality of probes; and (c) a computer processor coupled to the sensor array and programmed to (i) subject the reaction mixture to the nucleic acid amplification reaction, and (ii) detect the at least one signal from one or more of the addressable locations at multiple time points during the nucleic acid amplification reaction.

In some embodiments, the Q-PCR method is a method for assaying at least one template nucleic acid molecule, comprising: (a) activating a sensor array comprising (i) a substrate comprising a plurality of first probes immobilized to a first pixel, a plurality of second probes immobilized to a second pixel, wherein the first probes are configured to capture an individual primer of a primer set, and wherein the second probes are configured to capture a control nucleic acid molecule, and (ii) an array of detectors configured to detect at least one first signal from the first pixel and at least one second signal from the second pixel, wherein a difference between the at least one first signal and the at least one second signal over time is indicative of the individual primer binding with an individual probe of the plurality of first probes; (b) subjecting a reaction mixture to a nucleic acid amplification reaction under conditions sufficient to yield at least one target nucleic acid molecule as an amplification product(s) of the template nucleic acid molecule, wherein the reaction mixture comprises (i) a nucleic acid sample containing or suspected of containing the template nucleic acid molecule, (ii) the primer set, (iii) the control nucleic acid molecule, and (iv) a polymerizing enzyme, wherein the individual primer of the primer set has sequence complementarity with the template nucleic acid molecule; (c) using the array of detectors to detect the at least one first signal and the at least one second signal at multiple time points during the nucleic acid amplification reaction; and (d) using the difference between the at least one first signal and the at least one second signal to detect the template nucleic acid molecule. In some embodiments, the at least one first signal is produced upon binding of the individual probe to the individual primer, and wherein the at least one second signal is produced upon binding of an additional probe of the second probes to the control nucleic acid molecule. In some embodiments, the control nucleic acid molecule is not amplified in the amplification reaction. In some embodiments, the reaction mixture comprises a plurality of template nucleic acid molecules, and wherein the first probes specifically bind to a plurality of target nucleic molecules as amplification products of the plurality of the template nucleic acid molecules. In some embodiments, the primer set comprises a plurality of individual primers having different nucleic acid sequences, and wherein the first probes are configured to specifically bind to the plurality of the individual primers. In some embodiments, the reaction mixture is provided in a reaction chamber configured to retain the reaction mixture and permit the first and second probes to bind to the individual primer and the control nucleic acid molecule. In some embodiments, the method further comprises correlating the at least one first signal detected at multiple time points with an initial concentration of the at least one template nucleic acid molecule by analyzing a binding rate of the probes with the individual primer from the primer set. In some embodiments, the first probes or the second probes are oligonucleotides. In some embodiments, the sensor array comprises at least about 100 integrated sensors. In some embodiments, the at least one first signal is a first optical signal that is indicative of a first interaction between a first energy acceptor and a first energy donor associated with the individual primer and the individual probe, and wherein the at least one second signal is a second optical signal that is indicative of a second interaction between a second energy acceptor and a second energy donor associated with the control nucleic acid molecule and an additional probe of the second probes. In some embodiments, the first energy acceptor is coupled to the individual primer, and wherein the second energy acceptor is coupled to the control nucleic acid molecule. In some embodiments, the first energy acceptor is coupled to the target nucleic acid molecule. In some embodiments, the first energy acceptor is a first quencher, and wherein the second energy acceptor is a second quencher. In some embodiments, the first energy donor is a first fluorophore, and wherein the second energy donor is a second fluorophore. In some embodiments, the first energy donor is coupled to the first probe, and wherein the second energy donor is coupled to the second probe. In some embodiments, the target nucleic acid molecule is detected at a sensitivity of at least about 90%. In some embodiments, the at least one first signal is detected while the reaction mixture comprising the target nucleic acid molecule is in fluid contact with the sensor array.

In some embodiments, the Q-PCR system is for assaying at least one template nucleic acid molecule, comprising: (a) a reaction chamber comprising a reaction mixture, wherein the reaction mixture comprises (i) a nucleic acid sample containing or suspected of containing the template nucleic acid molecule, (ii) a primer set comprising an individual primer, (iii) a control nucleic acid molecule, and (iv) a polymerizing enzyme, wherein the individual primer of the primer set has sequence complementarity with the template nucleic acid molecule, wherein the reaction chamber comprising the reaction mixture is configured to facilitate a nucleic acid amplification reaction with the reaction mixture under conditions sufficient to yield at least one target nucleic acid molecule as an amplification product(s) of the template nucleic acid molecule, wherein the nucleic acid amplification reaction does not yield any amplification product of the control nucleic acid; (b) a sensor array comprising (i) a substrate comprising a plurality of first probes immobilized to a first pixel, a plurality of second probes immobilized to a second pixel, wherein the first probes are configured to capture the individual primer of the primer set, and wherein the second probes are configured to capture the control nucleic acid molecule, and (ii) an array of detectors configured to detect at least one first signal from the first pixel and at least one second signal from the second pixel, wherein a difference between the at least one first signal and the at least one second signal over time is indicative of the individual primer binding with an individual probe of the plurality of first probes; and (c) a computer processor coupled to the sensor array and programmed to (i) subject the reaction mixture to the nucleic acid amplification reaction, and (ii) detect the at least one first signal and the at least one second signal at multiple time points during the nucleic acid amplification reaction. In some embodiments, the computer processor is programmed to detect the template nucleic acid molecule using the difference between the at least one first signal and the at least one second signal. In some embodiments, the reaction mixture comprises a plurality of template nucleic acid molecules, and wherein the first probes specifically bind to a plurality of target nucleic molecules as amplification products of the plurality of the template nucleic acid molecules. In some embodiments, the primer set comprises a plurality of individual primers having different nucleic acid sequences, and wherein the first probes are configured to specifically bind to the plurality of the individual primers. In some embodiments, the array of detectors comprises an optical detector. In some embodiments, the at least one first signal is a first optical signal that is indicative of a first interaction between a first energy acceptor and a first energy donor associated with the individual primer and the individual probe, and wherein the at least one second signal is a second optical signal that is indicative of a second interaction between a second energy acceptor and a second energy donor associated with the control nucleic acid molecule and an additional probe of the second probes. In some embodiments, the optical detector comprises a complementary metal-oxide semiconductor device. In some embodiments, the array of detectors comprises an electrical detector. In some embodiments, the electrical detector comprises a complementary metal-oxide semiconductor device. In some embodiments, the sensor array comprises at least about 100 integrated sensors.

Various techniques and technologies may be used for conducting Q-PCR using a microarray or a CMOS biochip. For example, a number of such techniques are described in U.S. Pat. Nos. 8,048,626, 9,499,861 and 10,174,367, each of which is incorporated herein by reference in its entireties for all purposes In some embodiments of this invention the light-removable blocking is included in a NA affinity-based detection system such as DNA microarrays. DNA microarrays, which are, essentially, massively parallel affinity-based biosensors, are primarily used to measure gene expression levels, i.e., to quantify the process of transcription of DNA data into messenger RNA molecules (mRNA). The information transcribed into mRNA is further translated to proteins, the molecules that perform most of the functions in cells. Therefore, by measuring gene expression levels, researchers may be able to infer critical information about functionality of the cells or the whole organism. Accordingly, a perturbation from the typical expression levels is often an indication of a disease; thus, DNA microarray experiments may provide valuable insight into the genetic causes of diseases. Indeed, one of the ultimate goals of DNA microarray technology is to allow development of molecular diagnostics and creation of personalized medicine.

A DNA microarray is basically an affinity-based biosensor where the binding is based on hybridization, a process in which complementary DNA strands specifically bind to each other creating structures in a lower energy state. Typically, the surface of a DNA microarray consists of an array (grid) of spots, each containing single stranded DNA oligonucleotide capturing molecules as recognition elements, whose locations are fixed during the process of hybridization and detection. Each single-stranded DNA capturing molecule typically has a length of 25-70 bases, depending on the exact platform and application. In the DNA microarray detection process, the mRNA that needs to be quantified is initially used to generate fluorescent labeled cDNA, which is applied to the microarray. Under appropriate experimental conditions (e.g., temperature and salt concentration), labeled cDNA molecules that are the perfect match to the microarray will hybridize, i.e., bind to the complementary capturing oligos. Nevertheless, there will always be a number of non-specific bindings since cDNA may non-specifically cross-hybridize to oligonucleotide that are not the perfect match but are rather only partial complements (having mismatches). Furthermore, the fluorescent intensities at each spot are measured to obtain an image, having correlation to the hybridization process, and thus the gene expression levels.

Molecular recognition assays generally involve detecting binding events between two types of molecules. The strength of binding can be referred to as "affinity". Affinities between biological molecules are influenced by non-covalent intermolecular interactions including, for example, hydrogen bonding, hydrophobic interactions, electrostatic interactions and Van der Waals forces. In multiplexed binding experiments, such as those contemplated here, a plurality of analytes and probes are involved. For example, the experiment may involve testing the binding between a plurality of different nucleic acid molecules or between different proteins. In such experiments analytes preferentially will bind to probes for which they have the greater affinity. Thus, determining that a particular probe is involved in a binding event indicates the presence of an analyte in the sample that has sufficient affinity for the probe to meet the threshold level of detection of the detection system being used. One may be able to determine the identity of the binding partner based on the specificity and strength of binding between the probe and analyte.

In developing the solution in the context of DNA microarrays, the invention provides a process whereby (i) cross-hybridization is viewed as interference, rather than noise (akin to wireless communications interference, cross-hybridization actually has signal content); (ii) a model of hybridization and cross-hybridization as a stochastic processes; (iii) use of analytical methods (e.g., melting temperature or Gibbs free energy function) to construct models and use empirical data to fine tune the models; (iv) the detection and quantification of gene expression levels are viewed as a stochastic estimation problem; and (v) construction of optimal estimates. The invention uses statistical signal processing techniques to optimally detect and quantify the targets in microarrays by taking into account and exploiting the above uncertainties.

Various techniques and technologies may be used for synthesizing arrays of biological materials on or in a substrate or support. For example, a number of such techniques are described in U.S. Pat. Nos. 9,223,929 and 9,133,504, each of which is incorporated herein by reference in its entireties for all purposes.

In some embodiments of this invention the light-removable blocking is included in a CMOS biochip system. In some embodiment, the present disclosure provides a fully integrated biosensor array comprising, in order, a molecular recognition layer comprising the NA construct, an optical layer and a sensor layer integrated in a sandwich configuration or in tandem together with additional layers, for example, having another layer inserted between any of the molecular recognition layer, the optical layer and the senor layer. The molecular recognition layer comprises an open surface and a plurality of different probes attached at different independently addressable locations to the open surface. The molecular recognition layer can also transmit light to the optical layer. The optical layer comprises an optical filter layer, wherein the optical layer transmits light from the molecular recognition layer to the sensor layer. The transmittal of light between layers can be filtered by the optical layer. The sensor layer comprises an array of optical sensors that detects the filtered light transmitted through the optical layer. In addition, there can be a fluid volume comprising analyte in fluid contact with the molecular recognition layer. The fluid volume may comprise the NA construct.

An integrated biosensor array of the current disclosure can measure binding of analytes in real-time. An integrated biosensor microarray that can detect binding kinetics of an assay is in contact with an affinity-based assay. The biosensor array comprises a molecular recognition layer comprising binding probes in optical communication a sensor for detecting binding to the probes in real-time.

An integrated fluorescent-based microarray system for real-time measurement of the binding of analyte to a plurality of probes that includes the capturing probe layer, fluorescent emission filter, and image sensor can be built using a standard complementary metal-oxide semiconductor (CMOS) process.

In an embodiment of the invention, the array of optical sensors of the sensor layer is a part of a semiconductor based sensor array. The semiconductor based sensor array can be either an organic semiconductor or an inorganic semiconductor. In some embodiments, the semiconductor device is a silicon-based sensor. Examples of sensors useful in the present invention include, but are not limited to, a charge-coupled device (CCD), a CMOS device, and a digital signal processor. The semiconductor device of the sensor layer can also comprise an integrated in-pixel photocurrent detector. The detector may comprise a capacitive transimpedance amplifier (CTIA).

In another embodiment, the semiconductor device has an in-pixel analog to digital converter. In another embodiment, the array of optical sensors of the sensor layer can be a photodiode array.

The sensor layer can be created using a CMOS process. A semiconductor detection platform can be the assembly of an integrated system capable of measuring the binding events of real-time microarrays (RT-μArrays). In some embodiments, an integrated device system involves a transducer array that is placed in contact with or proximity of the RT-μArray assay.

A semiconductor detection platform for RT-μArrays can include an array of independent transducers to receive and/or analyze the signal from target and probe binding events of a RT-μArray platform. A plurality of transducers can work collectively to measure a number of binding events at any individual microarray spot. For example, transducers dedicated to a spot may add and/or average their individual measured signal.

Detection circuitry connected to an array of optical sensors can be embedded in the sensor layer. Signal processing circuitry can also be connected to the array of optical sensors and embedded in the sensor layer. In some embodiments, the transducers and/or detection circuitry and/or analysis systems are implemented using electronic components which are fabricated and/or embedded in the semiconductor substrate. Examples of such fabrication techniques include, but are not limited to, silicon fabrication processes, microelectromechanical surface micromachining, CMOS fabrication processes, CCD fabrication processes, silicon-based bipolar fabrication processes, and gallium-arsenide fabrication processes.

The transducer array can be an image sensor array. Examples of such image arrays include, but are not limited to, CMOS image sensor arrays, CMOS linear optical sensors, CCD image sensors, and CCD linear optical sensors. The image sensor can be used to detect the activity of the probe/analyte interaction within the integrated biosensor array platform.

Various techniques and technologies may be used for making and/or using a CMOS biochip system. For example, a number of such techniques are described in U.S. Pat. Nos. 8,637,436 and 8,969,781.

Example 2: Light-Enabled Nested PCR

Figure 16:
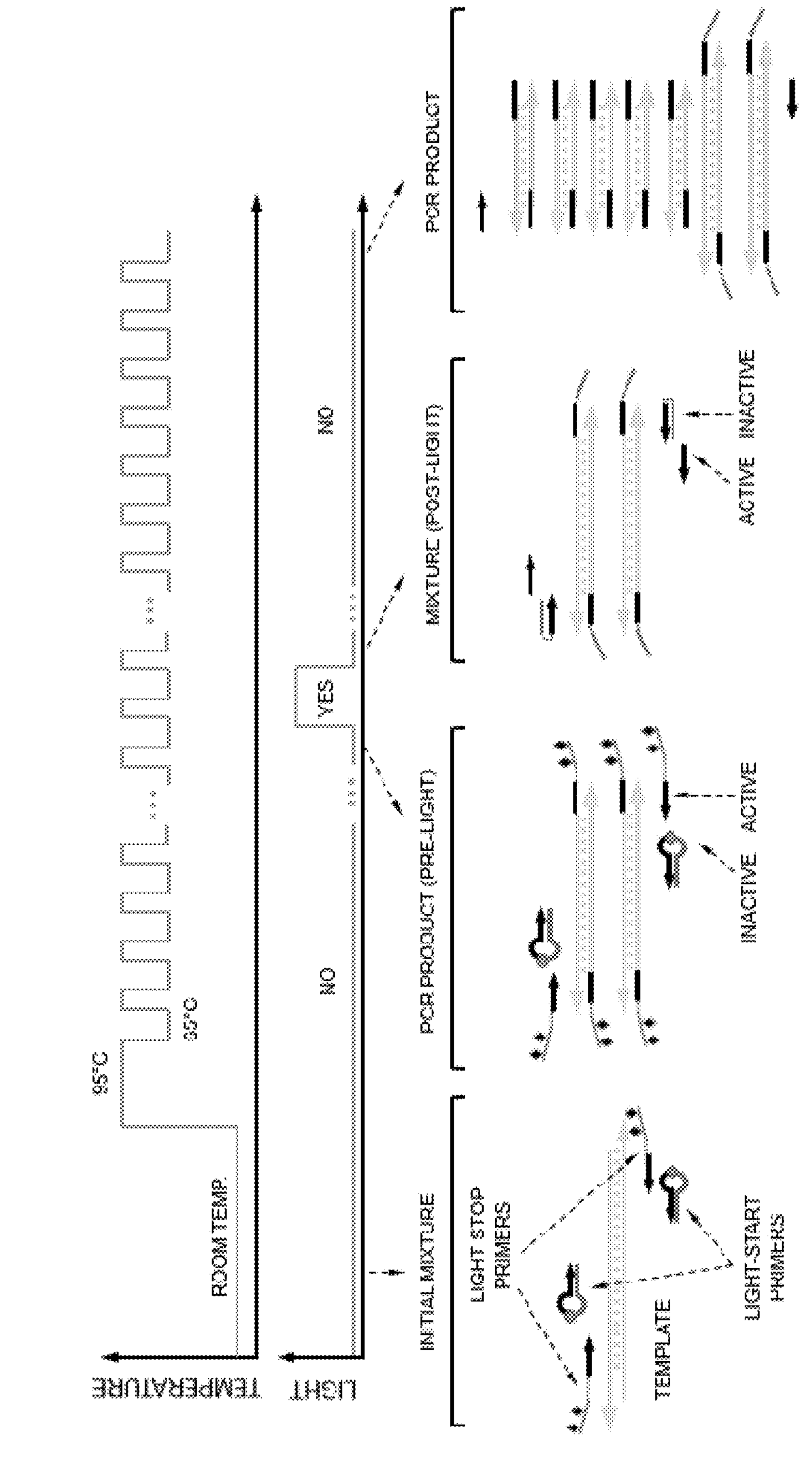
FIG. 16 schematically illustrates another example of light-enabled nested PCR.
Figure 17:
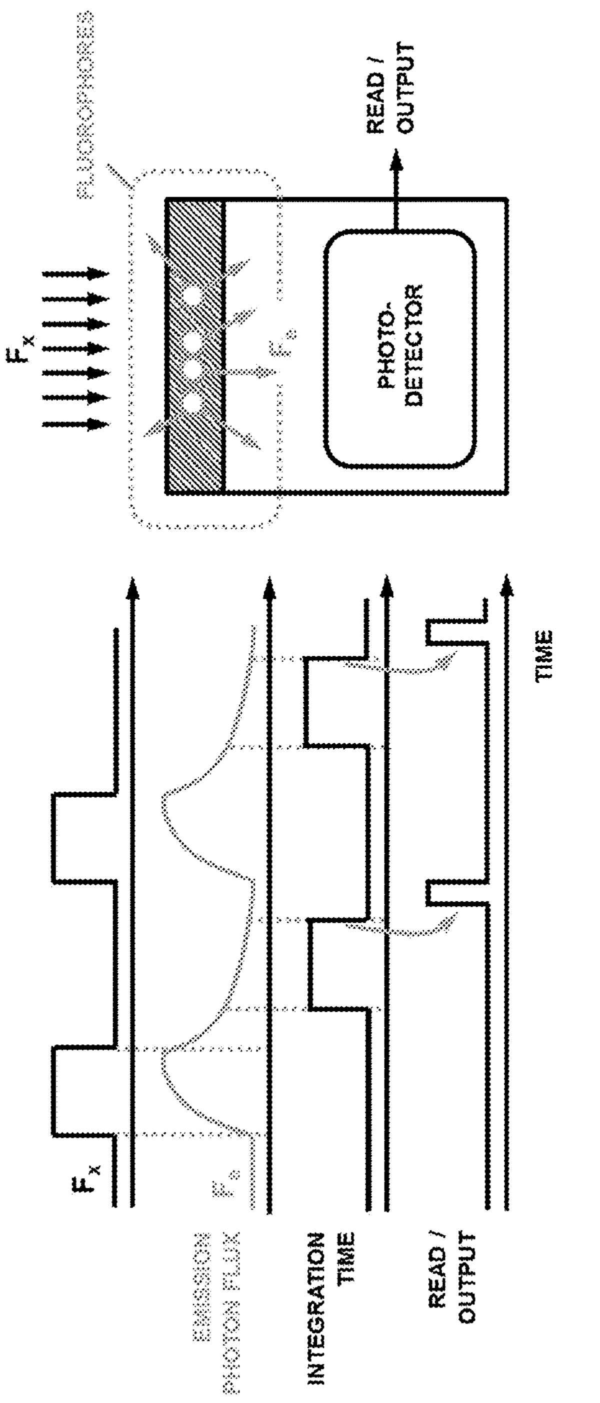
FIG. 17 illustrates a timing diagram and waveforms of an example time-gated fluorescence detection.

In this example, as depicted in FIG. 16, two pair of primers are used. One pair is light-start while the other is light-stop. At a specific time within the PCR cycles, light is applied to inactivate the light-stop primer pair, and activate the light-start pair.

In some embodiments, the light-stop primer pair flanks the light-start primer pair (see FIG. 16), such that the amplicon generated by the active form of the light-stop primer pair is used as the template for the active form of light-start primer pair. The advantage of this system is that it can increase the specificity and sensitivity of the amplification by reducing non-specific amplicons and products that may be produced due to the amplification of unexpected primer binding sites on the template.

This method, which henceforth can be referred to as "light-enabled nested PCR", may be an alternative to conventional nested PCR methods where two PCR amplifications are executed in tandem in two different reactions chambers. See G. Bein, R. Gläser, & H. Kirchner, "Rapid HLA-DRB1 genotyping by nested PCR amplification. Tissue antigens," 1992, 39(2): 68-73; M. Pfeffer, B. Linssen, M. D. Parker, and R. M Kinney, "Specific detection of Chikungunya virus using a RT-PCR/nested PCR combination," Journal of Veterinary Medicine, Series B, 2002, 49(1): 49-54. The advantage of light-start nested PCR, however, is that both amplification can occur in the same reaction and in a closed tube fashion.

In some embodiments of this invention the light-enabled nested PCR is included in a Q-PCR system. The device, system and method disclosed in Example 1 can be modified and applied herein by using the appropriate NA construct as light-start primer pair and/or light-stop primer pair in the light-enabled nested PCR and radiating the reaction mixture in the process of running the light-enabled nested PCR to start or stop a particular PCR process.

In some embodiments of this invention the light-removable blocking is included in a NA affinity-based detection system such as DNA microarrays.

In some embodiments of this invention the light-removable blocking is included in a CMOS biochip system.

Example 3: Light-Removable Blocking

In this example, light-stop hybridization probes are used as sequence-selective blockers in polymerase chain reactions or other primer-initiated molecular amplification reactions. See P. L. Dominguez, and M. S. Kolodney, "Wild-type blocking polymerase chain reaction for detection of single nucleotide minority mutations from clinical specimens," Oncogene, 2005, 24(45): 6830-6834. J. F. Huang, et al., "Single-tubed wild-type blocking quantitative PCR detection assay for the sensitive detection of codon 12 and 13 KRAS mutations," PloS one, 2015, 10(12).

In some embodiments, the light-stop hybridization probe inhibits the PCR amplification of the wild-type sequence, while allowing the mutant sequence to be synthesized. By doing this the ratio of the wild-type amplicon vs. mutant amplicon decreases, as the amplification progresses. This facilitates better detection of the mutant at the end of the PCR. The presence of the light-stop construct type further allows the removal of the blocker by light to produce clean PCR products with no interfering hybridization probes.

In some embodiments of this invention the light-removable blocking is included in a Q-PCR system. The device, system and method disclosed in Example 1 can be modified and applied herein by using the appropriate NA construct as light-removable blocking probe in tandem with a light-start PCR process, and radiating the reaction mixture in the process of running the light-start PCR to start or stop a particular PCR process.

In some embodiments of this invention the light-removable blocking is included in a NA affinity-based detection system such as DNA microarrays. The device, system and method disclosed in Example 1 can be modified and applied herein by using the appropriate NA construct as light-removable blocking probe in a NA-affinity-based detection system, such as DNA microarrays. When using the NA-affinity-based detection system, for example, to detect a target nucleic acid, the light-removable blocking probe can interact with the target nucleic acid, the immobilized probe, or solution-based probe, or a combination thereof. By radiating the reaction mixture in the process of running the NA affinity-based detection system, different amplicons may be produced and/or different hybridization events may be detected by the NA affinity-based detection system.

In some embodiments of this invention the light-removable blocking is included in a CMOS biochip system. The device, system and method disclosed in Example 1 can be modified and applied herein by using the appropriate NA construct as light-removable blocking probe in a CMOS biochip system. When using the CMOS biochip system, for example, to detect a target nucleic acid, the light-removable blocking probe can interact with the target nucleic acid, the immobilized probe, or solution-based probe, or a combination thereof. By radiating the reaction mixture in the process of running the CMOS biochip system, By radiating the reaction mixture in the process of running the NA affinity-based detection system, different amplicons may be produced and/or different hybridization events may be detected by the CMOS biochip system.

Example 4: Light-Anchored Primers

In this example, light-stop primers are used to alter the effective length of a primer during PCR.

In some embodiments, the light-stop primer is cleaved into two portions after a specific number of cycles of PCR: An inactive portion derived from the original 5'-terminus of the primer, and an active (extensible) portion derived from the original 3'-end that is capable of continuing PCR after photo-cleavage. This allows for the design of an anchored primer with a high melting temperature (TM) in the initial cycles of PCR. Upon exposure to the light, the length of the primer is shortened both to reduce the Tu of the primer and to reduce the length of the resulting amplicon. Applications of this method include the design of a high Tu primer to accommodate mismatches within the template in early cycles of PCR and/or to overcome a secondary structure in either an RNA or DNA template.

In some embodiments of this invention the light-anchored primers are included in a Q-PCR system. The device, system and method disclosed in Example 1 can be modified and applied herein by using the appropriate NA construct as light-anchored primers in a light-anchored PCR process. Before exposing to light, the amplicons generated can comprise the full-length of the light-anchored primers. Radiating the reaction mixture can produce a new primer pairs. Each new primer is shorter in length than the corresponding full-length light-anchored primer. Thus, the amplicons produced with the new primer pair can have shorter length than when before exposing to the light. Two sets of amplicons with different lengths can be generated using the same template nucleic acid molecule.

In some embodiments of this invention the light-anchored primers are included in a NA affinity-based detection system such as DNA microarrays.

In some embodiments of this invention the light-anchored primers are included in a CMOS biochip system.

Example 5

Figure 25:
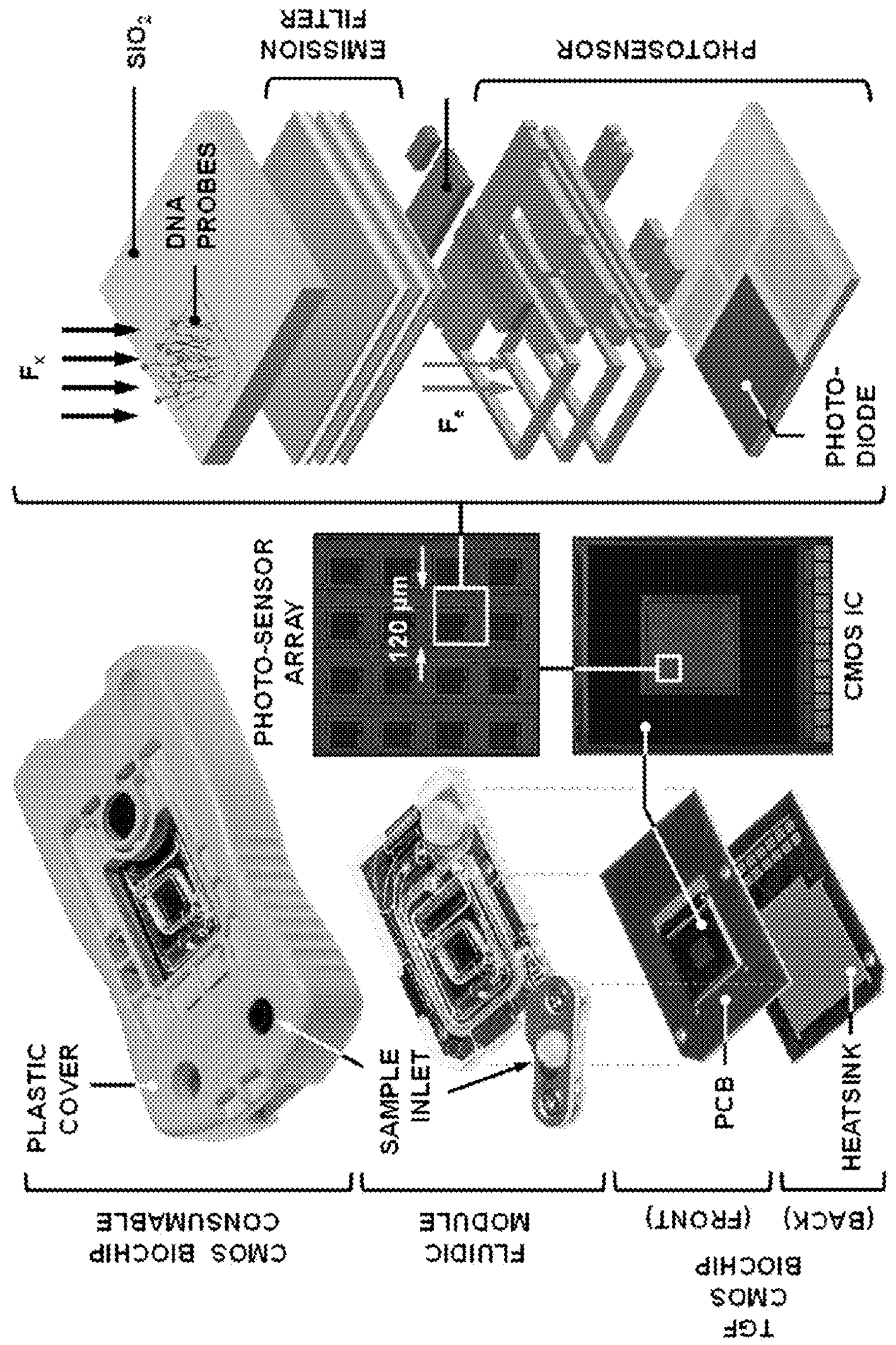
FIG. 25 shows an example TGF CMOS biochip module and its TGF pixel structure in accordance with one of the embodiments of the present disclosure.

In this example, a fully-integrated TGF CMOS biochip is presented that is specifically designed for DNA and protein addressable arrays of biotechnology. As shown in FIG. 25, a CMOS IC is assembled on a printed circuit board (PCB) substrate and then integrated with the fluidic module to create the biochip consumable. The biochip IC includes an array of 1024 biosensors pixels with an optical density (OD)~5.8 integrated emission filter and addressable (unique) immobilized probes (DNA) on every pixel. Pixel-level photo-sensors with Nwell-Psub photodiodes (acting as the PCT elements) are designed to be shot-noise-limited and offer >130 dB detection dynamic range (DDR). A temperature control and cycling system is also integrated in this biochip to accommodate thermal control. For that reason, a bandgap temperature sensor and a resistive heater are integrated that together can achieve heating/cooling rates of +/−10° C./s with an overall accuracy of ±0.25° C. within 25° C. to 100° C. range.

Figures 26, 26A, 26B:
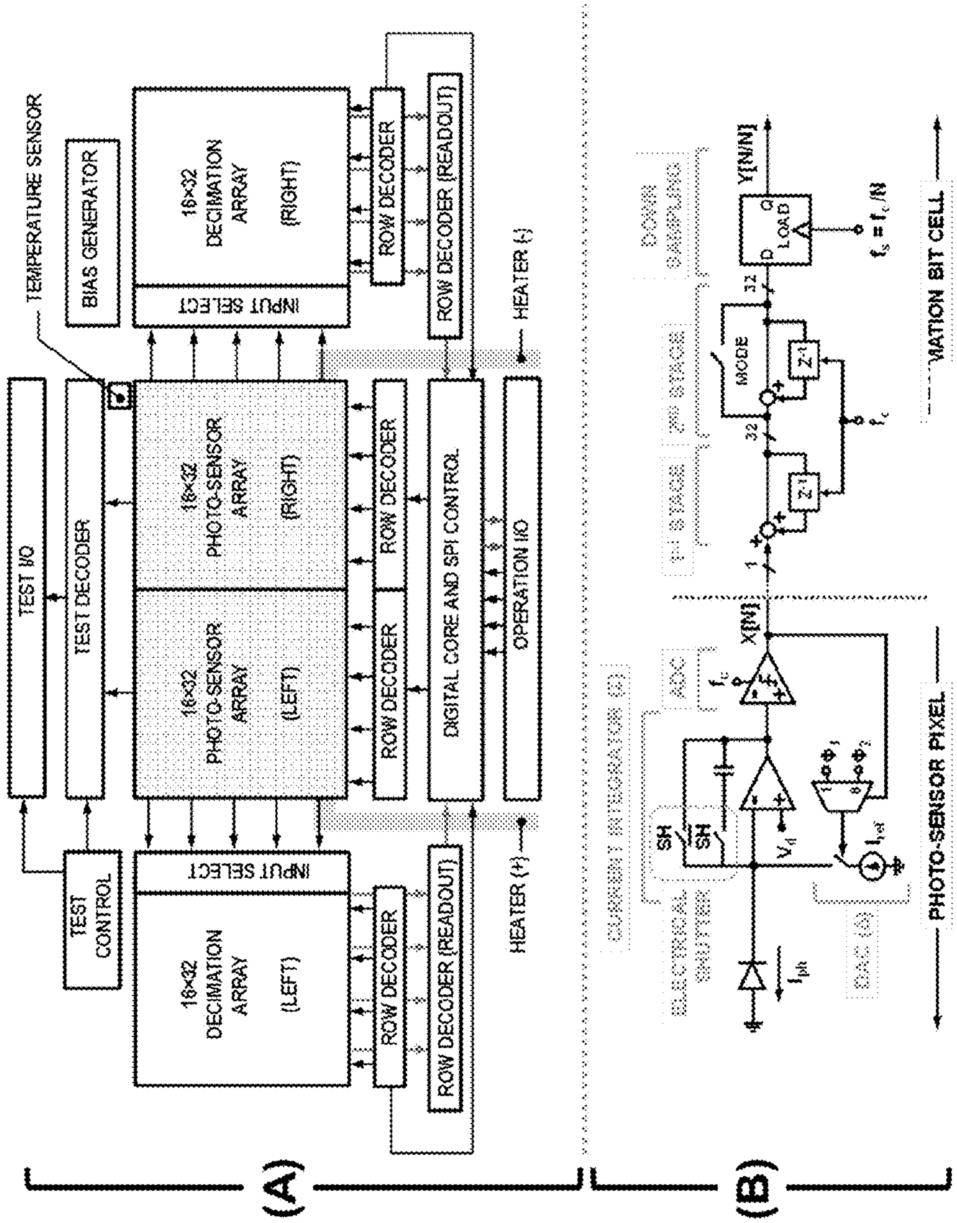
FIG. 26A shows architecture of an example biochip in accordance with one of the embodiments of the present disclosure.
FIG. 26B shows an example TGF pixel and its dedicated decimation cells in accordance with one of the embodiments of the present disclosure.

The architecture of the chip and 120 μm-pitch biosensing pixels and decimation cells are shown in FIG. 26A and FIG. 26B. The TGF pixels within the 32×32 array include a ΔΣ current detector that takes the photocurrent, $I_{ph}$, as its input and produces a 1-bit digital output stream that is transferred into the on-chip decimation array. The photo-sensor circuitry (FIG. 26B) includes a current integrator (acting as the CIE+CVT), a clocked comparator (ADC) and a programmable current source (DAC).

In the CWF mode (i.e., no pulsed excitation source or electronic shuttering), the 42 current detector operates continuously with frequency of fc while the decimation cell implements a $sinc^2$ filter, by performing a two-stage 32-bit accumulation followed by down-sampling and readout with frequency of $f_s$. In the TGF mode, similar operation is done, but with the exception of periodic activation of an electronic shutter capable of diverting $I_{ph}$ from the integrator. This operation blocks the optical excitation pulses and reduces the natural autofluorescence background from biological media that typically have lifetimes<50 ns. The chip then accumulates and measures the fluorescence emissions at pre-programmed time intervals.

In this chip, the TGF pixels, the decimation arrays, bandgap temperature sensor, and reference voltage DACs are all operated and read by a single digital core block operating at 50 MHz and is accessible through a serial peripheral interface (SPI) port (FIG. 26A). The single resistive heater can provide up to 20 W using an external source, has a serpentine structure, and is uniformly distributed in the top metal layer. This chip can be fully operated using 14 pins (and bond wires) aggregated on one side of the die to facilitate efficient fluidic assembly and consumable manufacturing (FIG. 25).

Figure 27:
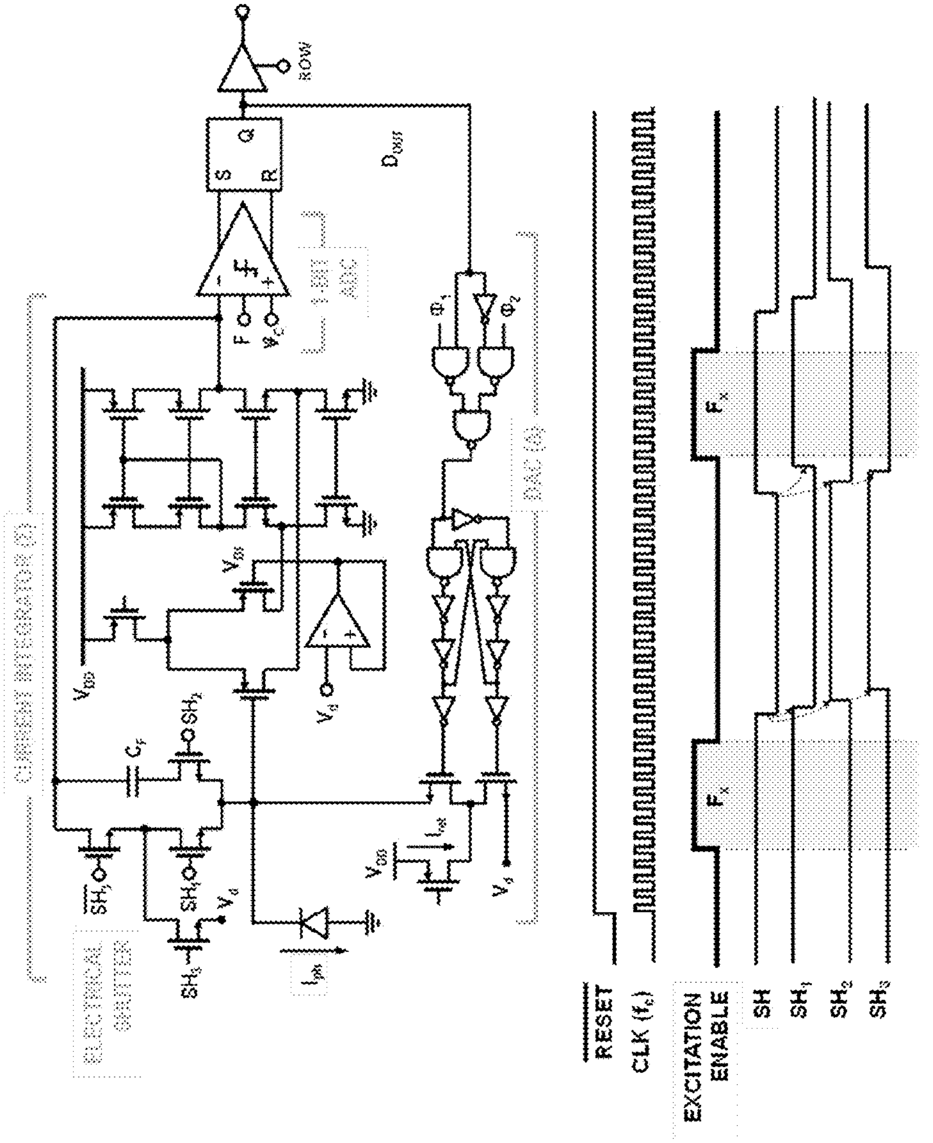
FIG. 27 shows photo-sensor pixel schematic and timing diagram of an example TGF mode in accordance with one of the embodiments of the present disclosure.

In FIG. 27, the schematic and timing diagram of the photo sensing pixel in the TGF mode is depicted. A capacitive trans-impedance amplifier (CTIA) is used as the CIE+CVT and a clocked comparator creates the pixel output, Dout. The DAC is implemented by using a current source that can be used to apply a current pulse into the CTIA input with two adjustable durations ($\Phi_1$ and $\Phi_2$). The electronic shutter uses $SH_1$, $SH_2$, and $SH_3$ to temporarily remove $C_f$, the feedback capacitor of the CTIA, out of the circuit and simultaneously shorting $I_{ph}$ to $V_d$ using the op-amp. Due to transistor mismatch, a small quantity of charge is injected into $C_f$ at every shutter operation that manifests itself as a pixel-dependent electronic shuttering offset current, $I_s$. This current when added to dark current $I_{dc}$, forms the random offset current of the pixel $I_o=I_s+I_{dc}$, which, in both CWF and TGF modes, is measured and extracted to estimate $I_{ph}$. This is done using a CDS approach in which one frame with excitation light and one without are taken, and then the measurements are subtracted from one another.

The decimation array has a dedicated bit cell for every pixel. The bit cell consists of a 32-bit incrementor, followed by a 32-bit adder, forming the two-stage accumulation unit (FIG. 26B). At intervals of $T=1/f_s$, the output of the adder is loaded onto the 32-bit shift register. The data from the shift registers are then passed into the digital unit in a serial scan chain fashion.

Figure 28:
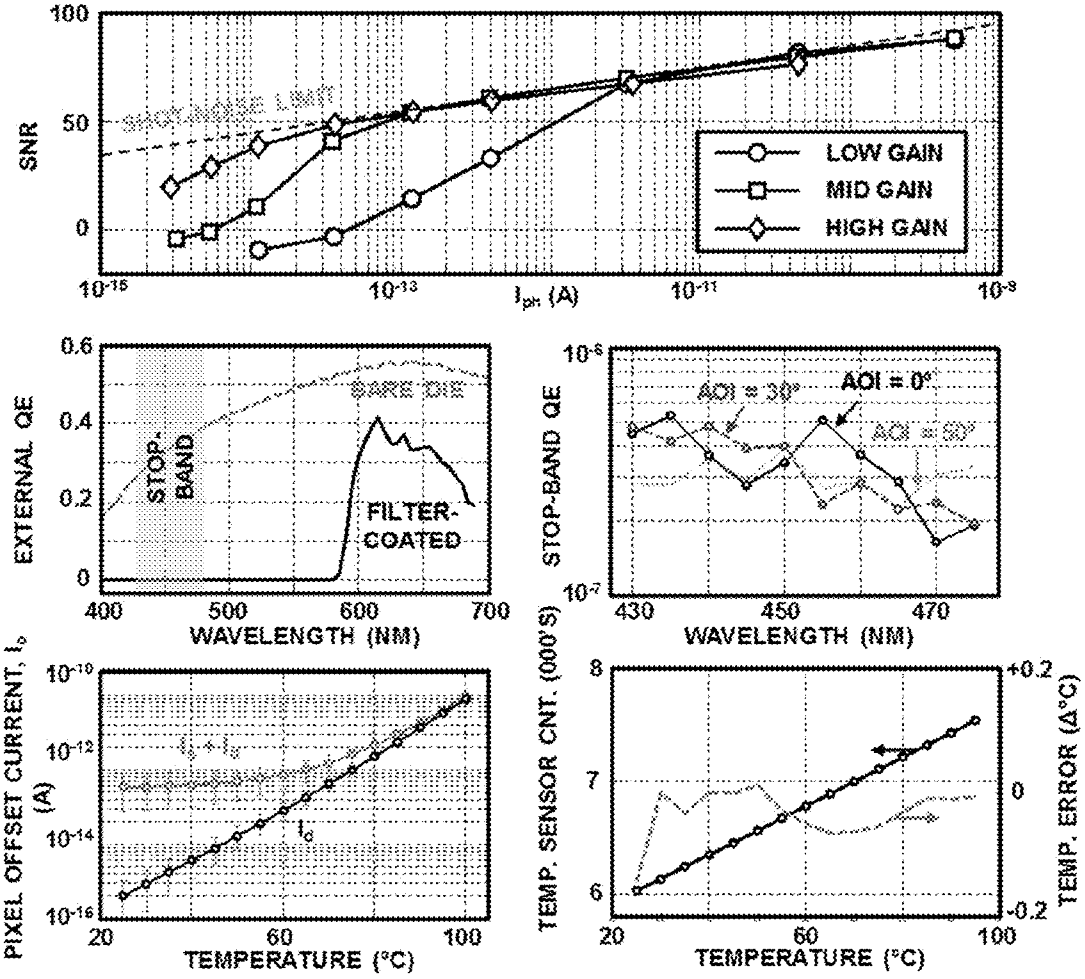
FIG. 28 shows measured primary electrical and optical performances of an example TGF pixel in accordance with one of the embodiments of the present disclosure.

The electrical and optical measurements for this biochip are reported in FIG. 28. The measured signal-to-noise ratio (SNR) from pixels is demonstrate that the added sensor noise is ~30% of the shot-noise when the quantization noise is not limiting within the 100 fA to 1 nA input current region. The total dual-depletion region (DDR) is 137 dB (1.33 fA-10 nA) for $f_s$=1.667 Hz. The photodiode external quantum efficiency (QE), with and without the integrated emission filter, show the pass-band and stop-band QE of 0.4 and $3.69\times10^{-7}$ (OD~5.8), respectively. The measured distribution of $I_{dc}$ and $I_o$ validate the expected randomness with maximum amplitude of 100 pA (<1% of the full scale. The output of the temperature sensor as a function of temperature are also reported in FIG. 28, which shows that with 2-point calibration accuracy of ±0.25° C. is achievable across the 25° C.-100° C. temperature range.

Figure 29:
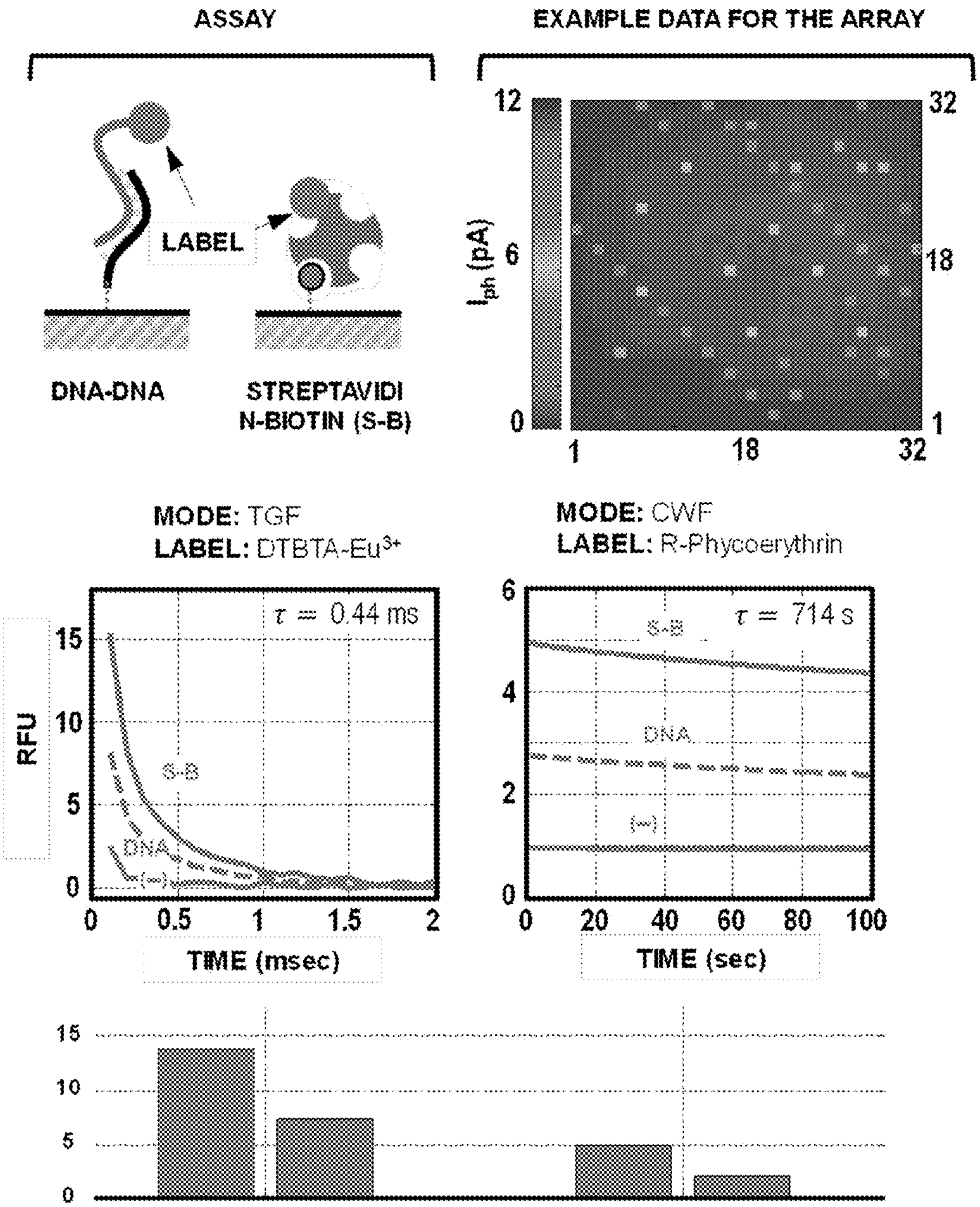
FIG. 29 shows signal-to-background and kinetics measurements for CWF and TGF modes in accordance with one of the embodiments of the present disclosure.

In FIG. 29, the results from two (2) biosensing experiments are reported and compared, to demonstrate the different modes of operation. In all experiments, identical surface functionalization and array-based DNA hybridization or ligand-receptor bindings are performed. However, distinct molecular labels are attached to the targets, for CWF and TGF, respectively. In CWF, using a R-phycoerythrin fluorophore, the signal-to-background (S/B) shows the lowest value. This may be due to the non-ideal blocking of the excitation light. The S/B is increased significantly when using TGF and DTBTA-Eu3+, which is a Europium (Lanthanide) chelate-based long lifetime fluorophore. As evident, the background photon emission from the pulsed light-emitting diode (LED) excitation source decays significantly within 100 us and the background becomes much smaller than compared to CWF mode.

Figure 30:
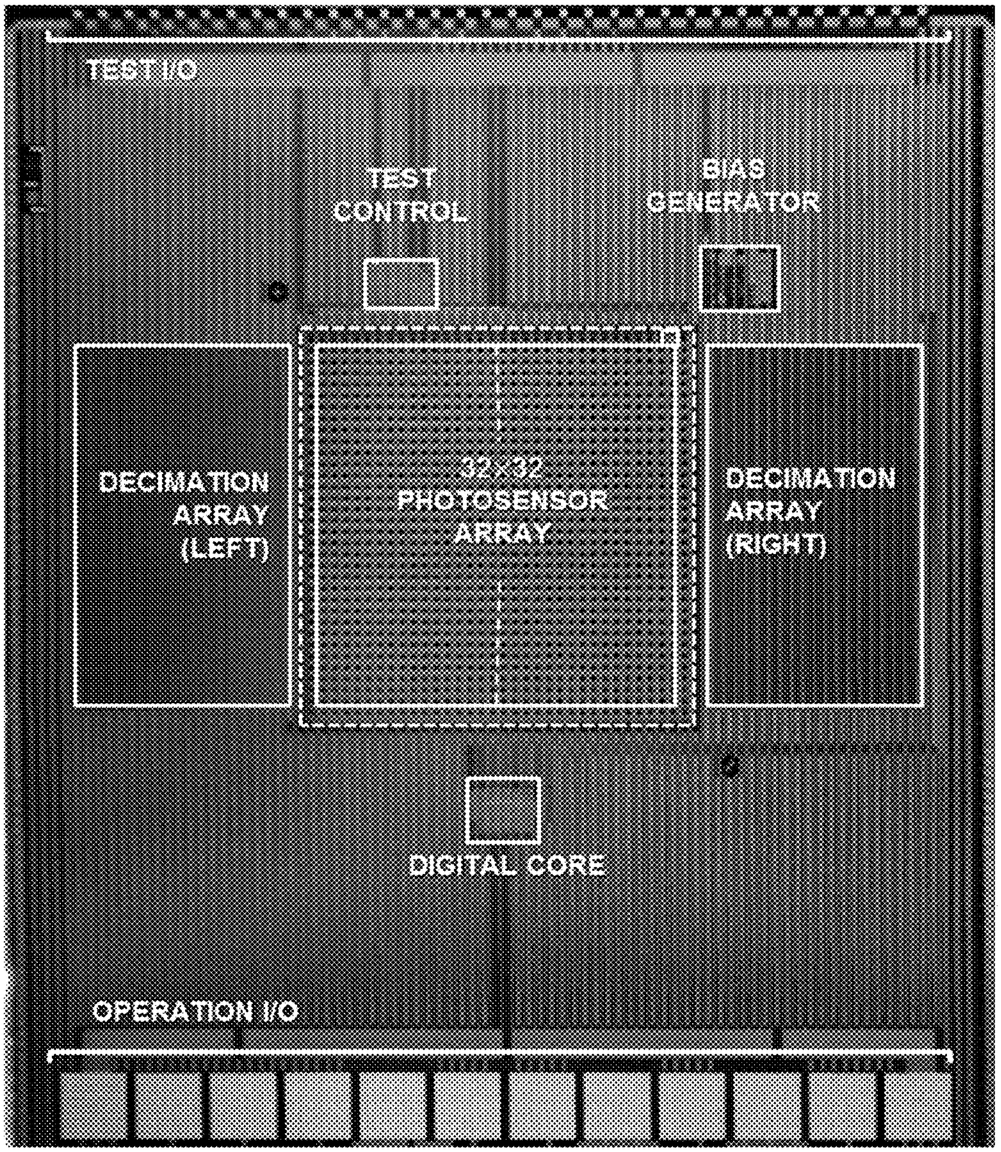
FIG. 30 shows die micrograph of an example TGF CMOS biochip in accordance with one of the embodiments of the present disclosure.

In FIG. 30, the micrograph of the implemented TGF biochip is shown.

Example 6

This example shows how PCI-TGF pixels can be designed in applications where high-density biosensor pixels arrays are required, such as DNA SBS and DNA SBH systems. The example also shows how miniaturized PCI-TGF pixels can be incorporated into standard high-density image sensor arrays. As the example shows, PCI can be added into the circuitry of multi-million pixel CMOS image sensors that can have sub-micron pixel dimensions.

Figure 31B:
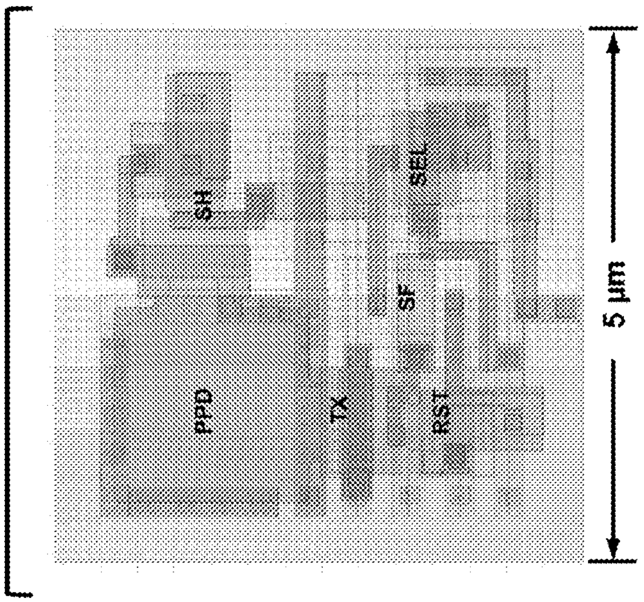
FIG. 31B shows the layout of the pixel of FIG. 31A in sub-micron dimensions.
Figure 31A:
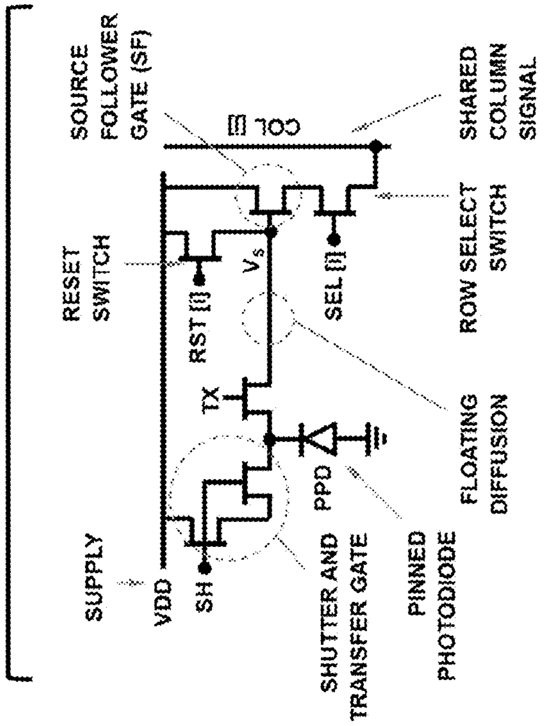
FIG. 31A illustrates circuit schematic of an example six transistor (6T) PCI-TGF pixel in accordance with one of the embodiments of the present disclosure.

FIG. 31A depicts the circuit diagram example of a six transistor (6T) pixel topology which includes a pinned photodiode (PPD) as the PCT, and two (2) charge transfer gates; one to transfer charge to the sense node (TX) acting as an integrating switch, and one to act as an electronic shutter (SH). The charge is integrated on the floating diffusion (acting as the CIE+CVT) and the generated voltage $V_s$ is read using the source follower gate. In this depiction, we assume that the pixel is located at the (i,j) coordinate within a photo-sensor array and $V_s$ can be accessed by the column signal (COL[j]) by activating the row select signal (SEL[i]). The charge is the floating diffusion can be reset using RST[i].

In FIG. 31B, the layout of this pixel is shown that can be scaled down to sub-micron dimensions similar to equivalent CMOS image sensor pixels.

Figure 32:
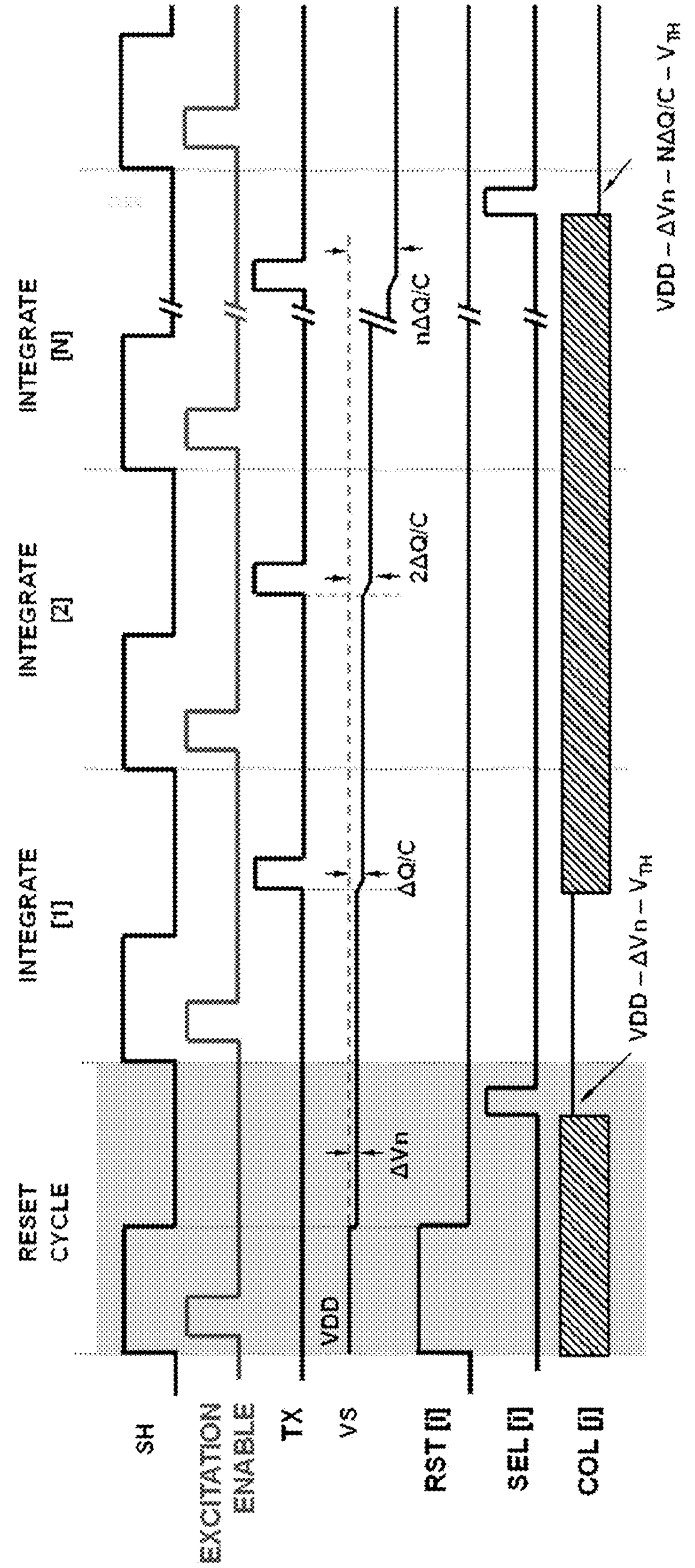
FIG. 32 shows timing diagram of an example PCI-TGF pixel in accordance with one of the embodiments of the present disclosure in which correlated double sampling (CDS) is implemented by reading I's in the reset cycle and after N PCI cycles.

In FIG. 32, the diagram of the PCI-TGF pixel is shown. As FIG. 32 shows, correlated double sampling (CDS) can be implemented by reading $V_s$ in the reset cycle and after N PCI cycles. As shown in the reset cycle, the output of the pixel is $V_{DD}-\Delta V_n-V_{th}$, where $\Delta V_n$ and $V_{th}$ are the offset and threshold voltages of the source follower transistor, respectively. Now, at the end of the $N^{th}$ integration cycle, $V_s=V_{DD}-\Delta V_n-V_{th}-N\Delta Q/C$, where $\Delta Q$ is the charge collected by the emission from an individual excitation pulse and C is the floating diffusion effective capacitance. Therefore, by subtracting these two values (i.e., CDS) we can have a value that follows the PCI schemes while is independent of the offset of the source follower that may vary from pixel to pixel within the array.

Other Terms Used in the Present Disclosure

The term "analyte" or "target" as used herein generally refers to a molecular species to be detected. Examples include small molecules such as organic compounds, drugs, hormones, lipids, steroids, or metabolites; polynucleotides such as deoxyribonucleic acid (DNA) molecules, ribonucleic acid (RNA) molecules, and peptide nucleic acid (PNA); polypeptides such as proteins, peptides, antibodies, antigens, enzymes, and receptors; as well as tissues, organelles, and other receptor probes.

As used herein, the terms "peptide," "polypeptide," and "protein" are used interchangeably, and generally refer to a compound comprised of amino acid residues covalently linked by peptide bonds. Polypeptides may include any peptide or protein comprising two or more amino acids joined to each other by peptide bonds. Examples of polypeptides may include, for example, biologically active fragments, substantially homologous polypeptides, oligopeptides, homodimers, heterodimers, polypeptides and variants thereof, modified polypeptides, derivatives, analogs, fusion proteins, or combinations thereof. A polypeptide may be a natural peptide, a recombinant peptide, or a combination thereof.

The term "detector" as used herein generally refers to a device, generally including optical and/or electronic components that can detect signals.

The term "quantitative-PCR" or "Q-PCR," as used herein generally refers to a polymerase chain reaction (PCR) process that can be used for the qualitative and quantitative determination of nucleic acid sequences. In some cases, Q-PCR is synonymous with real-time PCR. Q-PCR can involve the measurement of the amount of amplification product (or amplicon) as a function of amplification cycle, and use such information to determine the amount of the nucleic acid sequence corresponding to the amplicon that was present in the original sample.

The term "reverse transcription polymerase chain reaction" or "RT-PCR," as used herein generally refers to a variant of polymerase chain reaction (PCR), in which a ribonucleic acid (RNA) strand is first reverse transcribed into its DNA complement (complementary DNA, or cDNA) using the enzyme reverse transcriptase. The resulting cDNA is subsequently amplified using traditional PCR. RT-PCR utilizes a pair of primers, which are complementary to a defined sequence on each of the two strands of the cDNA. These primers are then extended by a DNA polymerase and a copy of the strand is made after each PCR cycle, leading to exponential amplification. The term "quantitative reverse transcription polymerase chain reaction" or "qRT-PCR," as used herein, refers to real time detection of a RT-PCR reaction, as similarly done in a Q-PCR reaction.

In the present disclosure, all methods or systems when disclosing for QPCR can be applicable to qRT-PCR after making the corresponding changes as known in the art to a skilled person.

The term "probe" as used herein generally refers to a molecular species or other marker that can bind to a specific target nucleic acid sequence. A probe can be any type of molecule or particle. Probes can comprise molecules and can be bound to the substrate or other solid surface, directly or via a linker molecule. The term "probe" or "capturing probe" as used herein generally refers to a molecular species and/or other markers that can bind to a specific analyte or target. Probes can comprise molecules and can be bound to the substrate, molecules, or other solid surface, directly or via a linker. Non-limiting examples of linkers include amino acids, polypeptides, nucleotides, oligonucleotides, and chemical linkers. A plurality of probes can be immobilized to a substrate, molecule or other solid surface and can be referred to as a probe array. A plurality of probes of a probe array may be arranged uniformly, for example as an arrangement of spots, or non-uniformly.

The term "detector" as used herein generally refers to a device, generally including optical and/or electronic components that can detect signals.

The term "mutation" as used herein generally refers to genetic mutations or sequence variations such as a point mutation, a single nucleotide polymorphism (SNP), an insertion, a deletion, a substitution, a transposition, a translocation, a copy number variation, or another genetic mutation, alteration or sequence variation.

The term "about" or "nearly" as used herein generally refers to within +/−15%, 10%, 9%, 8%, 7%, 6%, 5%, 4%, 3%, 2%, or 1% of the designated amount.

The term "label" as used herein refers to a specific molecular structure that can be attached to a target molecule, to make the target molecule distinguishable and traceable by providing a unique characteristic not intrinsic to the target molecule. The term "label" as used herein refers to a molecular structure that can be attached to a molecule (e.g., a target and/or a probe), to make the molecule detectable, distinguishable and/or traceable by providing a characteristic which may not be intrinsic to the target molecule. Examples of labels may include are luminescent molecules (e.g., fluorophores), reduction-oxidation (redox) species, or enzymes. In some cases, labels may comprise fluorophores with long lifetimes, such as, for example, lanthanide chelates and transition metal chelates, which are luminescent or phosphorescent.

The term "limiting," as used herein in the context of a chemical or biological reaction, generally refers to a species that is in a limiting amount (e.g., stoichiometrically limiting) in a given reaction volume such that upon completion of the chemical or biological reaction (e.g., PCR), the species may not be present in the reaction volume.

The term "excess," as used herein in the context of a chemical or biological reaction, generally refers to a species that is in an excess amount (e.g., stoichiometrically limiting) in a given reaction volume such that upon completion of the chemical or biological reaction (e.g., PCR), the species may be present in the reaction volume.

The term "nucleotide," as used herein, generally refers a molecule that can serve as the monomer, or subunit, of a nucleic acid, such as deoxyribonucleic acid (DNA) or ribonucleic acid RNA). A nucleotide can be a deoxynucleotide triphosphate (dNTP) or an analog thereof, e.g., a molecule having a plurality of phosphates in a phosphate chain, such as 2, 3, 4, 5, 6, 7, 8, 9, or 10 phosphates. A nucleotide can generally include adenosine (A), cytosine (C), guanine (G), thymine (T) and uracil (U), or variants thereof. A nucleotide can include any subunit that can be incorporated into a growing nucleic acid strand. Such subunit can be an A, C, G, T, or U, or any other subunit that is specific to one or more complementary A, C, G, T or U, or complementary to a purine (i.e., A or G, or variant thereof) or a pyrimidine (i.e., C, T or U, or variant thereof). A subunit can enable individual nucleic acid bases or groups of bases (e.g., AA, TA, AT, GC, CG, CT, TC, GT, TG, AC, CA, or uracil-counterparts thereof) to be resolved. A nucleotide may be labeled or unlabeled. A labeled nucleotide may yield a detectable signal, such as an optical, electrostatic or electrochemical signal.

A Q-PCR process can be described in the following non-limiting example. A PCR reaction is carried out with a pair of primers designed to amplify a given nucleic acid sequence in a sample. The appropriate enzymes and nucleotides, such as deoxynucleotide triphosphates (dNTPs), are added to the reaction, and the reaction is subjected to a number of amplification cycles. The amount of amplicon generated from each cycle is detected, but in the early cycles, the amount of amplicon can be below the detection threshold. The amplification may be occurring in two phases, an exponential phase, followed by a non-exponential plateau phase. During the exponential phase, the amount of PCR product approximately doubles in each cycle. As the reaction proceeds, however, reaction components are consumed, and ultimately one or more of the components becomes limiting. At this point, the reaction slows and enters the plateau phase. Initially, the amount of amplicon remains at or below background levels, and increases are not detectable, even though amplicon product accumulates exponentially. Eventually, enough amplified product accumulates to yield a detectable signal. The cycle number at which this occurs is called the threshold cycle, or $C_t$. Since the $C_t$ value is measured in the exponential phase when reagents are not limited, Q-PCR can be used to reliably and accurately calculate the initial amount of template present in the reaction. The $C_t$ of a reaction may be determined mainly by the amount of nucleic acid sequence corresponding to amplicon present at the start of the amplification reaction. If a large amount of template is present at the start of the reaction, relatively few amplification cycles may be required to accumulate enough products to give a signal above background. Thus, the reaction may have a low, or early, $C_t$. In contrast, if a small amount of template is present at the start of the reaction, more amplification cycles may be required for the fluorescent signal to rise above background. Thus, the reaction may have a high, or late, $C_t$. Methods and systems provided herein allow for the measurement of the accumulation of multiple amplicons in a single fluid in a single amplification reaction, and thus the determination of the amount of multiple nucleic acid sequences in the same sample with the methodology of Q-PCR described above.

As used herein in, the term "real-time" generally refers to measuring the status of a reaction while it is occurring, either in the transient phase or in biochemical equilibrium. Real-time measurements are performed contemporaneously with the monitored, measured, or observed ongoing events, as opposed to measurements taken after a reaction is fixed. Thus, a "real time" assay or measurement generally contains not only the measured and quantitated result, such as fluorescence, but expresses this at various time points, that is, in nanoseconds, microseconds, milliseconds, seconds, minutes, hours, etc. "Real-time" may include detection of the kinetic production of signal, comprising taking a plurality of readings in order to characterize the signal over a period of time. For example, a real-time measurement can comprise the determination of the rate of increase or decrease in the amount of an analyte. While the measurement of signal in real-time can be useful for determining rate by measuring a change in the signal, in some cases the measurement of no change in signal can also be useful. For example, the lack of change of a signal over time can be an indication that a reaction (e.g., binding, hybridization) has reached a steady-state.

As used herein, the terms "polynucleotide", "oligonucleotide", "nucleotide", "nucleic acid" and "nucleic acid molecule" generally refer to a polymeric form of nucleotides (polynucleotides) of various lengths (e.g., 20 bases to 5000 kilo-bases), either ribonucleotides (RNA) or deoxyribonucleotides (DNA). This term may refer only to the primary structure of the molecule. Thus, the term may include triple-, double- and single-stranded DNA, as well as triple-, double- and single-stranded RNA. It may also include modifications, such as by methylation and/or by capping, and unmodified forms of the polynucleotide. As used herein, the terms "polynucleotide", "oligonucleotide", "nucleotide", "nucleic acid" and "nucleic acid molecule" generally refer to a polymeric form of nucleotides (polynucleotides) of various lengths, either ribonucleotides (RNA) or deoxyribonucleotides (DNA). Examples of nucleotide sequences are sequences corresponding to natural or synthetic RNA or DNA including genomic DNA and messenger RNA. The length of the sequence can be any length that can be amplified into nucleic acid amplification products, or amplicons, for example, up to about 20, 50, 100, 200, 300, 400, 500, 600, 700, 800, 1,000, 1,200, 1,500, 2,000, 5,000, 10,000 or more than 10,000 nucleotides in length, or at least about 20, 50, 100, 200, 300, 400, 500, 600, 700, 800, 1,000, 1,200, 1,500, 2,000, 5,000, 10,000 or 10,000 nucleotides in length.

Nucleic acids can comprise phosphodiester bonds (i.e. natural nucleic acids). Nucleic acids can comprise nucleic acid analogs that may have alternate backbones, comprising, for example, phosphoramide (see, e.g., Beaucage et al., Tetrahedron 49(10):1925 (1993) and U.S. Pat. No. 5,644,048), phosphorodithioate (see, e.g., Briu et al., J. Am. Chem. Soc. 11 1:2321 (1989), O-methylphosphoroamidite linkages (see, e.g., Eckstein, Oligonucleotides and Analogues: A Practical Approach, Oxford University Press), and peptide nucleic acid (PNA) backbones and linkages (see, e.g., Carlsson et al., Nature 380:207 (1996)). Nucleic acids can comprise other analog nucleic acids including those with positive backbones (see, e.g., Denpcy et al., Proc. Natl. Acad. Sci. USA 92:6097 (1995); non-ionic backbones (see, e.g., U.S. Pat. Nos. 5,386,023, 5,637,684, 5,602,240, 5,216,141 and 4,469,863; Kiedrowshi et al., Angew. Chem. Intl. Ed. English 30:423 (1991); Letsinger et al., J. Am. Chem. Soc. 110:4470 (1988); Letsinger et al., Nucleoside & Nucleotide 13:1597 (1994); Chapters 2 and 3, ASC Symposium Series 580, "Carbohydrate Modifications in Antisense Research", Ed. Y. S. Sanghui and P. Dan Cook; Mesmaeker et al., Bioorganic & Medicinal Chem. Lett. 4:395 (1994); Jeffs et al., J. Biomolecular NMR 34:17 (1994); Tetrahedron Lett. 37:743 (1996)) and non-ribose backbones, (see, e.g., U.S. Pat. Nos. 5,235,033 and 5,034,506, and Chapters 6 and 7, ASC Symposium Series 580, "Carbohydrate Modifications in Antisense Research", Ed. Y. S. Sanghui and P. Dan Cook). Nucleic acids can comprise one or more carbocyclic sugars (see, e.g., Jenkins et al., Chem. Soc. Rev. (1995) pp 169-176). These modifications of the ribose-phosphate backbone can facilitate the addition of labels, or increase the stability and half-life of such molecules in physiological environments.

As used herein, the term "amplicon" generally refers to a molecular species that is generated from the amplification of a nucleotide sequence, such as through PCR. An amplicon may be a polynucleotide such as RNA or DNA or mixtures thereof, in which the sequence of nucleotides in the amplicon may correlate with the sequence of the nucleotide sequence from which it was generated (i.e. either corresponding to or complimentary to the sequence). The amplicon can be either single stranded or double stranded. In some cases, the amplicon may be generated by using one or more primers that is incorporated into the amplicon. In some cases, the amplicon may be generated in a polymerase chain reaction or PCR amplification, wherein two primers may be used to produce either a pair of complementary single stranded amplicons or a double-stranded amplicon.

As used herein, the term "probe" generally refers to a molecular species or a marker that can bind to a nucleic acid sequence. A probe can be any type of molecules or particles. Probes can comprise molecules and can be bound to a substrate or a surface, directly or via a linker molecule.

As used herein, the singular forms “a”, “an”, and “the” include plural references unless the context clearly dictates otherwise.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for detecting a presence or absence of an analyte nucleic acid in a solution, comprising:

directing the solution to a device comprising a reaction chamber configured to receive the solution comprising the analyte nucleic acid, and further comprising a temperature control system capable of changing the temperature of the solution in the reaction chamber, wherein the reaction chamber:

(i) the analyte nucleic acid comprising a first inner sequence flanked by a first outer sequence and a second outer sequence, (ii) a first pair of primers comprising one or more first photocleavable moieties, wherein said first pair of primers are configured to: (1) bind to said first outer sequence and/or said second outer sequence, (2) be elongated to amplify said analyte nucleic acid in a first amplification reaction to generate a first amplified nucleic acid sequence comprising the first inner sequence, and (3) be deactivated following said first amplification reaction when said one or more first photocleavable moieties are irradiated by light, and (iii) a second pair of primers comprising one or more second photocleavable moieties, wherein said second pair of primers are configured to: (1) be activated when said one or more second photocleavable moieties are irradiated by said light, (2) bind to said first inner sequence, and (3) be elongated to amplify said first amplified nucleic acid sequence in a second amplification reaction to generate a second amplified nucleic acid sequence;

applying a time-varying temperature profile to the reaction chamber;

applying an optical excitation pulse to the reaction chamber within a first time period; and detecting periodically a fluorescent signal from the reaction chamber during a second time period subsequent to the first time period wherein the fluorescent signal is indicative of the presence or absence of the analyte nucleic acid.

2. The method of claim 1, wherein the fluorescent signal is indicative of binding of the analyte nucleic acid to a probe, and wherein the method further comprises performing a polymerase chain reaction (PCR).

3. The method of claim 1, wherein at least one of said first amplification reaction and said second amplification reaction is a quantitative PCR.

4. The method of claim 2, wherein the temperature control system comprises temperature sensors to measure temperature of the reaction chamber.

5. The method of claim 1, wherein the device further comprises an excitation source for applying the optical excitation pulse to the analyte within the first time period, and wherein a center wavelength of the excitation source is from about 200 nm to 600 nm.

6. The method of claim 1, wherein the device further comprises a photo-sensor array for detecting periodically the fluorescent signal from the reaction chamber during the second time period, and wherein the photo-sensor array comprises a plurality of detectors in a 2D array format.

7. The method of claim 2, wherein the probe is a nucleic acid probe.

8. The method of claim 2, wherein the reaction chamber comprises a plurality of probes.

9. The method of claim 1, wherein the analyte nucleic acid comprises a quencher.

10. The method of claim 1, wherein the time-varying temperature profile comprises a rate of temperature change of at least 20° C./minute.

11. The method of claim 1, wherein the reaction chamber has a volume between 1 and 100 μL.

* * * * *